US010864482B2

(12) United States Patent
Katz

(10) Patent No.: US 10,864,482 B2
(45) Date of Patent: Dec. 15, 2020

(54) APPARATUS SYSTEM AND METHOD TO SEPARATE BRINE FROM WATER

(71) Applicant: Gary P Katz, Houston, TX (US)

(72) Inventor: Gary P Katz, Houston, TX (US)

(73) Assignee: Katz Water Tech, LLC, Houston, TX (US)

( * ) Notice: Subject to any disclaimer, the term of this patent is extended or adjusted under 35 U.S.C. 154(b) by 137 days.

(21) Appl. No.: 16/112,537

(22) Filed: Aug. 24, 2018

(65) Prior Publication Data

US 2019/0060834 A1  Feb. 28, 2019

Related U.S. Application Data

(60) Provisional application No. 62/549,950, filed on Aug. 24, 2017.

(51) Int. Cl.
*B01D 61/02* (2006.01)
*E21B 43/36* (2006.01)
(Continued)

(52) U.S. Cl.
CPC ......... *B01D 61/025* (2013.01); *B01D 1/0058* (2013.01); *B01D 3/065* (2013.01);
(Continued)

(58) Field of Classification Search
CPC ..................................................... B01D 3/065
(Continued)

(56) References Cited

U.S. PATENT DOCUMENTS

| 3,048,373 A | 8/1962 | Bauer et al. |
| 4,051,810 A | 10/1977 | Breit |

(Continued)

FOREIGN PATENT DOCUMENTS

| CN | 201340212 | 11/2009 |
| EP | 0328178 | 1/1989 |

(Continued)

OTHER PUBLICATIONS

Mahmoud Shatat "Water desalination technologies utilizing conventional and renewable energy sources" International Journal of Low-Carbon Technologies, vol. 9, Apr. 6, 2012.

(Continued)

*Primary Examiner* — Nina Bhat
(74) *Attorney, Agent, or Firm* — Gary P. Katz; Katz Law Group, LLC

(57) ABSTRACT

An apparatus, system and method to purify produced water from a wellbore using energy. The apparatus comprises a wellbore with a wellhead attached to the wellbore; at least one energy recapture device connected to the wellhead of the wellbore with produced water, wherein the at least one energy recapture device captures fluid pressure of the production fluids including produced water; and at least one reverse osmosis membrane connected to the pressure recapture device wherein the at least one reverse osmosis membrane uses at least a portion of the fluid pressure from the energy recapture device to move a volume of the produced water through the reverse osmosis membrane to remove contaminates from the produced water to create purified water. The method comprises steps to use the apparatus and the system comprises a control panel that operates the at least one energy recapture device and the at least one reverse osmosis membrane in a coordinated manner.

20 Claims, 22 Drawing Sheets

(51) Int. Cl.
*B01D 61/06* (2006.01)
*B01D 3/14* (2006.01)
*C02F 9/00* (2006.01)
*B01D 1/00* (2006.01)
*E21B 43/34* (2006.01)
*C02F 1/44* (2006.01)
*B01D 3/06* (2006.01)
*B01D 61/10* (2006.01)
*E21B 43/24* (2006.01)
*B01D 61/04* (2006.01)
*C02F 1/00* (2006.01)
*C02F 1/16* (2006.01)
*C02F 1/463* (2006.01)
*C02F 103/10* (2006.01)
*C02F 1/68* (2006.01)
*E21B 43/26* (2006.01)
*B01D 61/08* (2006.01)

(52) U.S. Cl.
CPC .......... *B01D 3/145* (2013.01); *B01D 61/06* (2013.01); *B01D 61/10* (2013.01); *C02F 1/441* (2013.01); *C02F 9/00* (2013.01); *E21B 43/34* (2013.01); *E21B 43/36* (2013.01); *B01D 61/04* (2013.01); *B01D 61/08* (2013.01); *B01D 2311/2642* (2013.01); *B01D 2311/2649* (2013.01); *B01D 2311/2669* (2013.01); *B01D 2313/246* (2013.01); *B01D 2313/38* (2013.01); *C02F 1/001* (2013.01); *C02F 1/004* (2013.01); *C02F 1/16* (2013.01); *C02F 1/442* (2013.01); *C02F 1/444* (2013.01); *C02F 1/463* (2013.01); *C02F 1/68* (2013.01); *C02F 2103/10* (2013.01); *C02F 2209/005* (2013.01); *C02F 2209/01* (2013.01); *C02F 2303/10* (2013.01); *E21B 43/2406* (2013.01); *E21B 43/26* (2013.01)

(58) Field of Classification Search
USPC ............................ 210/638; 166/272.3
See application file for complete search history.

(56) References Cited

U.S. PATENT DOCUMENTS

| | | | |
|---|---|---|---|
| 4,189,379 A | 2/1980 | Finley | |
| 4,245,475 A | 1/1981 | Girden | |
| 4,311,012 A | 1/1982 | Finley | |
| 4,518,503 A | 5/1985 | Fermaglich | |
| 4,628,869 A | 12/1986 | Symsek et al. | |
| 4,643,832 A | 2/1987 | Iniotakis et al. | |
| 4,703,626 A | 11/1987 | Jensen | |
| 4,825,661 A | 5/1989 | Holtzapple et al. | |
| 4,957,624 A | 9/1990 | Peranio | |
| 5,932,074 A | 8/1999 | Hoiss | |
| 6,083,382 A | 7/2000 | Bird | |
| 6,313,545 B1 | 11/2001 | Finley et al. | |
| 6,325,586 B1 | 12/2001 | Loy | |
| 6,348,148 B1 | 2/2002 | Bosley | |
| 6,510,687 B1 | 1/2003 | Zaslavsky et al. | |
| 6,540,487 B2 * | 4/2003 | Polizos ............. | F04B 1/2042 417/65 |
| 6,559,554 B2 | 5/2003 | Alstot et al. | |
| 6,575,247 B2 | 6/2003 | Tolman et al. | |
| 6,656,327 B2 | 12/2003 | Salmisu et al. | |
| 6,712,882 B1 | 3/2004 | De Bie et al. | |
| 6,988,549 B1 | 1/2006 | Babcock | |
| 7,081,205 B2 | 7/2006 | Gordon et al. | |
| 7,132,759 B2 | 11/2006 | Alstot et al. | |
| 7,239,037 B2 | 7/2007 | Alstot et al. | |
| 7,251,944 B2 | 8/2007 | Holtzapple et al. | |
| 7,261,120 B2 | 8/2007 | Muller | |
| 7,306,724 B2 | 12/2007 | Gordon | |
| 7,329,962 B2 | 2/2008 | Alstot et al. | |
| 7,340,879 B2 | 3/2008 | Kamen et al. | |
| 7,392,848 B1 * | 7/2008 | Bader ................. | B01D 61/025 166/371 |
| 7,416,666 B2 | 8/2008 | Gordon | |
| 7,455,778 B2 | 11/2008 | Gordon | |
| 7,465,375 B2 | 12/2008 | Demers et al. | |
| 7,476,323 B2 | 1/2009 | Gordon | |
| 7,485,234 B2 | 2/2009 | Max | |
| 7,488,158 B2 | 2/2009 | Demers et al. | |
| 7,510,658 B2 | 3/2009 | Gordon | |
| 7,547,392 B2 | 6/2009 | Gordon | |
| 7,597,784 B2 | 10/2009 | Bednarek et al. | |
| 7,658,843 B2 | 2/2010 | Krock et al. | |
| 7,707,830 B2 | 5/2010 | Bednarek et al. | |
| 7,708,865 B2 | 5/2010 | Holtzapple et al. | |
| 7,731,854 B1 | 6/2010 | Herbst | |
| 7,785,448 B2 | 8/2010 | Owens | |
| 7,862,692 B2 | 1/2011 | Hung | |
| 7,898,102 B2 | 3/2011 | Alstot et al. | |
| 7,950,250 B2 | 5/2011 | Holtzapple et al. | |
| 7,967,946 B2 | 6/2011 | Ling | |
| 7,969,029 B2 | 6/2011 | Vitagliano | |
| 8,069,676 B2 | 12/2011 | Bhat | |
| 8,075,740 B2 | 12/2011 | Bailie et al. | |
| 8,110,116 B2 | 2/2012 | Mimura et al. | |
| 8,282,708 B2 | 10/2012 | Spiegelman et al. | |
| 8,282,790 B2 | 10/2012 | Demers et al. | |
| 8,307,887 B2 | 11/2012 | Bednarek | |
| 8,359,877 B2 | 1/2013 | Bhat | |
| 8,366,883 B2 | 2/2013 | Bednarek | |
| 8,404,113 B2 | 3/2013 | Shapiro | |
| 8,457,780 B2 | 6/2013 | Kharkover | |
| 8,505,323 B2 | 8/2013 | Bhat | |
| 8,506,762 B2 | 8/2013 | Bednarek | |
| 8,511,105 B2 | 8/2013 | Bhat | |
| 8,517,052 B2 | 8/2013 | Bednarek | |
| 8,534,062 B2 | 9/2013 | Kamen et al. | |
| 8,535,538 B1 | 9/2013 | Keeling | |
| 8,562,791 B2 | 10/2013 | Riley et al. | |
| 8,584,472 B2 | 11/2013 | Bhat | |
| 8,718,827 B2 | 5/2014 | Kamen et al. | |
| 8,828,192 B2 | 9/2014 | Demers et al. | |
| 8,833,437 B2 | 9/2014 | Singh et al. | |
| 8,888,963 B2 | 11/2014 | Kamen et al. | |
| 8,926,731 B2 | 1/2015 | Spiegelman et al. | |
| 9,005,393 B2 | 4/2015 | Owens | |
| 9,037,310 B2 | 5/2015 | Kamen et al. | |
| 9,156,712 B2 | 10/2015 | Nicoll | |
| 9,157,332 B2 | 10/2015 | Hanna | |
| 9,186,598 B2 | 11/2015 | Bednarek et al. | |
| 9,259,665 B2 | 2/2016 | Norton et al. | |
| 9,278,868 B2 | 3/2016 | Kamen et al. | |
| 9,308,467 B2 | 4/2016 | Kamen et al. | |
| 9,309,104 B2 | 4/2016 | Kamen et al. | |
| 9,328,624 B2 | 5/2016 | Finley | |
| 9,410,191 B2 | 8/2016 | Alvarez, Jr. et al. | |
| 9,416,031 B2 | 8/2016 | Escher et al. | |
| 9,440,162 B2 | 9/2016 | Dighe | |
| 9,593,809 B2 | 3/2017 | Larocque et al. | |
| 9,604,858 B2 | 3/2017 | Kamen et al. | |
| 9,610,518 B2 | 4/2017 | Bhat | |
| 9,612,058 B2 | 4/2017 | Singh et al. | |
| 9,617,167 B2 | 4/2017 | Kamen et al. | |
| 9,630,862 B2 | 4/2017 | Escher et al. | |
| 9,726,002 B2 * | 8/2017 | Heng ...................... | E21B 43/34 |
| 9,802,836 B2 | 10/2017 | Thiers | |
| 9,802,845 B2 | 10/2017 | Thiers | |
| 9,834,454 B2 | 12/2017 | Frolov et al. | |
| 9,937,435 B2 | 4/2018 | Kamen et al. | |
| 9,969,638 B2 | 5/2018 | Govindan et al. | |
| 10,005,001 B2 | 6/2018 | Kamen et al. | |
| 10,155,174 B2 | 12/2018 | Kamen et al. | |
| 10,179,298 B2 | 1/2019 | Bednarek et al. | |
| 10,301,198 B2 * | 5/2019 | St. John .................. | C02F 1/445 |
| 10,343,118 B2 * | 7/2019 | Henthorne ............... | C02F 1/44 |
| 10,385,851 B2 | 8/2019 | Demers et al. | |
| 10,457,567 B2 | 10/2019 | Kamen et al. | |

(56) References Cited

U.S. PATENT DOCUMENTS

| | | |
|---|---|---|
| 10,507,403 B2 | 12/2019 | Bednarek et al. |
| 10,508,044 B2 | 12/2019 | Wilson |
| 2003/0173784 A1 | 9/2003 | Jones et al. |
| 2004/0074757 A1 | 4/2004 | Owens |
| 2004/0159536 A1 | 8/2004 | Kamen et al. |
| 2005/0000572 A1 | 1/2005 | Muller |
| 2005/0016828 A1 | 1/2005 | Bednarek et al. |
| 2005/0061493 A1 | 3/2005 | Holtzapple |
| 2005/0072662 A1 | 4/2005 | Holtzapple et al. |
| 2008/0011681 A1 | 1/2008 | Gordon |
| 2008/0296215 A1 | 12/2008 | Simon |
| 2009/0020481 A1 | 1/2009 | Bailie et al. |
| 2009/0188861 A1* | 7/2009 | Higgin .................. B01D 61/025 210/636 |
| 2010/0018921 A1* | 1/2010 | Ruehr .................. B01D 61/025 210/636 |
| 2010/0068578 A1 | 3/2010 | Katano |
| 2010/0326084 A1 | 12/2010 | Anderson |
| 2011/0198285 A1 | 8/2011 | Wallace |
| 2011/0259822 A1 | 10/2011 | Al-Jii |
| 2012/0048715 A1 | 3/2012 | James |
| 2012/0090978 A1 | 4/2012 | Bailie |
| 2012/0118722 A1 | 5/2012 | Holtzapple et al. |
| 2012/0280411 A1 | 11/2012 | Norton et al. |
| 2012/0292176 A1 | 11/2012 | Machhammmer et al. |
| 2012/0325290 A1 | 12/2012 | Gizara |
| 2013/0118987 A1 | 5/2013 | Vermurlen et al. |
| 2013/0133250 A1 | 5/2013 | Chan |
| 2013/0213880 A1* | 8/2013 | Hirozawa .............. B01D 71/48 210/483 |
| 2014/0374235 A1 | 12/2014 | Demers et al. |
| 2015/0027952 A1* | 1/2015 | Schmidt .................. F03D 9/17 210/652 |
| 2015/0036254 A1 | 2/2015 | Emert et al. |
| 2015/0083652 A1 | 3/2015 | Hawks |
| 2015/0129410 A1 | 5/2015 | Govindan et al. |
| 2015/0191380 A1 | 7/2015 | Glass |
| 2015/0143806 A1 | 12/2015 | Katz |
| 2017/0036140 A1 | 2/2017 | Enzenhofer |
| 2018/0362830 A1* | 12/2018 | Eluru .................. C09K 8/5758 |
| 2019/0060834 A1 | 2/2019 | Katz |

FOREIGN PATENT DOCUMENTS

| | | |
|---|---|---|
| EP | 959048 | 2/2000 |
| JP | 2013252473 | 12/2013 |
| WO | 2017/008814 | 1/2017 |

OTHER PUBLICATIONS

Karan H. Mistry, "An improved model for multiple effect distillation", Taylor & Francis Online, U.K., Jul. 24, 2012.

Lucy Mar Camacho, "Advances in Membrane Distillation for Water Desalination and Purification Applications", MDPI.com, Jan 25, 2013.

R.S.Silver, "An assessment of multiple effect boiling distillation in relation to multi-stage flash distillation", Elsevier, The Netherlands, Sep. 1971.

M.J. Burley, "Analytical comparison of the multi-stage flash and long-tube vertical distillation processes", Elsevier, The Netherlands, Aug. 3, 2001.

O.A.Hamed, "Thermal assessment of a multiple effect boiling (MEB) desalination system", Elsevier, The Netherlands, Nov. 7, 2001.

* cited by examiner

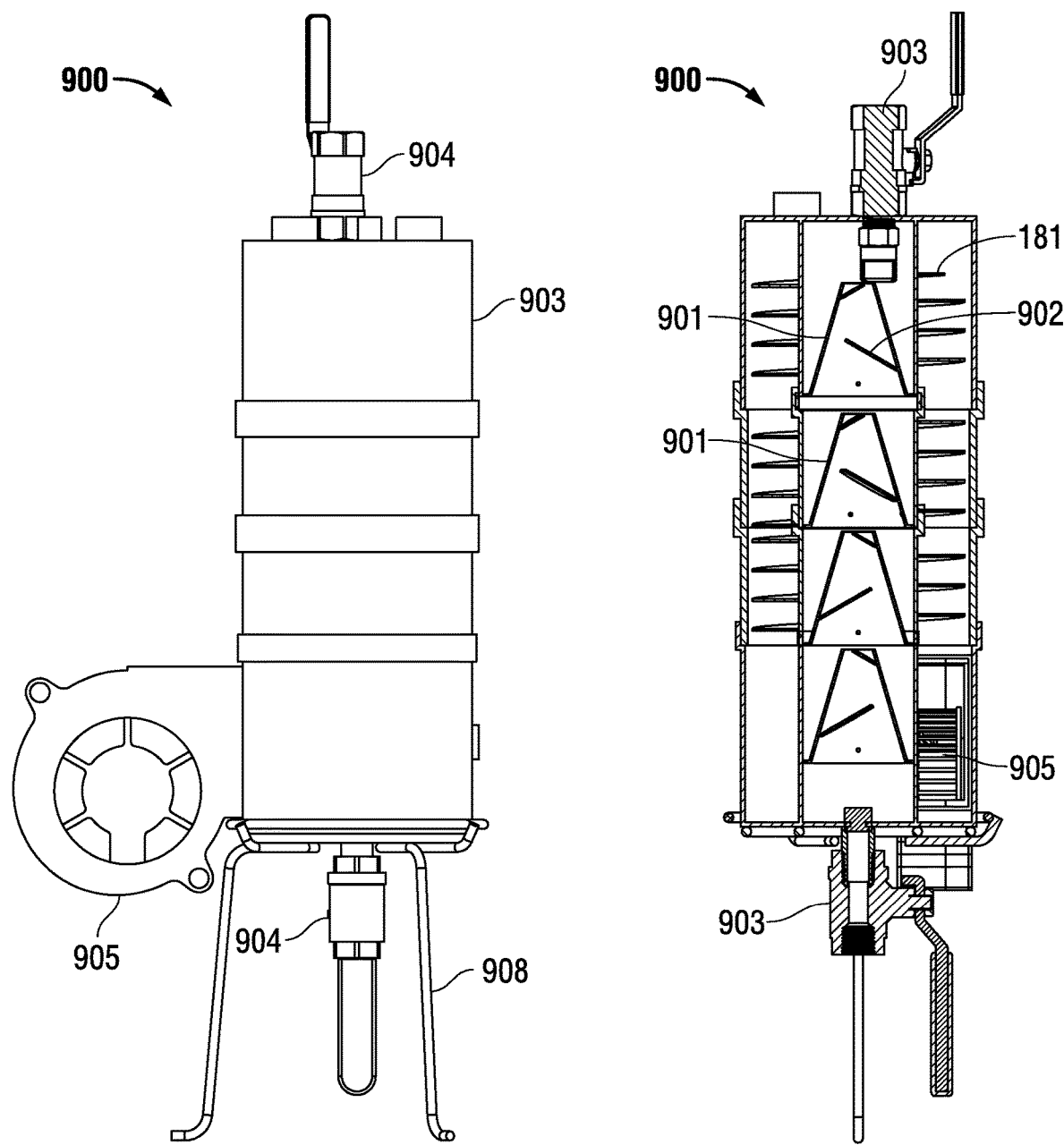
FIG. 22b  FIG. 22c

APPARATUS SYSTEM AND METHOD TO SEPARATE BRINE FROM WATER

CROSS REFERENCE TO RELATED APPLICATIONS

This Non-Provisional patent application claims priority to the U.S. patent provisional application having the Ser. No. 62/549,950, filed Aug. 24, 2017.

TECHNICAL FIELD

The present disclosure relates generally to devices and methods for separating contaminates from a fluid. More particularly, the present disclosure relates to devices and methods for using physical processes such as, heat or pressure to separate fluids from contaminates in the fluid.

BACKGROUND

This section is intended to introduce the reader to various aspects of art, which may be associated with embodiments of the present invention. This discussion is believed to be helpful in providing the reader with information to facilitate a better understanding of techniques of the present invention. Accordingly, these statements are to be read in this light, and not necessarily as admissions of prior art.

Water, energy and industrial activity have a symbiotic relationship. Energy is needed to move water to people, and for businesses and industry to operate. Conversely, water, is necessary to produce energy and run business and industry.

Increased population growth and industrialization is causing certain geographic regions to exhaust renewable fresh water. To solve this problem methods and devices have been created to purify contaminated water to create fresh water for industrial, agricultural and human consumption. Currently, the most effective process utilizes reverse osmosis and membrane technology to remove contaminates and creates purified fresh water. The amount of equipment and energy required makes this technology costly to build and to operate. The idea of using steam for thermal distillation to produce purified water is not novel. There are devices that can use directed energy to remove purified steam from contaminated fluids such as, water. Others have proposed combining steam generation for power and other uses to purify water. The problem has been the additional costs for additional equipment and the loss of efficiency has made these processes uneconomical. Accordingly, there is a need to maximize the efficiency of existing technology to efficiently and economically remove contaminates from contaminated water.

In the past, desalination plants have been proposed to resolve the fresh water resources problem. Reverse osmosis ("RO") plants have been delivering desalinated water for decades to regions with limited water resources. However, the high cost to build and operate the RO plants historically made the plants uneconomical for most regions. Accordingly, the major issue of RO technology is that it costs too much. The RO process requires significant energy to force salt water against polymer membranes that have pores small enough to let fresh water through while holding salt ions back. RO cannot typically handle high Total Dissolved solids (TD) fluids and attempts to modify RO to handle high TDS have been largely unsuccessful.

Steam from water or vapor from fluids is used for many purposes including heating, cooling and to power many devices including steam turbines to produce electricity. One problem with using unpurified water is that impurities in the fluids, usually salt in water, causes corrosion, scaling and other issues. This corrosion often requires the use of very expensive material that is highly corrosion resistant. In addition, excessive corrosion requires costly replacement of parts and additional labor charges increasing the cost of utilizing steam. Contaminates in fluids will raise the boiling temperature of the fluids requiring more energy to produce steam, decreasing the efficiency of steam production and increasing costs. One solution is to use fresh water with low amounts of contaminates. The problem with fresh water is that fresh water is needed for agricultural and human consumption. In certain locations, there is not enough fresh water to satisfy human and agricultural consumption which can make the use of fresh water for industry problematic and expensive. The problem with removing contaminates from fluids is the equipment and processes required are very expensive because of the extensive amount of equipment needed and the amount of energy required to utilize the equipment. Accordingly, there is a need for apparatuses and methods to efficiently and cost effectively remove contaminates from liquids during industrial operations such as, steam generation.

Another issue with using water with impurities is scaling. Scaling is when contaminates such as salt precipitates out of a fluid and attaches to equipment. Too much scaling can cause a plant or equipment to fail. Scaling becomes more prevalent as temperature increases and contaminates increase. For this reason, many plants that require water do not use alternatives to fresh water such as salt water as any significant increase in heat or salinity causes scaling issues.

Oil and gas reservoirs are subterranean formations containing crude oil and/or natural gas. Typically, Oil and gas reservoirs have a natural water layer, called formation water, that, being denser, typically lies under the hydrocarbons. Oil reservoirs typically contain large volumes of water, while gas reservoirs tend to produce only small quantities. To maximize hydrocarbons recovery, additional water is usually injected into the reservoirs to help force the oil/gas to the surface. Both formation and injected water are eventually produced along with the hydrocarbons and, as an oil field becomes depleted, the amount of produced water usually increases as the reservoir fills with injected water. Such water is called "produced water" throughout the industry.

Produced water is typically removed from the oil, but still contains several undesirable components such as paraffins, oils, other hydrocarbons and organic substances, muds, salts, solids and the like. Oil may be present in different amounts, depending on the type of oilfield and other factors, from a few hundred parts per million (ppm) to large amounts such as up to 5% by volume. The contaminated produced water must be disposed of in some manner. It can be treated and released as surface water or it can be injected back into the oil or gas reservoir. Recycling produced water by reinjecting it into the oil/gas reservoir or another wellbore is typically done. However, the processing required to render produced water fit for reinjection is costly and has environmental issues such as aquifer contamination and increased seismic activity.

After extraction from reservoirs hydrocarbons are also washed with water to remove or reduce the high content of salts. The amount of such water, called "washing water" may exceed the amount of produced water. Washing water may contain significant number of hydrocarbons and generally must be disposed of in some manner or treated.

Several technologies have been disclosed and/or tried to various extents to treat waste water in extraction installations of oil and gas reserves. Such technologies include membrane filtration technology, electrocoagulation with membrane technology, extraction with supercritical fluids and treatment with ozone. For example, U.S. Patent Application No. 2007/0056913 disclose ceramic membranes for ultra- and nano-filtration for oilfield produced water.

While present technologies can produce an acceptably clean product on a laboratory size scale, they have generally proved to be uneconomical when scaled up for use in commercial installations. For example, U.S. Patent Application No. 2007/0095761 discloses a method for preparing acidic solutions of activated silica and polyvalent metal salt for water treatment. This application discloses using activated silica in connection with sewage treatment plants located in urban areas to remove disinfection byproducts (DBP) and DBP precursors.

Similarly, U.S. U.S. Pat. No. 6,077,439 discloses using activated silica to remove metals from industrial waste streams, in particular heavy metals toxic salts. This application is silent on removing oil or other hydrocarbons from water.

Drilling fluids are used extensively in oil and gas drilling industry to maintain density, lubrication and cooling of the wellbore drilling equipment. Drilling fluids can be water based, oil based or composite based. Water based drilling fluid sometimes referred to as mud is typically produced by adding salts to brine or fresh water. The creation of drilling fluids requires the use of fresh water and brine water resources which can stress ecosystems or the water resources or regions. Accordingly, there is a need to recycle the produced water to reduce the amount of freshwater and brine water that is taken form the local ecosystems to support drilling operations. The type and amount of salts chosen is based on the desired density and other properties such as clay reaction, stability and corrosion.

Due to the difficulties listed above and of the increasing awareness about environmental issues, there is a need for a water treatment process that makes produced water and/or washing water acceptable for surface discharge, industrial, agricultural and municipal use. Preferably, such an improved process will be capable of cleaning the waste waters constantly and continuously during the oil/gas extraction operations. Most preferably, the process should be able to recycle as much as possible the waste streams to avoid or eliminate the use of disposal wells or other wastefully or environmentally dangerous disposal methods. A need also exists for such a process which produces an acceptable product at a cost which is more economical than the existing technologies presently in use at oil and gas fields. This invention satisfies that need.

SUMMARY

In one embodiment, an apparatus is disclosed. In this embodiment, the apparatus comprises at least one device to purify the water wherein a purified component is separated from a saline component; wherein the device can achieve a specific density of the saline component.

In a second embodiment, a method is disclosed. In this embodiment, the method to purify contaminated fluid comprises connecting a device to treat the produced water form a wellbore; removing the solid contaminates form the produced water; separating a purified component form a denser saline component; controlling the purification to obtain a desired density of the saline component.

In a third embodiment, a system is disclosed. In this embodiment, the system comprises an apparatus comprising at least one device to purify the water wherein a purified component is separated from a saline component; wherein the device can achieve a specific density of the saline component; at least one energy recapture device and the at least one reverse osmosis membrane in a coordinated manner.

The foregoing summary is not intended to summarize each potential embodiment or every aspect of the present disclosure.

BRIEF DESCRIPTION OF DRAWINGS

The foregoing and other advantages of the present technique may become apparent upon reading the following detailed description and upon reference to the drawings in which:

FIG. 22b illustrates the exterior of a modified heat exchanger to separate purified vapor from contaminates;

FIG. 22c illustrates a cross section of FIG. 22b showing slanted baffles that can create multiple chambers;

DETAILED DESCRIPTION

In one embodiment, this invention quickly and efficiently uses energy such as, temperature, pressure from the produced water at a wellhead to purify water using membrane filters through processes such as, nano-filtration and/or reverse osmosis to remove impurities from the produced water. Alternatively, embodiments of this invention can be used to purify contaminated water from agricultural, industrial, municipal and individual waste water usage.

Figure 1:
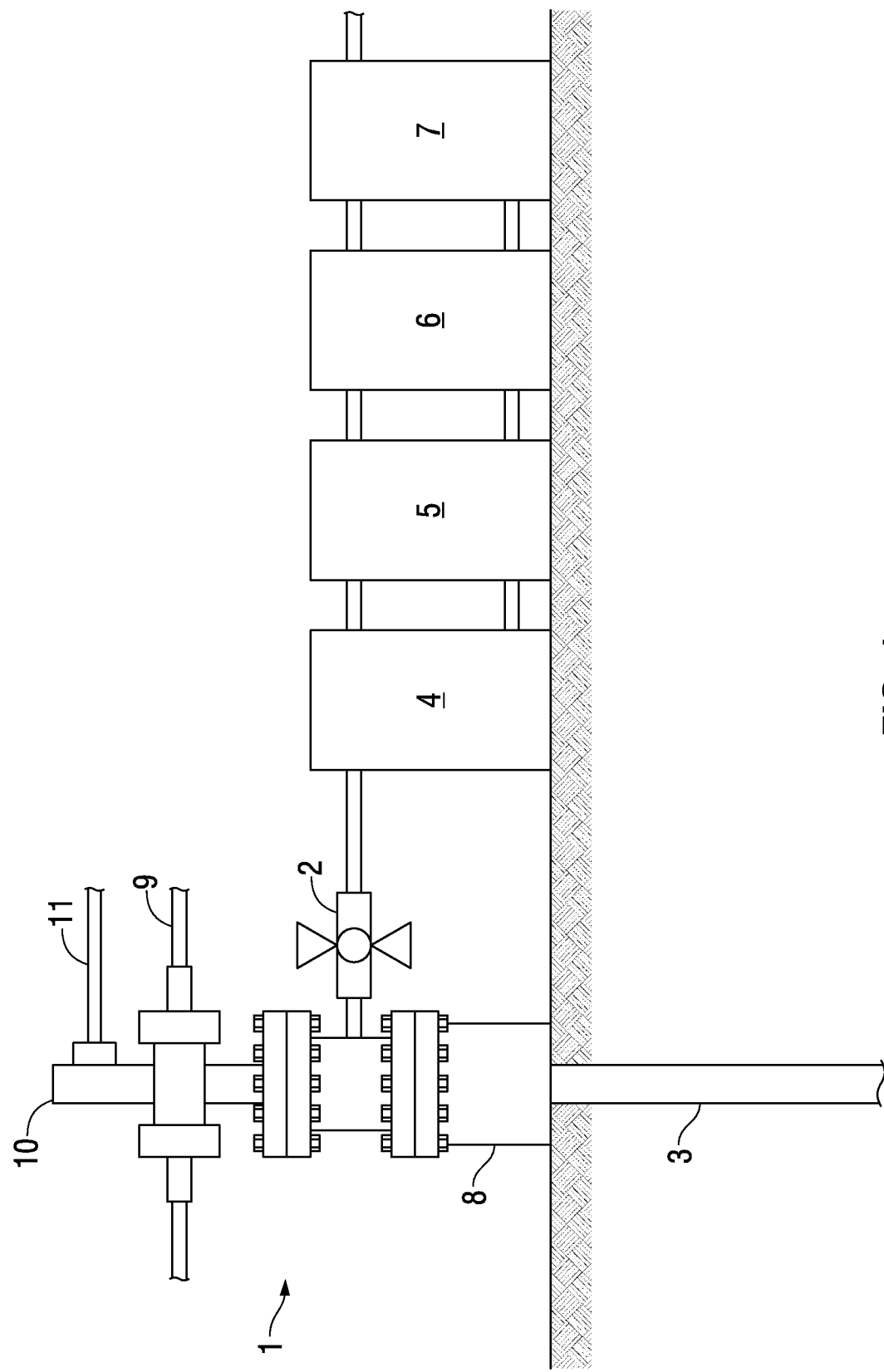
FIG. 1 illustrates a schematic of a reverse osmosis purification unit adjacent to a wellbore.

As shown in FIG. 1, this embodiment typically has several units or steps. These units include the wellhead 1 with at least one valve 2 and preferably a plurality of valves for injection or removing fluid from the wellbore 3. The wellhead also typically contains a casing head 8 blowout preventer (BOP) 9 flow tree 10 and flow line 11 for hydrocarbons. In some embodiments, an energy recovery device 4 connected to the wellbore for capturing the pressure of the produced fluids and transferring the pressure to one or more reverse osmosis membranes. Filtration devices 5 such as Nano filtration or electrical coagulation or flocculation for removing suspended solids and other contaminates from the produced waters can also be connected to the energy recovery device 5 and the reverse osmosis device. Alternatively, or in addition, three phase separators can be used as part of the filtration devices 5. Connected to both the energy recovery device 4 and the filtration device 5 is the reverse osmosis device 6 or thermal device for removing dissolved contaminates from the water. If necessary, a post treatment device 7 finishes the water with chemicals, or preferably without chemicals to obtain the desired water properties. As discussed below, the devices in FIG. 1 can be in series, parallel or connected in multiple combinations or orders to achieve favorable operational conditions. All possible equipment combinations and order of flow paths are intended to be within the scope of the invention. Additional thermal distillation devices or reverse osmosis can be attached to the wellhead and/or pressure recovery device or heat recovery device to take advantage of the heat from the produced water or waste heat from other processes at the wellsite such as, flare gas.

Figure 1A:
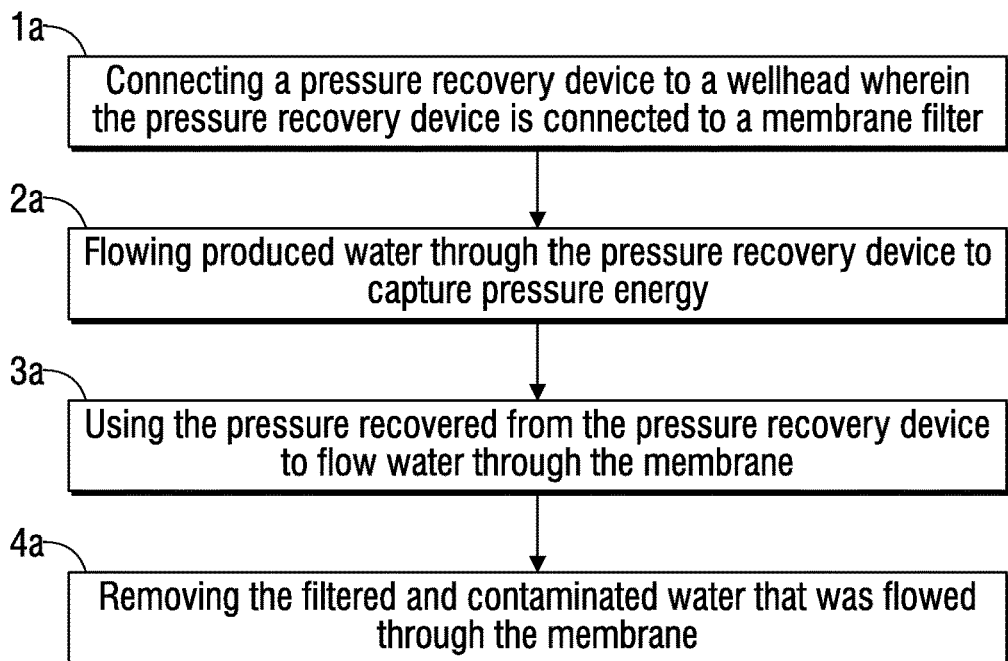
FIG. 1a is a flow chart of the process steps in one embodiment.

FIG. 1a shows the steps in one embodiment. First, a pressure recovery device is connected to a wellhead wherein the pressure recovery device is connected to a membrane filter 1a. Second, produced water is flowed through the pressure recovery device to capture pressure energy 2a. Third, the pressure recovered from the pressure recovery device is used to flow water through a membrane 3a. Fourth, the filtered and contaminated water that was flowed through the membrane is removed.

Figure 1B:
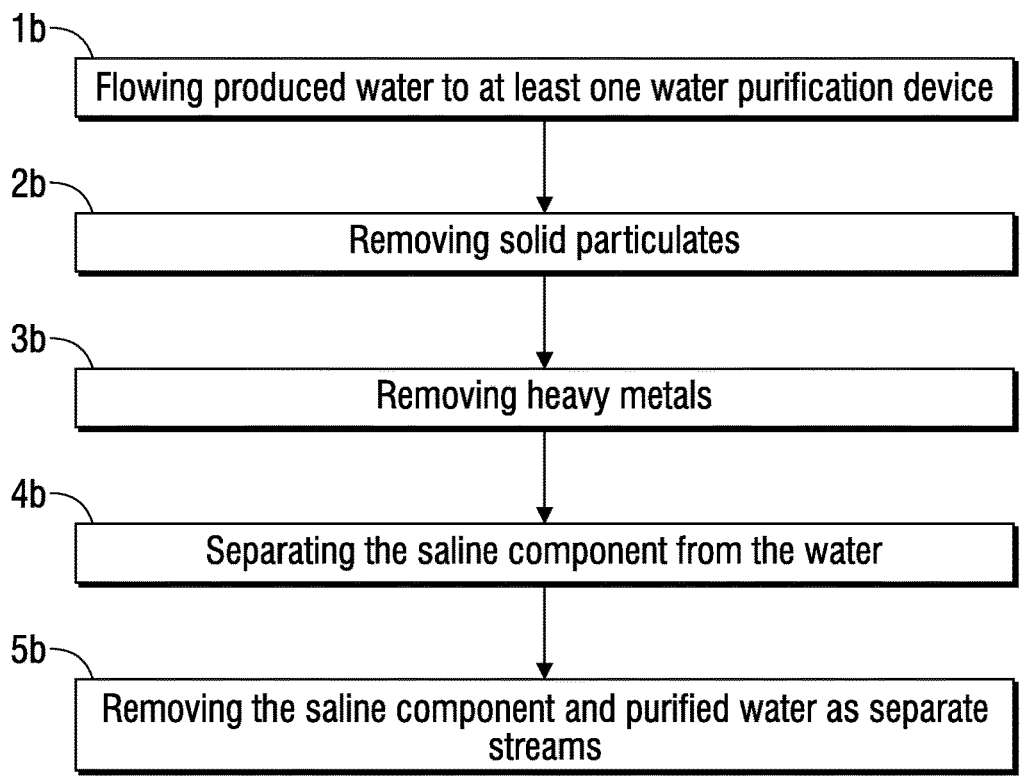
FIG. 1b is a flow chart of the process steps in a second embodiment.

FIG. 1b illustrates the steps in another embodiment, in this embodiment, produced water is flowed through at least one water purification device 1b. solid particulates are removed using filters or some other removal device such as electrocoagulation 2b. Heavy metals are then removed 3b using a removal device that uses gravity or electrical current or chemical precipitation or other removal technology. The saline component is then separated for, the water 4b. The saline component and purified water are then removed as separate streams, filtered and contaminated water 5b.

While embodiments described herein are predominately connected to oil and gas production devices, it is envisioned that the pressure recapture system can be connected to any industrial process with excess water pressure to obtain water purification. Any excess pressure can be combined with excess heat to achieve synergistic benefits as described below. All disclosed uses are intended to be included in this invention.

Energy Recovery Devices:

Energy recovery devices ("ERD") can recapture energy expended by pumping or otherwise pressurizing water. This technology recovers energy from the pumping of water though industrial and municipal water distribution systems.

ERD for water reverse osmosis ("WRO") are often defined as devices that recover energy from the reject effluent such as, brine stream in sea water or brackish desalination facilities, and reintroduce this energy into the desalination process for reducing the overall energy consumption of the facility. The three main classes of ERD in use today in most of the WRO facilities worldwide are often referred to as Class I, Class II or Class III devices.

Class I include the Francis Turbine and Pelton Wheel, designed as shaft assisting mechanisms, and feeding the recovered energy directly to the High-Pressure Pump (HPP). The Pelton Wheel device has a maximum reported efficiency of 80-85% and has been used for decades in use in WRO plants.

Class II are referred to as hydraulic turbochargers (HTCs) or turbochargers further pressurize the seawater feed after it has passed the high-pressure pump using rejected stream pressure. Turbochargers are used in some SWRO plants where low energy costs are not encouraging plant operators to install highly efficient energy recovery devices. With reported efficiencies of 80%, these devices compete with Class III devices in areas where energy costs are low due to their low overall costs including capital, operational, and maintenance costs.

Class III are devices that use the principle of positive displacement often referred to as isobaric pressure exchangers. The two main subclasses of devices in the third class are direct pressure feed and reciprocating pistons. Direct pressure feed uses the direct contact between brine and feed water to transfer energy. Reciprocating pistons transfers the brine pressure into mechanical action, which drives pistons to pressurize the feed.

Figure 2:
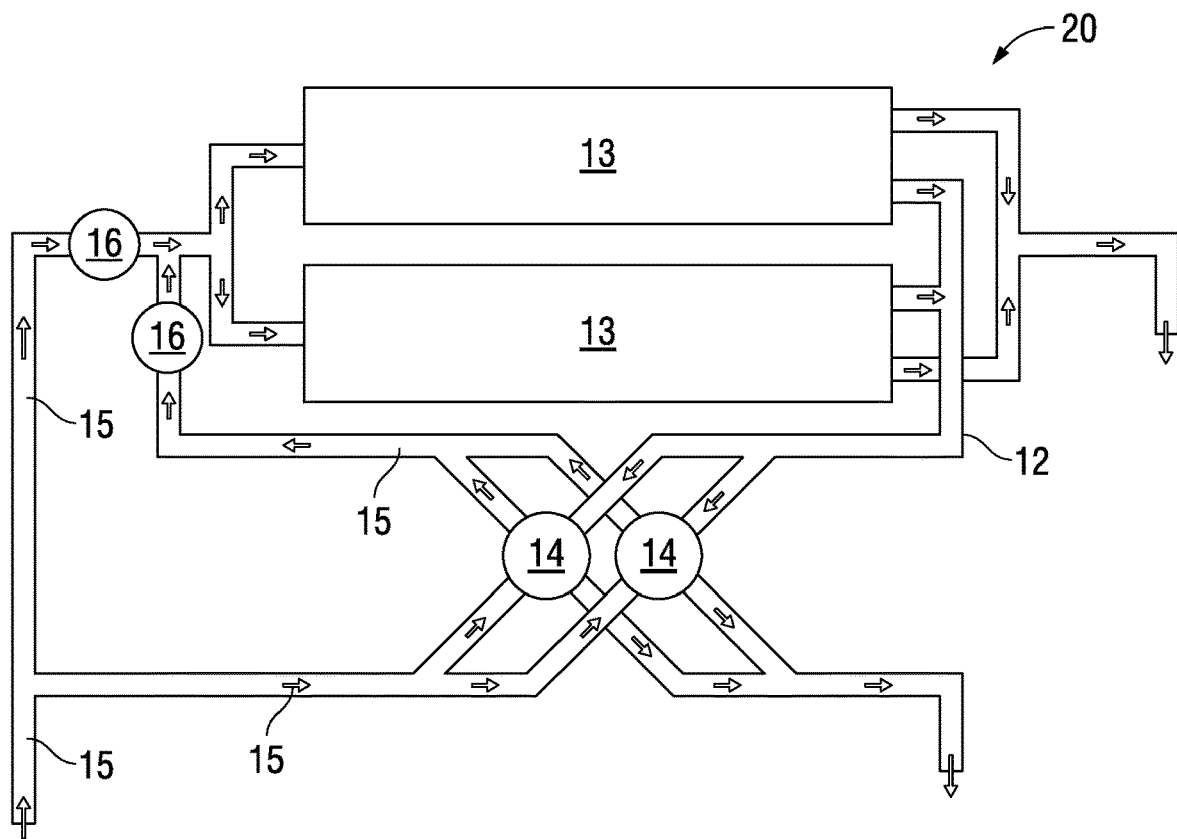
FIG. 2 is a schematic of a containerized energy recovery device embodiment.

Most recently, dual work exchangers have achieved efficiency rates of up to 97 percent. As shown in FIG. 2, the work exchanger system 20 directs the high-pressure brine 12 exiting the RO membranes 13 to work exchanger vessels 14 filled with contaminated water to pressurize the influent produced water or feed water 15. A small recirculating pump on the work exchanger vessel 16 boosts the pressure of the water exiting the work exchanger vessel to equal the main feed pump 17 pressure and joins the flow to the RO membranes 13. The effluent brine leaves through tubing for discharge or recycling and the purified water leaves through tubing for post treatment or to the end users such as, consumers. For example, Flowserve markets a product called CALDER™ Dual Work Exchanger Energy Recovery (DWEER™) which have been successfully used in many plants and can be adapted to work in the embodiments described herein.

ERD can be engineered to be inside the reverse osmosis skids or containers or can be designed to be in a stand-alone container where the feed water and pressurized water is piped into the containers. In one embodiment, the pressure exchanger tube would be inside a shipping container and each pressure exchanger would be connected to both the feed water line connected to the wellhead, the reject brine effluent line and the inlets and outlets of the reverse osmosis membranes. Furthermore, ERD can be engineered into the inlets and outlets on the wellhead systems to take advantage of head and pressure. In one embodiment, ERD could be used in the discharge system, if conditions are favorable for pressure recapture.

Filtration Device and System

The filtration devices and/or system can utilize known filters and pumps in a specific orientation to achieve preferred operation conditions. For example, U.S. Patent application No. 2011/0120928 disclosed the benefit of combining known different types of pre-filtering devices before running water through the reverse osmosis membranes. U.S. Patent No. 2011/0120928 is hereby incorporated by reference.

Figure 3:
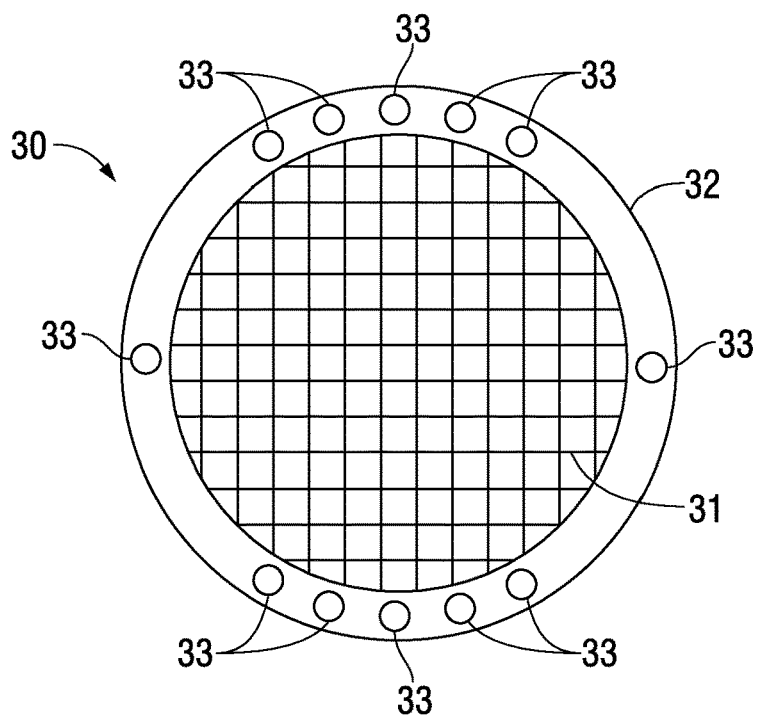
FIG. 3 is a schematic of a screen filter device.

In one embodiment, the filters should operate in at least two segments. The first segment can comprise the rough or coarse filters which should filter solid contaminates at least 2 millimeters in length and up to 10 millimeters in length depending on the amounts of suspended solids, amounts of aquatic life (if any), water temperature and system operational conditions and other requirements. In the example shown in FIG. 3, the rough filter 30 is a wire mesh 31 connected to an exterior heavy metal frame supported by structural supports which can be attached through bolts 33 (or other connection devices) to the outlets of a wellhead or other wellbore device. The wire mesh filters can also be created through interwoven wires in a chain-link manner or with screening created through punched plates. For example, type 304 stainless steel could be punched or woven into the desired sized screen filters. The course filters can be connected to several wire meshes and backflow devices to clean the trapped sediments. Additional finer wire mesh filters can be added, as needed. In on embodiment, the produced water is flowed under pressure through several filters before entering the energy recapture device. In an alternative embodiment, the produced water is first flowed through the energy recapture device to capture most of the pressure and then flowed through the filters described herein. The energy captured by the energy recapture device can be used to flow the produced water through the filters as well as reverse osmosis membranes. The produced water is then flowed to the energy recovery device or second stage filtration.

A second set of filters or filtering stage can be utilized to filter the sediments in the water to a size of at least 20 microns and up to 250 microns. In one embodiment, high throughput spin or centrifugal filters would be used to efficiently filter large volumes of water, these filters comprise: an inlet, a plurality of disk filters or helical scrolls that spin, and at least two outlets. One outlet is for the filtered water and a second outlet or drain is for the backwashed water that would remove the filtered sediments and/or marine life by feeding the discharge or backwash directly into the container, body of water, or into a discharge system, as described later.

Figure 4:
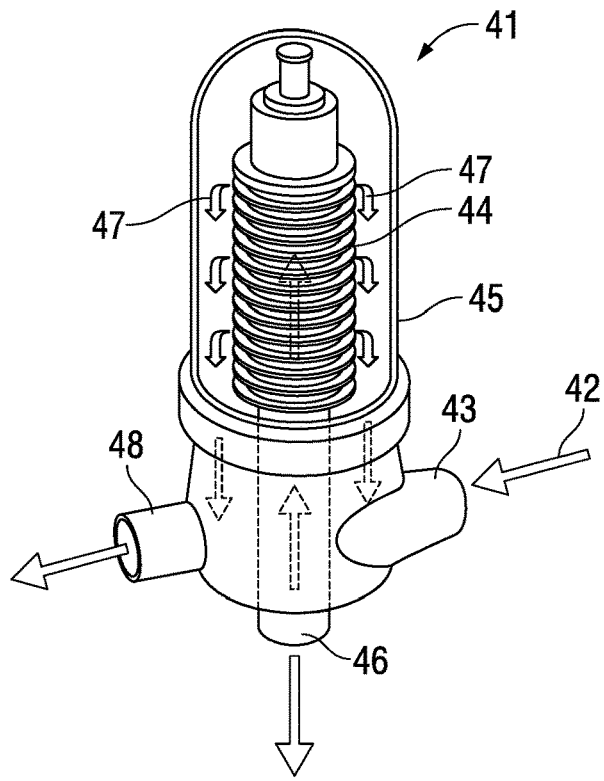
FIG. 4 is an example illustration of a spin filter embodiment.

FIG. 4 is an example of a spin filter 41 and it is understood that other suitable filters can be used or modified to be used in this example with the benefit of the disclosure herein. In the example shown in FIG. 4, feed or contaminated water 42 from either the rough filter or wellhead is flowed through the inlet 43 into a hollow stack disk device 44 inside the filter walls 45. The spinning causing compression of the microngrooved disks forcing water to flow between the grooves and traps of the stacked disks. Filtered water that exits the disks is flowed through outlet 46 wherein sediment particles fall (arrow 47) due to gravity differences and can be flowed or backwashed through outlet 48. Alternatively, centrifugal filters can be used as is known in the art. These filter work by flowing water into the filter where discs or bowls cause the water to swirl around the inside of a cylinder. The centrifugal force causes the sand particles to move towards the outer edge of the bottle, which slide slowly down the side of a reservoir below and the water flow up through a separate outlet above. This discharge from the centrifugal filter or spin filter is then sent to for final filtration and/or treatment. In one embodiment flow paths can be manually or automatically reversed for backwashing and other cleaning and maintenance operations.

For example, filters made by Amiad Water Systems LTD from Israel would be employed. The SpinKlin® Super Galaxy High Flow filter would clean up to 100 microns. These filters are made of polymeric material such as, polypropylene and are self-cleaning with automated backwashing and are designed for water treatment plans. A plurality of these filters can be controlled by a control system described further below, to create an efficient system to handle the inlet water to meet the demands of the desalination plant. These pumps could be placed in a parallel formation or can be stacked as preferred to be oriented either horizontal, vertically or combinations thereof. The purpose of the stacking and orientation to get the most favorable operational conditions including but not limited to amount of purification, pumping requirements, efficiency, reducing piping and electrical lines, gradient of tubing, amount of pressure recapture, power requirements, and combination thereof.

Figure 5:
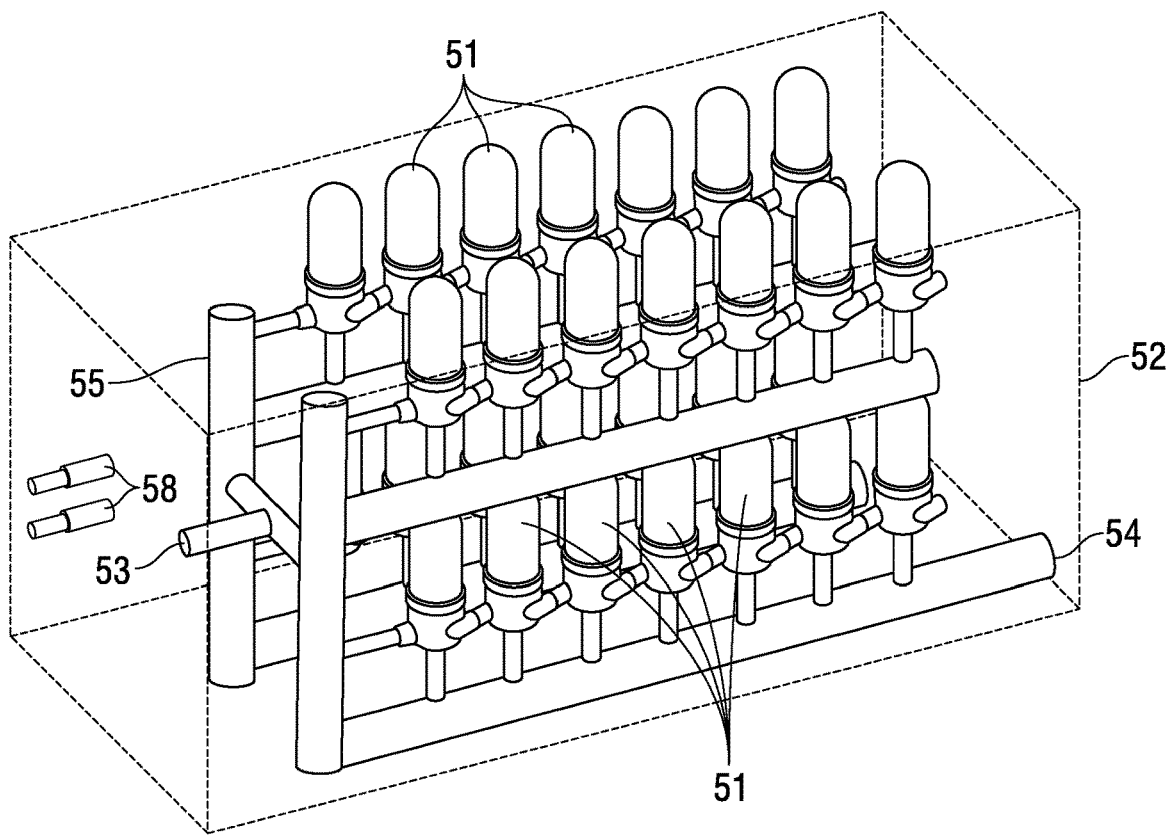
FIG. 5 is a cross-section of a side elevational view of multiple coarse spin filters that are housed in a container.

FIG. 5 is a side view of parallel stacked spin filters 51 or centrifuges in a row inside a shipping container 52 designed to house the spin filters 51. The spin filters or other filters can alternatively be place on a skid or other device. As shown in FIG. 5, the spin filter 51 are aligned vertically in a horizontal row inside the container. Depending upon the size of the spin filters and container, multiple rows, levels, or floors in the skid can used with a plurality of aligned spin filters 51 on each floor or alternatively, in each skid (not shown). The spin filters are shown with inlet line 52 and solid waste discharge outlets 53 lines. An additional purified outlet line 54 flows the purified water to the next stage. Typically, the spin filters run in parallel wherein water is run through only one set of filters. However, valves can create redundancy by allowing water flow that has exited a poor or broken filter to be recycled though at least one additional spin filter. An outside crane or overhead crane can install, move or remove containers comprising a plurality of filters, or individual filters, as necessary. Additional power connections 74 can provide power to the spin motors or alternatively, internal batteries (not shown) can be used for redundancy. Specifically, quick connects and disconnects would be used to allow for emergency disconnects or quick connections and disconnects for the inlets, outlets and power connections for quick removal and/or maintenance. Alternatively, the spin filters can be mounted on skids stacked vertically, horizontally or combinations thereof, to obtain a favorable configuration by making it easier to stack and remove sections for maintenance considering spacing constraints.

Redundancy would be built into the system by having valve loops or recirculation tubing. In the event a device such as, a filter fails, the system could automatically recirculate the water flow not properly filtered back to a working device or filtration section using the valve loops and/or recirculation tubing. The redundancy can be built into the containers, outside the container or combinations thereof. The parallel arrangement along with the vertical and horizontal stacking allows the filtering system to be efficient by minimizing the length of piping and/or spacing it takes to get the water to reverse osmosis equipment or plant. This reduction of piping also reduces the pumping load requirements resulting in less energy costs.

In another embodiment, gravity filters can be used to pre-filter sediments as a second stage filter or an additional stage. Gravity filters are commonly used in applications where liquid-solids separation is required in a variety of different applications for pre-treat and/or finish water treatment. Gravity filters can incorporate various types of media such as sand, anthracite, greensand, and carbon (including activated carbon) to meet each plant's water treatment needs. In addition, gravity filters allow for easy inspection during operation and typically have a smaller profile. Quartz sand, silica sand, nut shells, anthracite, limestone, coal, garnet, magnetite, or organic matter, and other materials may be used as filtration media in gravity filters. Silica sand and anthracite are the most commonly used types. Typically, an underdrain system removes the filtered water and a backwash system periodically clean the gravity filter. The three main classifications of gravity filters are single-media, dual-media and multi-media gravity filters. Persons skilled in the art will recognize the benefits of using certain types or combinations of filtration media to obtain favorable properties with the benefit of the disclosures herein.

Figure 6:
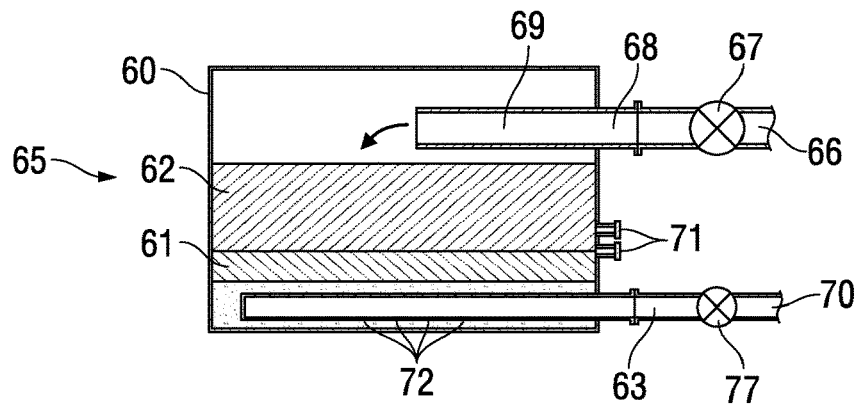
FIG. 6 is a cross-section of a side elevational view of a containerized media filter embodiment.

In one embodiment, a gravity filter is containerized to allow for quick insertion and removal of the gravity filters. FIG. 6 illustrates a gravity filter that has been modified for a container. As shown in FIG. 6, the gravity filter 65 has been engineered to fit inside a standard shipping container as a non-limiting example. Water is pumped though piping 66 passed valve 67 into inlet 68 on the outside wall of the sipping container 60. Water enters the media filter onto wash trough 69 and then flows onto and through the filter media 62 which filters sediments in the water. In the example shown in FIG. 6 only one media is used but two or more media can be used, as needed to obtain favorable operating conditions. After the water through gravity percolates through the media 62, the water then flows through gravel bed 61 into the underdrain pipes 72 leading to outlet 63 on the wall of container 60 through valve 64 into gravity filtered outlet line 70 to the next step of purification. In this example, gravity is used to filter so no pumps are needed. However, pumps could be used to help the process or backwash as needed. Optional electrical connects 71 can be used to power sensors, pumps or other equipment as needed. Persons skilled in the art with the benefit of the disclosures herein would recognize other type of media filters such as, pressure filters can be similarly designed to fit into a container, as illustrated in FIG. 6. In addition, multiple media filters run in series or parallel can be engineered to fit in a container or alternatively, the equipment or plant can run each container in series or parallel to obtain favorable operating conditions.

In one embodiment, a final pre-filtration system called the micro-filtration or ultra-filtration unit. This filtration can utilize a variety of membrane filtration in which forces including pressure or concentration gradients facilitate a separation through a semi-permeable membrane. Micro-filtration is a type of physical filtration process where a contaminated fluid is passed through a special pore-sized membrane to separate microorganisms and suspended particles from process liquid using pressure or gravity. Ultra-filtration is a pressure-driven purification process for removal of solids, turbidity and removal of proteins, endotoxins and pathogens such as giardia, cryptosporidium, viruses and *E. coli*. Typically, ultrafiltration membranes have pore sizes ranging from 0.1 μm to 0.001 μm. Ultra-filtration filters are typically used in waste water treatment and pharmaceutical applications. This step should substantially remove all particles not dissolved in the water leaving only essentially soluble impurities. For example, Evoqua Water Technologies, LLC from Warrendale, Pa. manufactures several suitable micro-filtration and ultra-filtration devices. MEMCOR CP II™ filters are suitable for this application, as this provides module housing for a plurality of membranes requiring less footprint and with removable canisters for quick on-site repairs. This modular design can be easily containerized or placed on a pallet.

Figure 7:
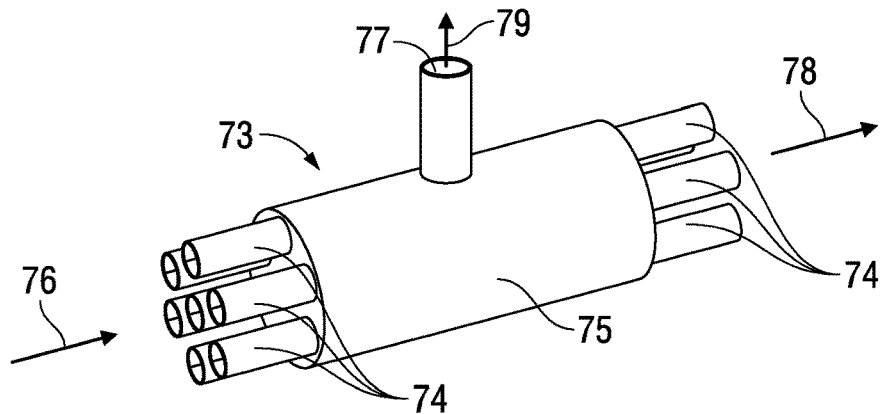
FIG. 7 is an example illustration of a microfiltration tube membrane embodiment.

FIG. 7 is an imploded prospective view of a tubular membrane filter device 73 which can handle micro-filtration or ultrafiltration. The tubular membranes 74 in housing 75 can operate in tangential, or cross-flow, design where process fluid is pumped (shown by arrow 76) into filter 73 and along the membrane surface in a sweeping action. Water that is purified by flowing through the membranes and through outlet 77 (arrow 79) whereas retained water with suspended solids and microorganism flow through the outlets of the membranes as shown by arrow 78. Ultrafiltration is preferred in most embodiments because reducing solid contaminate concentrations entering the reverse membranes will improve efficiency and/or time periods between repairs and maintenance.

Figure 8:
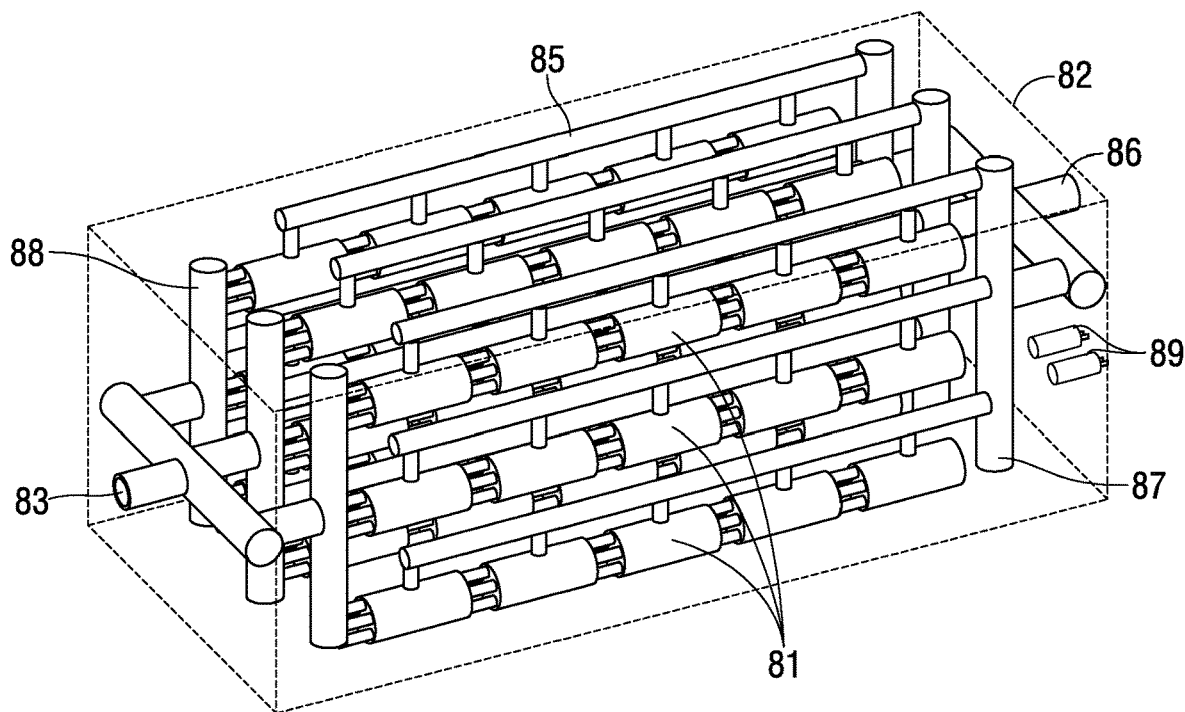
FIG. 8 is a cross-section of a side elevational view of a containerized microfiltration tube membrane embodiment.

FIG. 8 illustrates a plurality of tubular membrane filters 81 engineered to fit inside a container 82. As shown in FIG. 8 water is flowed through inlet 93 on the container wall through the tubular membrane filters 81. Natural pressure or gravity or pumps (not shown) can be used to flow or force the water through the membrane filter inlet 83 through at least one membrane 81. Water flows through the membranes 81 into the upper portion 85 of the tubes 81 and then the filtered water flows through outlet 86 to the next stage such as, reverse osmosis units. Wastewater is discharged through outlet 87 and can be discharged directly into a body of water or flowed through the discharge unit, as described below. In addition, air inlet 88 is engineered into the wall of the container 82 to provide air, or compressed air as needed to flow the water through the membranes. Electrical connections 89 provide electrical power if needed to run the equipment inside including any sensors. As described above all the connections can be designed for quick connects and disconnects to a plant system.

In one embodiment, the filters are placed adjacent to run in parallel train arrangement. In this embodiment, the different filters containers could be in separate sections or combined in an aligned train to make the process more efficient. For example, media and/or spin filters can be adjacent or aligned with the membrane filters. A common supply line can then be engineered to run alongside the filters or the container units. The example shown in FIG. 8, has the membranes oriented vertically. However, the membranes can be position horizontally, vertically, slanted or in any combination thereof. The alignment would be chosen to maximize container space and minimize the amount of piping and pumps needed to flow the water.

In one embodiment, each stage comprises a plurality of module filters in each container, wherein any container malfunctions or needs maintenance can be quickly removed by cranes or other equipment of the offshore structure. This embodiment enables any underperforming filter to be quickly removed through disconnects adjacent to the containers and disconnects adjacent to the containers. Alternatively, valves and recirculation tubing can reroute any water from a filter that has filed or needs maintenance. The valves can be controlled manually or be automated to allow real-time control, using a control system described below.

Electrical Coagulation

Electrocoagulation is performed by applying an electric current across metal plates that are submerged in water. Heavy metals, organics, and inorganics are primarily held in water by electrical charges. By applying another electrical charge to the contaminated water, the charges that hold the particles together are destabilized and separate from the clean water. The particles then coagulate to form a mass, which can be easily removed. Electrocoagulation can be used as a pretreatment for processes such as clarification, reverse osmosis (RO), and ultrafiltration, or as a polish treatment at the end of traditional treatment processes. The technology typically eliminates the need for chemical or biological additives or demulsifiers. Without chemicals, there is also no need for chemical mixing tanks. Advances in electrocoagulation will drop out irons and other undesirable metals that are dissolve din the water. Changing the electrical power and the type of metal plates can causes changes to help selectively remove certain contaminates.

Other Pretreatment Options:

The primary objective of pretreatment is to make the feed water to the RO compatible with the membrane. Pretreatment is required to increase the efficiency and life expectancy of the membrane elements by minimizing fouling, scaling and degradation of the membrane. Fouling refers to entrapment of particulates, such as silt, clay, suspended solids, biological slime, algae, silica, iron flocs and other matter on the sea water. Most of the pretreatment options involves filtration. However, other pretreatment options include flocculator, bioflocculator, MBBR, lamella settler, dissolved air flotation systems, polymer preparation system, coagulant dosing station, water sterilization and other systems known to persons skilled in the art. U.S. patent application Ser. No. 16/030,851 filed on Jul. 9, 2018 discloses several pretreatment options that can selectively remove metals and other contaminates. The entire disclosure of U.S. patent application Ser. No. 16/030,851 is hereby incorporated by reference in its entirety. Accordingly, persons skilled in the art could add additional pretreatment options to the pre-filtering steps described above using the disclosures and embodiments described herein to obtain favorable operating properties. The pretreatment options chosen would be based on the flowing variables including properties of the seawater, desired finished properties of the water, operating parameter and conditions at the water purification or desalination plant and combinations thereof.

Reverse Osmosis System

In one embodiment, the final stage of the water purification process requires reverse osmosis filtration. Reverse osmosis (RO) is a water purification technology that uses a semi-permeable membrane to remove larger particles from drinking water. In reverse osmosis, an applied pressure is used to overcome osmotic pressure, a colligative property, that is driven by chemical potential, a thermodynamic parameter. Reverse osmosis can remove many types of molecules and ions from solutions, including bacteria, and is commonly used in both industrial processes and the production of potable water. The result is that the solute is retained on the pressurized side of the membrane and the pure solvent can pass to the other side. Typically, to be "selective," the membrane allows large molecules or ions through the pores (holes) while allowing smaller components of the solution (such as the solvent) to pass freely.

Usually, the solvent naturally moves from an area of low solute concentration (high water potential), through a membrane, to an area of high solute concentration (low water potential). A pure solvent can be moveably driven to reduce the free energy of the system through equalizing solute concentrations on each side of a membrane, generating osmotic pressure. Applying an external pressure reverses, the natural flow of the pure solvent, thus, the term reverse osmosis. The RO process is comparable to other membrane technology applications. However, key differences are found between reverse osmosis and filtration. The predominant removal mechanism in membrane filtration is straining, or size exclusion, whereas, the RO process can theoretically achieve perfect efficiency regardless of parameters such as the solution's pressure and concentration. RO also involves diffusion, making the process dependent on pressure, flow rate, and other conditions.

Figure 9:
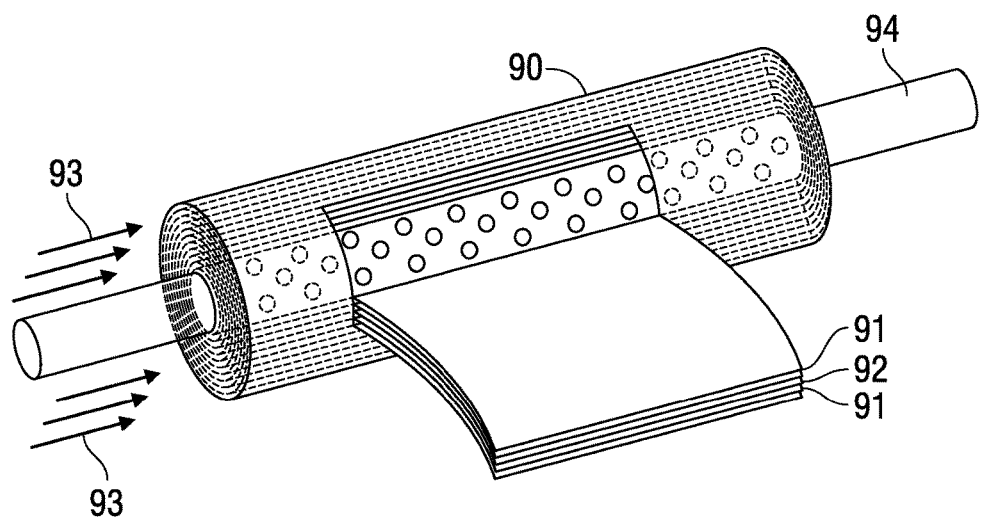
FIG. 9 is an example illustration of a tube reverse osmosis embodiment.

FIG. 9 is an illustration of a typical reverse osmosis membrane used in the art. The membranes are inside an outer pressure tube 90 typically made of fiberglass to contain the membrane elements. Inside the pressure tube 90 is an impermeable sheet 91 that encases the membrane 92 on both sided of the membrane 92. The membrane 92 is made of a salt rejecting membrane. Contaminated water or salt water is flowed (as shown by arrows 93) through the membranes which allows water molecules to pass through but not the salt water. The contaminates or salt rejecting membrane 92 material, in the Example shown in FIG. 9 can be a plasticized tricot with grooves in the tricot to create a spiral flow of desalinated water through a purified water exit tube 94 in the center. The reverse osmosis membrane shown in FIG. 9 is only an example reverse osmosis membrane, and other reverse osmosis membranes can be used with the benefit of the disclosure herein. Preferably, module sections or skids of reverse osmosis tubes would be employed to allow easy removal and maintenance of the RO filters.

Figure 10:
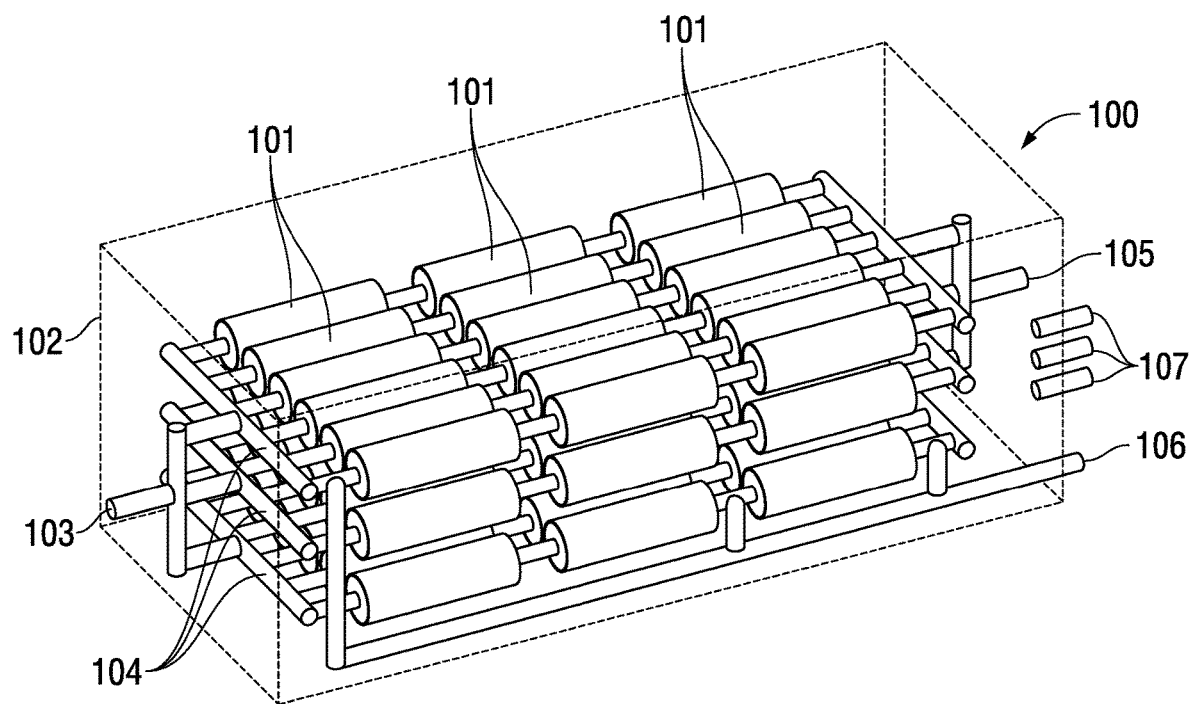
FIG. 10 is a cross-section of a side elevational view of a containerized reverse osmosis membrane embodiment.

FIG. 10 illustrates a cross sectional side view of a containerized RO filter system 100 comprising plurality of tubular reverse osmosis membrane filters 101 engineered to fit inside a container 102. As shown in FIG. 10, water is flowed through inlet 103 on the container 102 wall through a plurality of piping 104 to the tubular membrane filters 101. Pumps (not shown) can be used to flow or force the water through the membrane filter inlet 103 to travel through at least one RO membrane filter 101. Water flows through the membranes 101 and then the filtered water flows through outlet 105 to the next stage such as, post treatment of for transport as desalinated water. Wastewater is discharged through outlet 106 and can be discharged directly into a body of water, disposal well or flowed through the discharge unit, as described below. One or more electrical connections 107 provide electrical power if needed to run the equipment inside including any sensors. As described above all the connections can be designed for quick connects and disconnects to a plant or field unit such as, a wellsite system.

IDE Technologies in Israel manufactures and sells a containerized reverse osmosis system which could be modified to work with the automated insertion and removal by engineering the connections and disconnects to match the plant frame. IDE Progreen—Model SW-RO-M—provides RO modules engineered to fit inside a container. These RO modular units, or similar units, could be engineered to have the quick connections and disconnects to work in the embodiments describe herein.

In one embodiment, container housing pump would be directly adjacent to the container housing the reverse osmosis tubes which would be directly adjacent to the pressure recapture systems. This aligned arrangement allows for containers o be quickly removed and replaced when necessary and to allow valves to bypass one container or sections of skids or aligned containers to avoid equipment that is not working or working poorly. Automated lifts, robotic arms or overhead cranes would insert and remove the containers as necessary at a plant or wellsite.

Typically, the pumps would be variable speed motors to allow multiple speeds based on operational conditions for efficiency. The pump containers and reverse osmosis containers can be manufactured to be a standard 12×12×24 ISO skids. This will allow for over 40 16-inch reverse osmosis tubes and enough pumps and electrical controls to operate 2 reverse membrane containers. Alternatively, smaller skids of 8×8×20 could be used to allow for easier transportation.

Figure 11:
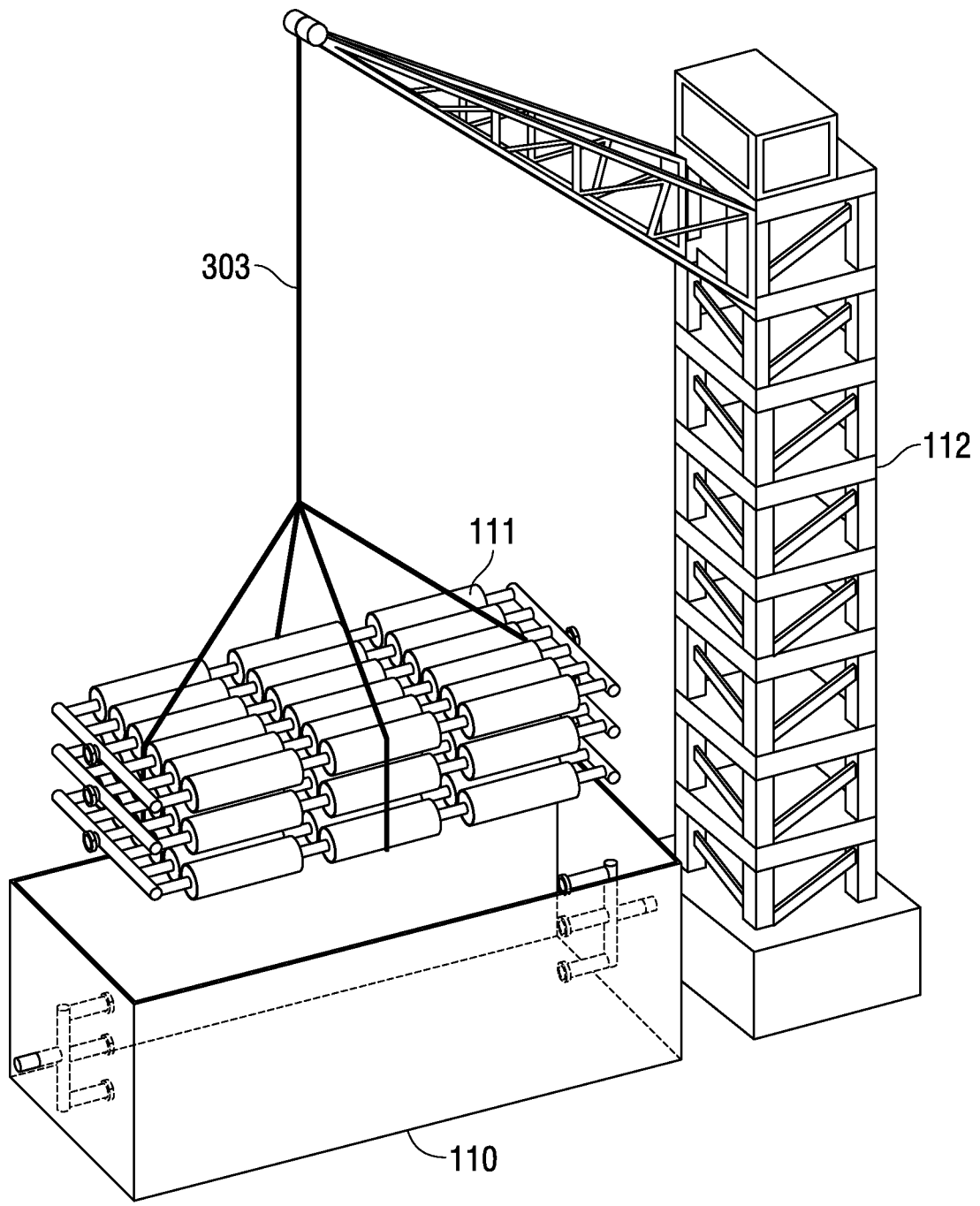
FIG. 11 is a side view illustrating a crane loading membrane filtering equipment into a housing.
Figure 12:
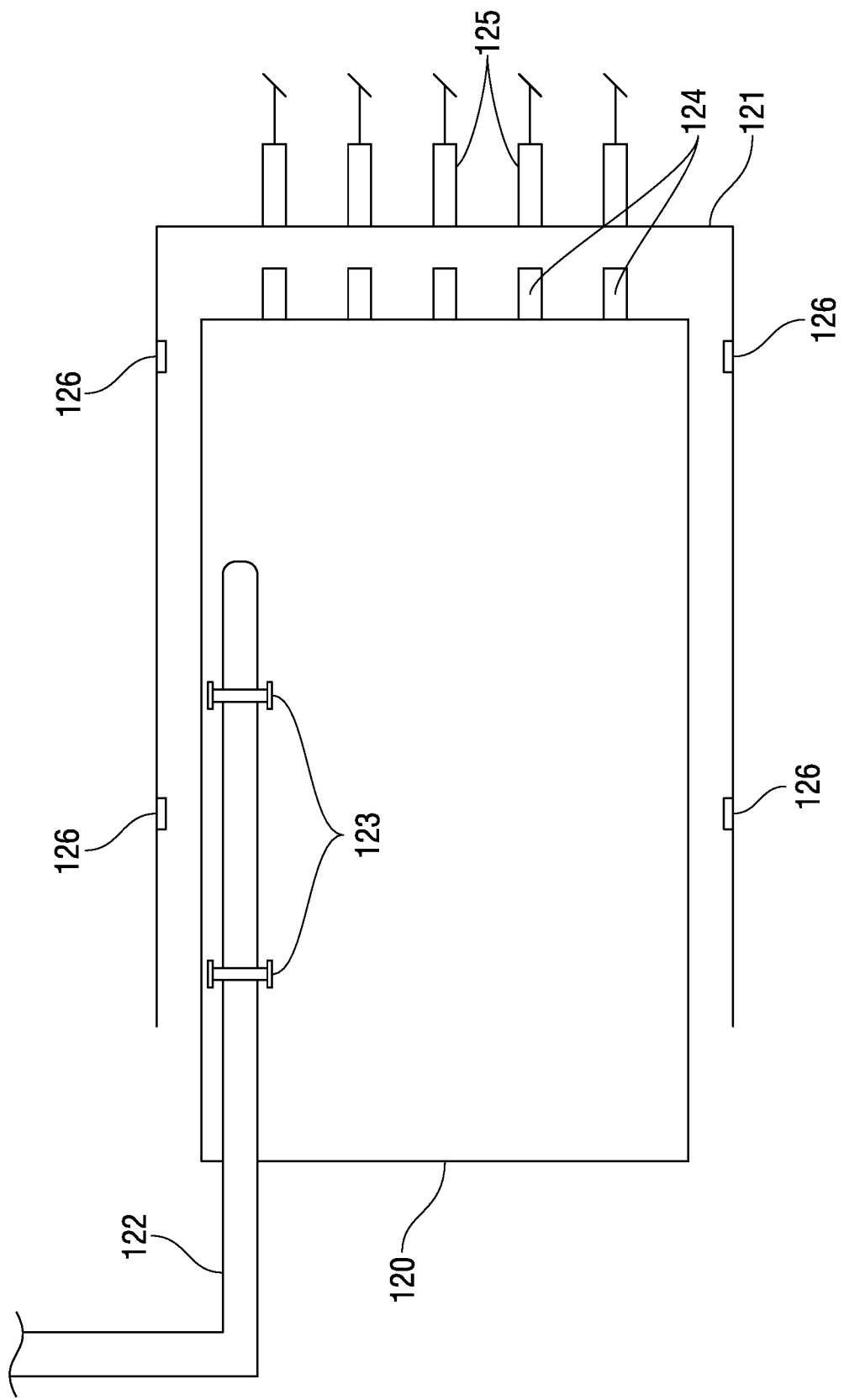
FIG. 12 illustrates an example of robotic or automated containerized equipment being inserted into a housing.

In one embodiment, the skids can be steel connected by fasteners, bolted steel, or galvanized steel to take additional stress. This would allow easier transportation, multiple stacking of skids to maximize space and limit piping to the skids. The small overhead crane can be a mono rail crane for manual or electric chain hoist options to service pumps. In one embodiment, the crane, pumps, electrical motor starters, or combinations thereof are operated by the control panel. This automation allows complete control without humans in the skids or around skids. The skids can be fenced off or located in a hermetically sealed building if sterile conditions are required. Robots can perform maintenance to limit the need for humans to work on the equipment FIG. 11 illustrates an example of robotic or automated containerized equipment be inserted into a container or housing. As shown in FIG. 11, an equipment block of reverse osmosis equipment is being loaded into a housing unit designed to store and operate the equipment in the container. The equipment 111 in this example is being loaded into the housing 110 with a crane 112. Alternatively, as shown in FIG. 12, equipment in a container 120 can be inserted into a container housing 121 by a robotic arm 122 that can be controlled by a remote-control system (not shown).

The robotic arm 122 can latch on to the shipping container 120 through one or more handles 123 that can be designed or welded onto the container 120. Alternatively, container 120 can be loaded with hoists or cranes with equipment that latches onto the frame of the containers or other means known to persons skilled in the art. A plurality of male connectors 124 can be designed to match, latch or connect onto corresponding female connectors 125. These connections can be controlled by mechanical hydraulic and electric systems run both manually and/or automatically through a control system. Additional connections could be made by other means known by persons skilled in the art which include but are not limited to valve and suction device connectors. One or more moveable clamps or internal vices 126 can be used to clamp and hold the container securely, as needed. The process can be reversed to allow for quick and automated removal of equipment in a container.

The amount of purification would be controlled to create a brine with a desired density. The throughputs and number of reverse osmosis stages could be designed to achieve a specific density range of the dense brine. For drilling brine, typically the density would be 10 pounds (lbs.) or approximately 260,000 PPM or TDS. Density sensors such as, conductivity sensors could be connected to a control system to control the flow and number of reverse osmosis treatments or other purification systems to obtain a favorable density of the discharge brine.

Thermal Energy Recapture

Figure 13:
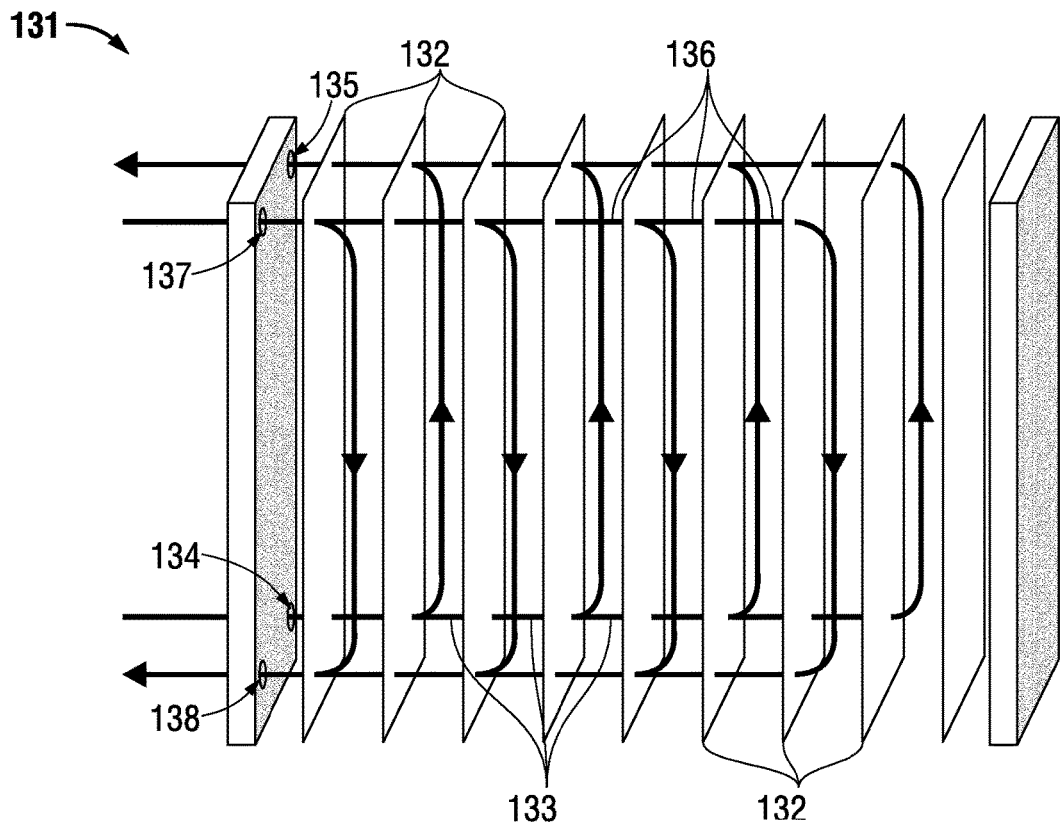
FIG. 13 is a prior art heat exchanger that is typically used to convert water into steam.

FIG. 13 illustrates a prior art heat exchanger that is typically used in steam generation. The heat exchanger 131 has a series of plates 132. Cold water 133 is inserted through an inlet 134 and runs through a series of plates 132 before exiting an outlet 135 after receiving heat energy from steam or hot air 136 that is inserted through an inlet 137 and exits the outlet 138. U.S. Patent Application No. 2005/0061493 A1 discloses conventional heat exchangers and heat exchangers used in water purification systems. U.S. Patent Application No. 2005/0061493 A1 is hereby incorporated by reference.

Figure 14:
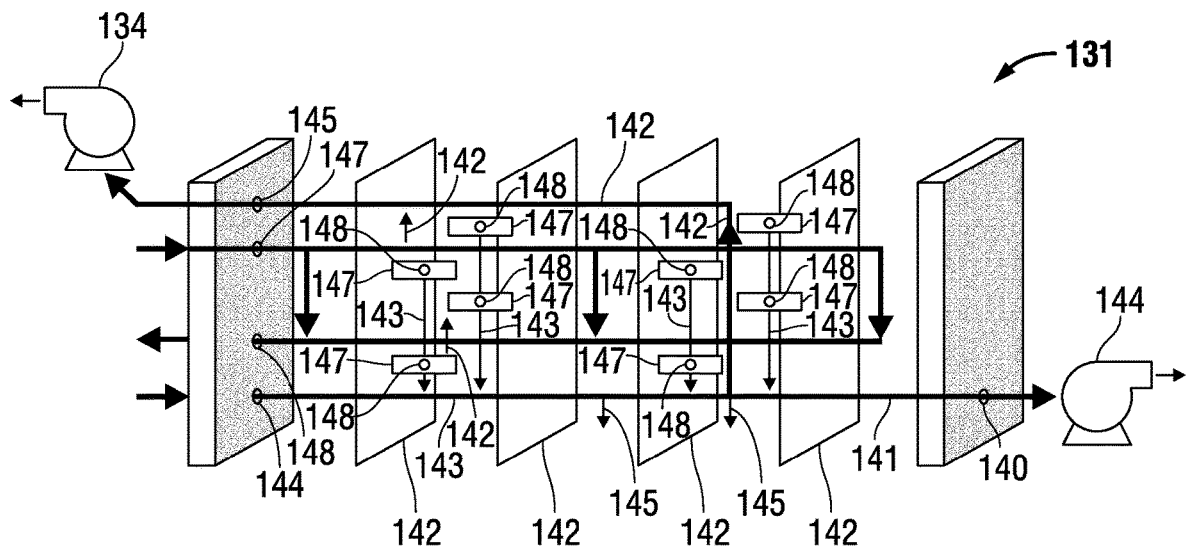
FIG. 14 illustrates an embodiment of this invention wherein baffles and openings are used to create multiple flow paths to separate contaminated fluid from purified vapor.

In the past costly equipment that wasted much of the energy of the steam was utilized in a series of heat exchanger and flash tanks as shown in FIG. 14 of U.S. Patent Application No. 2005/0061493. FIG. 1 of U.S. Patent Application No. 2005/0061493 shows that a vapor compressions evaporator is used outside of the heat exchanger to mix the feed and separate out concentrated product from distilled water using steam generated by a jet ejector. In contrast to U.S. Patent Application No. 2005/0061493, in an embodiment, this invention uses specifically engineered multiple flow paths inside an apparatus such as, a heat exchanger to quickly and efficiently use gravity differences in the apparatus to separate the purified vapor from the initial contaminated fluid. In another embodiment, a series of small baffles and openings are engineered inside the tubing to efficiently separate the salt water and purified steam. The baffles create alternative flow patterns whereby the lighter and faster moving steam is separated naturally from the contaminated fluid by gravity differences. In a third embodiment, interior sections of the heat exchangers are designed to create flash chambers and/or multi-effect chambers, distillation columns, and condensation vessels.

This apparatus enables a process for the efficient separation of a vapor volatile component from a non-volatile component in a mixture. In some cases, the non-volatile component comprises a salt or a sugar and the volatile component comprises water. In other cases, the water contains dissolved and/or undissolved chemicals.

FIG. 14 is an illustration of an embodiment using baffles and small openings to create alternative flow paths. The heat exchanger 131 in this figure has been modified from the prior art heat exchanger in FIG. 13. Similar elements in FIG. 13 have been given the same reference numerals in FIG. 14. In the embodiment shown in FIG. 14 an additional outlet 140 and flow paths 141 has been created for the contaminated fluid with a portion of the fluid removed as purified fluid 142 as vapor. Separate flow paths are created for the remnant contaminated fluid 143 removed from the vapor stream 142, using aligned holes 148 in baffles 147. The baffles 147 with the aligned holes 148 can be placed in the plates or tubes of a standard heat exchanger. In this embodiment, gravity causes the lighter purified vapor to rise and the heavier contaminated fluid to fall as shown in the arrows in the vertical flow paths. Additional pumps 144 and drains 145 may be utilized to quickly remove the contaminated fluid from the purified fluid, in the horizontal flow paths, as discussed below.

Figure 15:
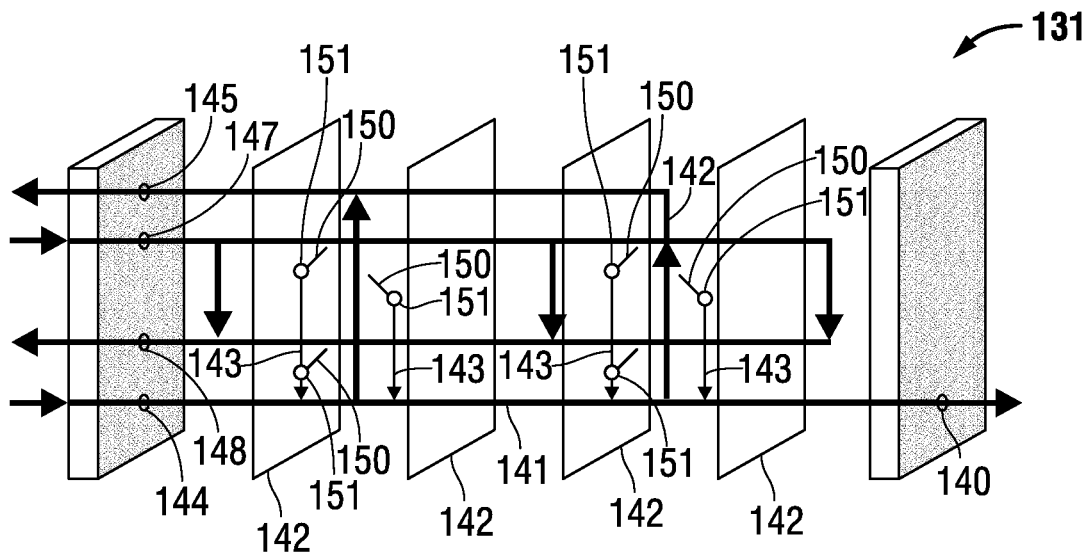
FIG. 15 illustrates an embodiment of this invention wherein slanted baffles and openings are used to create multiple flow paths to separate contaminated fluid or brine from purified vapor.

FIG. 15 is an illustration of an embodiment using slanted baffles 150 and small openings 31 to create alternative flow paths. The heat exchanger 3 in this figure has been modified from the prior art heat exchanger in FIG. 13. Similar elements in FIG. 13 and FIG. 14 have been given the same reference numerals in FIG. 15. In the embodiment shown in FIG. 15, the baffles are slanted 150. The slanted baffles 150 inside the heat exchanger 131 create areas in which purified vapor can accumulate above the small openings 151, in the vertical flow paths. These areas then become stages in a multi-stage distillation system. In a preferred embodiment, the baffles, or equivalent devices create at least three distinct flash chamber stages. In an alternative embodiment, aligned holes and/or tubing create condensation and/or contaminates using multiple alternative paths.

A multi-stage flash distillation ("MSF") is typically a water desalination process that distills sea water by flashing a portion of the water into steam in multiple stages of what are essentially counter-current heat exchangers. In the embodiment shown in FIG. 15, each slanted baffle 150 acts as a separate concurrent heat exchanger where purified steam rises, and contaminated fluids are removed as heavier contaminated fluids via the small openings 151. FIG. 15 shows in each plate section three separate flash chambers above the small openings 151 in the MSF system engineered inside a heat exchanger. In this embodiment each slanted baffle is a stage in the MSF process. Additional flow paths such as, tubing can be inserted to each slanted baffle stage to remove the purified vapor and remove the contaminated fluid. MSF distillation can include distillation columns and/or multiple effect chambers wherein typically small water droplets are vaporized using hot coils.

In one embodiment, valves can be used to remove the contaminated fluid. For example, valves that can be selectively opened based on pressure or density or weight differences can be activated, when necessary or with favorable conditions for removal. Denser or heavier contaminated water would then activate the valve as it accumulates and allow the contaminated water to be removed and the distilled water to proceed to the next stage of the flash chamber or to exit as purified vapor that can later be condensed to distilled water.

Comparable to FIG. 15, separate flow paths are created for the purified vapor 142. The purified vapor travels between the slanted baffles. The contaminated fluid is removed using aligned holes, tubing or valves in the slanted baffles. The baffles with the aligned holes can be placed in the plates or tubes of a standard heat exchanger.

The creation of sections of condensation and separate flow paths inside a heat exchanger avoids the need for additional equipment and less energy is used to create the steam to power traditional steam distillation processes. This results in reduced capital costs and reduced waste energy or energy costs in purifying fluids.

In one embodiment, at least some of the vapor stream is used to create additional vapor from the feed or contaminated stream by feeding or recycling the purified vapor stream through the heat exchanger without any multiple flow paths. Once the vapor stream is fully separated the vapor is purified water and thus there is no need to purify or separate the fluid stream any further. However, in one embodiment, the vapor may be separated into multiple streams by condensing or removing lower temperature distilled water from the vapor, so the streams can be used more efficiently to transfer heat energy to the heat exchanger or other processes, as needed. In this embodiment, the heat of condensation provides the heat of evaporation to the feed or contaminated stream inside the heat exchanger. The separation may be done through distillation columns or a plurality of flow paths using the density differences. For example, a vertical flow path can be given a series of baffles and openings or additional tubing to create vertical distillation column with multiple flash chambers and outlets. In another embodiment, the condensing, evaporating and recycling steps are all performed inside the heat exchanger.

This condensing, evaporating and recycling of purified vapor can be part of the separation processes which can be done inside the heat exchange to further reduce capital costs and further reduce waste heat or kinetic energy of the fluids. For example, vertical runs of the heat exchanger can be engineered to have multiple outlets to serve as a distillation column removing vapor from condensed water. Horizontal runs can have separation devices such as, baffles, valves and other devices that selectively removes the denser salt water concentrate. This removed salt water concentrate can then be recycled back into the heat exchanger or through a preheating device to recapture the heat energy. This preheater can be separate or combined with the preheater obtaining the heat from another source such as, wellbore produced fluids.

In one embodiment, the preheater becomes a condensing device. In this embodiment, the heat is transferred from the vapor to the preheated fluid to be purified in a heat exchange device. This heat transfer causes the vapor to condense into liquid form an after exiting the preheater can be stored as purified liquid.

For example, spin valves can spin the water allowing the density differences to cause the water to separate. In this embodiment, the centrifugal forces can be used to separate water vapor from water and water with contaminates. Alternatively, baffles can create turbidity and allow the higher density fluids to settle. Alternatively, in a semi-closed system, the contaminated fluid could be periodically removed when contaminates levels get too high and replaced with less concentrated salt water or contaminated water. Sensors or modelling or density can be used to determine the approximate concentration levels and remove any fluid with too high a level of contaminates.

Figure 16:
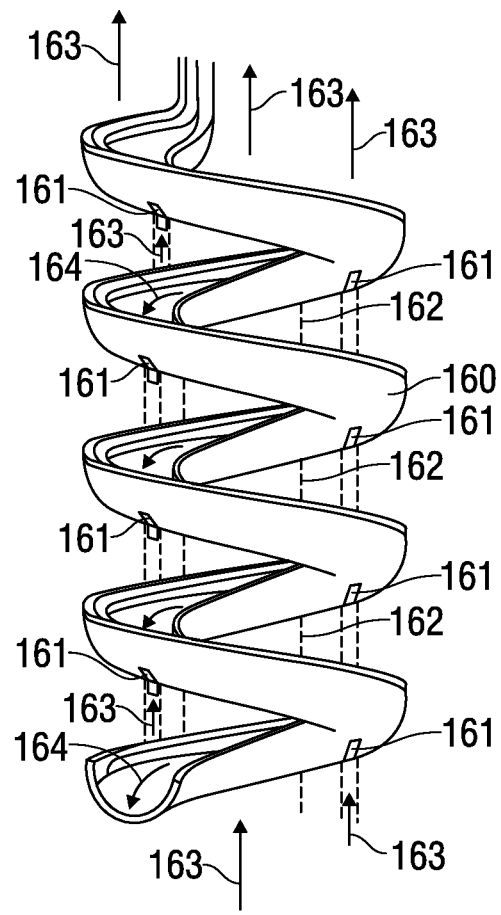
FIG. 16 illustrates an embodiment of this invention wherein spiral or half tubes that can be placed inside a heat exchanger having a conical shape condensation plate and the condensation plate has aligned holes in the middle and side to allow contaminated fluids and purified vapor to have separate flow paths respectively.

FIG. 16 shows a spiral or conical half tube embodiment that cab\n be used a water tray. As shown in FIG. 16 a conical half tube 160 has aligned holes 161 and an opening in the middle 162. Multiple flow paths are created for the lighter vapor to rise 163 through the middle and optional aligned holes and a flow path down 164 is created along the conical tube to allow the heavier containment fluid to flow unobstructed. The spherical embodiment can be used to transfer heat and a distillation column or flash chambers, as described above can be in the middle. The spiral water tray can be a spring to allow for easy removal for maintenance including maintenance to address scaling and corrosion issues, as described later.

Figure 17:
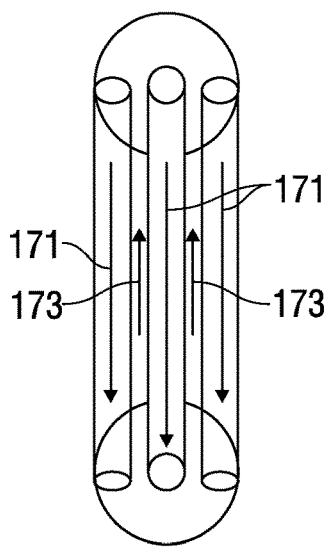
FIG. 17 is a cross section showing possible flow paths for the conical shape condensation plate in FIG. 16.

FIG. 17 is a cross section showing possible flow paths for the conical shape condensation plate 170 in FIG. 16. For example, the flow paths for the contaminated fluid are shown as arrows 171 and the flow paths for the purified vapor are shown as arrows 173. This conical shape condensation plate can be engineered to be installed in most heat exchangers. A base pipe with the condensation plate inside can also be inserted in a heat exchanger. The flow paths, as shown by the arrows, can easily be reversed based on equipment designs and or operational needs. Additional filters such as mesh filters can be placed in the tubing to filter out contaminates and prevent vapor or steam carrying the contaminates entrained by reducing energy flows.

In one embodiment, a combination of designs can be utilized to create multiple flow paths for the contaminated fluid and in some embodiments, multiple flow paths for the purified vapor. Persons skilled in the art, with the benefit of the disclosures herein, may choose the design or combination of designs best suited for the needs of the operator.

Pressure differences using pumps and other devices can further improve the apparatus and process. Pressure can be recycled, stored, or recaptured, as needed, using the energy recovery devices described above. In on embodiment, the produced water is run through a unit that recaptures heat energy (such as, heat exchanger or pre-warmer) and an energy recovery device to capture the pressure. Capturing the heat energy and pressure energy can be done with a combined device or through separate equipment run in series or parallel.

In an embodiment, pressure and gravity differences push the purified vapor upwards and cause the contaminated fluid to drop. In a preferred embodiment, the baffles, screens and openings can be engineered to create interconnected compartments and each compartment will work as a flash distillation chamber in an MSF as discussed above. Finally, drains can be placed on the bottom to remove any heavy sediments and concentrated contaminated fluids. These drains can include valves or controlled openings to selectively remove the heavier fluids or denser fluids because of the increased concentration of contaminates.

In a preferred embodiment the amount of vapor separated is controlled to allow a preferred amount of purified vapor produced while minimizing the amount of energy loss from the contaminated fluid. This can be accomplished using three methods. First, the baffles can be adjusted to allow the water more time inside the apparatus which will allow the water to absorb more heat energy and allow a larger percentage of the contaminated fluid to be converted into purified vapor. Second, heated contaminated fluids can be recycled through the apparatus causing additional steam to be extracted from the water. Third, at least one path that is engineered to remove the contaminated fluids can be closed which will cause additional time in the heat exchanger resulting in more produced purified vapor. Valves, shunts, adjustable walls, screens and any combinations thereof can be used to cause at least one path to be closed. Additional devices known to persons skilled in the art can be utilized. These devices can be operated using the control systems described below.

A few selected openings, baffles, shunts, screens and combinations thereof can be engineered to create a series of connected sections and operate as a series of multiple flash distillation or MSF systems inside the heat exchanger. Each section will further purify the fluids as gravity causes the liquids with contaminates to separate and the lighter vapor moves to the next section with less contaminates. Lowering the pressure by attaching a pump on the outlet on the top of the heat exchanger can further increase the efficiency by causing the purified vapor to quickly exit the heat exchanger and lowers the boiling point of the fluid. In addition, pumping the contaminated fluid out can quickly remove the contaminated fluid with higher contamination levels. In the past efforts have focused on removing as much water as possible. Whereas, this inventive method works by quickly removing the steam from the contaminated water and allowing higher concentrations of contaminated water to be quickly removed once the levels become too high to no longer be efficient.

In a preferred embodiment, the process quickly takes the initial vapor produced and quickly removes the contaminated fluid such as, salt water once the desired density is achieved. This improves efficiency because as contaminates content increases in the contaminated fluid so does the boiling point. The preferred process is to produce enough purified vapor to meet the required needs of the brine discharge while minimizing the amount of energy the process takes. The higher boiling point of contaminated fluids with higher concentration of contaminates requires more energy which reduces the efficiency. In addition, the salt water requires more corrosion resistant material which increases the cost of any apparatuses necessary to utilize this invention. Accordingly, in this embodiment, the contaminated water is quickly removed from the purified steam once the desired density is achieved. Therefore, minimal energy is wasted on the contaminated water and this also minimizes the additional expense of having too much of the material be highly corrosion resistant to impurities in the water. In situations where purified water is not required, this invention can be used to prevent corrosion on the equipment used to produce steam. This will make the steam production more economical by reducing wasted energy on heating contaminates while also reducing the need for corrosion resistant materials.

In one embodiment, the desired density is selectively chosen to match the density needs of the drilling salt needed at the site or an offsite location or from a third-party customer. Typically, drilling brine comes in standard densities and additives are added at mixing stations or at the drilling site to obtain the desired densities. In one embodiment, the equipment and systems are optimized to provide brine with a density of at least 7 and no more than 13 pounds per gallon.

While the preferred level to remove contaminates will be based on many factors including the amount of energy available, the amount of water needed, and the efficiency and/or capabilities of the system including corrosion tolerance of the equipment. Preferably, the amount of salt water or other contaminates should be kept below 80 part per trillion ("ppt") or grams of contaminates per kilogram of solution (g/kg). Sea water is generally 35 ppt. In a preferred embodiment during desalination operations any contaminated water above 70 ppt is removed, and even more preferred any containments over 50 ppt is removed and in the most preferred embodiment any water with a contaminate level of above 40 ppt is removed. The control system described below can choose the most favorable contamination level that water should be removed based on the above factors and other factors chosen by the operator.

Scaling:

As discussed previously, scaling is a major issue. In various embodiments, scaling can be controlled or minimized. In one embodiment, use of material that is resistant to scaling is used. U.S. Patent Application No. 2012/0118722A1 discloses many materials that are scale resistant.

U.S. Patent Application No. 2012/0118722A1 is hereby incorporated by reference. In addition, nanoparticles that are resistant to scaling can be attached or sprayed on the equipment to prevent scaling.

In one embodiment, as discussed above and below, corrosion and scaling can be reduced using hydrophobic coating. For example, hydrophobic coating can be made from a nanoscopic surface layer that repels water, which is referred to as super hydrophobic coating. Hydrophobic coating can be made from many different materials. The coating can be selected from the group consisting of manganese oxide polystyrene (MnO2/PS) nanocomposite, zinc oxide polystyrene (ZnO/PS) nanocomposite, precipitated calcium carbonate, carbon nanotube structures, silica, nanocoating, and any combination thereof. Advances in three-dimensional ("3-D") printing technology can print a thin layer of hydrophobic coating on the equipment. Hydrophobic coating can be expensive and time consuming so persons skilled in the art would preferably only perform hydrophobic coating on selected equipment likely to suffer from corrosion and scaling such as, equipment in contact with high concentrations of impurities, for example, salt water. Using the multiple flow paths embodiments of the invention, it would be preferable to coat the contaminated water paths with hydrophobic coatings but not the purified water paths as the purified water would cause little or no corrosion and/or scaling.

A 3-D Printer can be used to apply a thin layer of corrosion resistant material or paint on the interior of equipment subject to high concentrations of impurities, for example, salt water. Three-dimensional printing can also help with manufacturing the multiple flow paths inside equipment. In 3-D printing, additive processes are used, in which successive layers of material are laid down under computer control. These objects can be of almost any shape or geometry and are produced from a 3-D model or electronic data source. A 3-D printer is a type of industrial robot allowing manufacturing of complex design. A 3-d printer can print selective parts used in the equipment or can print the entire equipment used in the embodiments described herein.

An additional embodiment of this invention addresses the scaling issue by quickly removing the contaminated water. First, the purified vapor is quickly removed from the contaminated fluid by separate unobstructed flow paths. In one embodiment, ERD can be used to create pressure differences to create the flow paths. The ERD and/or Pumps can be deployed to quickly extract the purified vapor from the contaminated fluid. The pumps can further create low pressure which will lower the boiling point and thus reduce the scaling issue as well as increase efficiency of the process. The advantages of lower pressure are further discussed below.

A third embodiment requires multiple flow paths providing purified vapor and contaminated water several flow paths respectively minimizing resistance. This embodiment also has the redundancy advantage if one or more flow paths become blocked with contaminates or scaling, the process can continue with the alternative flow paths. One option is to create a maze design, as discussed below.

In a fourth embodiment, the concentration of salts and other contaminates are controlled so that the contaminated fluid is removed before the concentration gets too high and scaling becomes a major issue. This can be accomplished by attaching pumps at the contaminated fluid outlet to quickly remove contaminates. Furthermore, additional drains and valves can be placed in the apparatus to quickly remove heavier contaminated fluids with higher concentrations. In this embodiment, synergistic benefits include less scaling, less corrosion and less energy needed to heat higher concentrations of contaminated fluids. A person skilled in the art can use the apparatus disclosed herein to reduce scaling and reduce corrosion as separate and distinct benefits.

In a fifth embodiment, purified fluid or fluids with lower levels of contaminates is run through the apparatus to dissolve contaminates and remove the scaling. The purified fluid or fluids with lower contaminates can be run intermittently on a schedule or as necessary, to remove scaling.

Maze Design:

In one embodiment, purified vapor is extracted and separated by use of a maze design. This design incorporates a maze design to constrain contaminated fluids while letting the lighter vapor pass through without interrupting production. In a preferred embodiment, a screen contains a series of compartments along a selectively perforated base pipe inside the screen that allows alternative path flows.

In an even more preferred embodiment, each compartment contains a primary screen, outer housing, flow baffles, and a secondary screen. This embodiment can create numerous or at least three or more interconnected alternative flow paths. If the pipes are horizontal baffles can direct the water flow away from the holes connected to the purified vapor flows.

Figure 18:
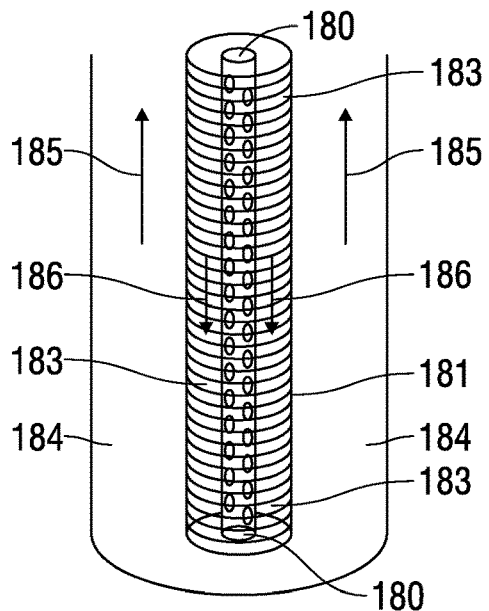
FIG. 18 illustrates perforated tubing with screens to create a plurality of flow paths.

FIG. 18 is an illustration of the maze design embodiment. This figure shows a perforated pipe 180 with at least one screen 181. This creates three separate flow paths. The three paths are inside the perforated pipe 182, inside the screen but outside the perforated pipe 183 and outside the screen but inside the apparatus 184 such as, heat exchanger. Additional baffles, screens and pipes may be added as necessary to increase flow and increase flow paths. The proposed flow paths for the purified vapor is shown as arrow 185 and for the contaminated fluid as arrow 186 in FIG. 18. These flow paths can be reversed to obtain favorable flow paths based on operational and equipment parameters.

Fluids and vapor flow into the primary screen and then are redistributed by the flow baffles. The vapor, which now flows more uniformly, travels through the secondary screen and into the perforated base pipe where it commingles with produced vapor from other compartments. The increased resistance from the screens and flow baffles will allow gravity to separate the heavier contaminated fluid from the lighter vapor. An additional benefit of the maze design is if one path gets obstructed with contaminates, the fluid and vapor flow is then diverted to the adjacent undamaged-screen compartments. Persons skilled in the art will use fluid flow dynamics, to preferably engineer the maze design to achieve the greatest efficiency based on various variables. These variables include fluid type, type and amount of contaminates, energy source and costs, fluid loading, thermodynamics, amount of desired fluid flow and desired purified vapor production among other factors known to persons skilled in the art.

Figure 22A:
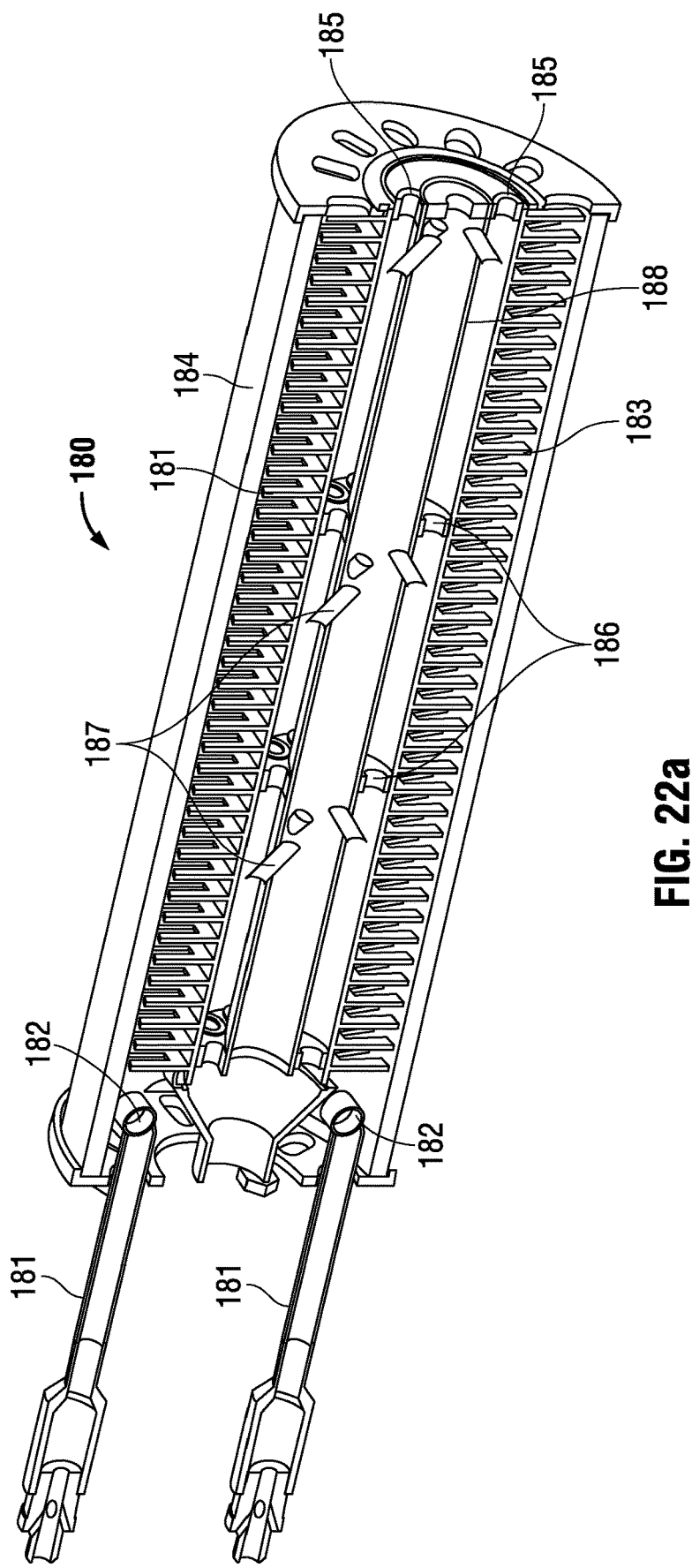
FIG. 22a illustrates an isometric cross-sectional view of the thermal distillation equipment using a modified heat exchanger.

In one embodiment, the proposed equipment comprises a heat exchanger burner combination with three main concentric cylindrical sections inside an outer housing. As shown in FIG. 22*a* below, the outer cylindrical section is a finned tube heat exchanger above the gas burner to transfer the heat. The middle section handles the contaminated produced water through a gravity feed connection using pumps, if needed. The contaminated water travels through three sections or water trays using baffles and multiple redundant nozzles to control flow rates. The innermost section comprises the distillation column using slanted tubes to separate the lighter vapor from heavier contaminate fluids through gravity separation using multiple alternative flow paths in the distillation column.

FIG. 22a above is an isometric cross-sectional view of the X-Vap™ thermal distillation equipment 180. The right portion of FIG. 22a is the top section and the left portion with the gas lines 181 and burner 182 is the bottom section. The equipment comprises a heat exchanger 183 and burner 182 integrated combination with three main concentric cylindrical sections inside an outer housing 184. The outer cylindrical section contains the finned tube heat exchanger 181 above the gas burner 182 to transfer the heat. The middle section handles the contaminated produced water through a gravity feed connection 185 or can use pumps (not shown), if needed. The contaminated water travels through three sections or water trays 186 using baffles and/or multiple redundant nozzles to control flow rates. The innermost section comprises the distillation column 188 using slanted tubes 187 to separate the lighter vapor from heavier contaminate fluids through multiple alternative flow paths and gravity. The entire heat exchanger can be encased in insulation to minimize heat loss from the burners. If necessary, internal baffles can be used to create multiple flash chambers; however, most applications do not require the slanted baffles provide the necessary separations. If required, a more traditional design with multiple flash chambers can be utilized if problems develop with the distillation column shown above, based on the type of fluids being treated. A multiple flash chamber distillation column can be inserted into the existing design shown above in FIG. 18(a), if required. In addition, the distillation column is designed to be easily removed, inserted and cleaned for streamlined and cost-effective maintenance when corrosion and scale issues arise. In one embodiment the water tray sections 186 can be replaced by a helical spring to provide consistent fluid flow and contact with the heat exchanger for better heat transfer. In another embodiment a pressure device such as, a vacuum pump can be used to reduce the pressure inside the heat exchanger to lower the temperature of thermal distillation, as described below.

Low-Temperature Thermal Desalination:

Another embodiment is to use pressure gradients in the apparatus to create additional efficiencies. Low-temperature thermal desalination ("LTTD") takes advantage of water boiling at low pressures. In one embodiment, vacuum pumps create a low-pressure, lower temperature environment in which water boils at a temperature gradient of as low as 1-2° C., typically 8-10° C. and as much as 20° C. or more between two volumes of water. This cold water is pumped through coils to condense the water vapor. The resulting condensate is purified water. In this embodiment cold water will be pumped through the vapor to further condense and purify the water vapor. In a preferred embodiment the LTTD can be combined with the standard heat exchanger modified with this claimed invention to create additional efficiencies. The LTTD can be engineered inside or outside the heat exchanger. In this embodiment, purified water vapor is created at temperatures less than 100° C., more preferably less than 90° C. and even more preferably less than 80° C. and most preferably less than 70° C. In this embodiment, the pumps create a low-pressure area inside the heat exchanger of less than 1 bar, more preferably less than 0.9 bar, even more preferably less than 0.8 bar and most preferably less than 0.7 bar.

In one embodiment, periodic colder water of at least 1 Celsius and less than 20 Celsius can be used to create a temperature gradient. In one embodiment, cold or room temperature water would be periodically pumped through the system. A series of apparatuses or heat exchangers described above could be used.

When a heat exchanger is not needed, lower temperature water would then be sent through the system to keep the purification ongoing despite the heat exchanger not being needed. A computer control, as disclosed below, would determine the optimum fluid streams and temperature to get the most efficient purification based on temperature differences and contamination levels. Valves can control the water streams running through the heat exchangers to get the most beneficent thermal desalination by combining different streams of fluid or water temperature. This process would be most efficient for industrial processes that require cooling as the cooling water can be used to create at least part of the heat energy for the fluid purification process. Some power plants, such as, nuclear power require large cooling towers to reduce the water temperature. This presents an opportunity to use the heat energy released from cooling the water using the purification process described above.

Post Treatment System:

Typically, the water produced from reverse osmosis needs to be treated to meet certain specification for industrial, municipal and agricultural usage. This process can be at a treatment center (to save space) or at the plant or on an offshore platform, as needed. Known post treatment equipment and processes, such as added small amounts of minerals, can be utilized used by persons skilled in the art to obtain favorable results using the embodiments described herein. In addition, the equipment can be engineered to fit inside a container to allow for the quick insertion and removal of post treatment equipment. Valves and piping can route or flow water through post treatment processes, as needed.

Combining Thermal Distillation with Membrane Filtration:

FIG. 1 illustrates a method or process that combines both thermal distillation and reverse osmosis water purification. The thermal distillation is at least partially powered by using an energy source or waste heat on the apparatus. The contaminated water such as, produced water is flowed through the reverse osmosis membranes using pressure captured from the pressure recovery device attached to the wellbore. The thermal energy can be obtained partially or completely from the wellbore.

Containerization:

Another issue with onsite and offshore applications is the cost and difficulty of placing operating crews onsite especially for offshore operations. Onsite and/or offshore crews need to be highly trained and compensated as they spend long periods of time onsite. In addition, the supply costs for essentials such as, food water and other necessitates adds to the costs. Automation has reduced the personnel needed in these onsite and offshore operations. Such automation includes the SCADA systems described herein.

Recent technological advantageous have allowed almost all equipment including thermal distillation and reverse osmosis equipment to be modular and scalable. This includes the pumps, power circuits and relays, pre-filtering equipment and post treatment as well as the reverse osmosis membranes.

For example, Lenntech supplies any type of water treatment in a containerized version. The advantageous of containerization include: plug and play unit, quick installation, limited design work, smaller foot print, mobile and easy transportation, turnkey delivery including piping, cables, air conditioning. However, in one embodiment, the individual components can be all made to be containerized to allow an entire plant, or substantially the entire plant, or at least most of the plant or field unit to be containerized. The piping and valves of the plant can be designed to allow for any container to be bypassed if a container needs repair, maintenance, or a container equipment and the resulting processes are not needed to favorably treat the water. The flow of the water can be controlled by the control system using sensors, valves, pumps and flow diverters as described below.

In one offshore embodiment, the ship or offshore plant will need to be modified to provide proper container infrastructure including container foundations, interconnected piping and electrical supplies. In one embodiment, the containerization of a water treatment plant does not only include the supply of a container, it includes the complete installation of the plant. This can be accomplished by having each container provide all the necessary components. The container can provide connected piping between equipment pumps, vessels, skids, tanks along with cabling and wiring of pumps and instrumentation inside the container that is connected to or in communication with the main controls or control system. However, increased efficiency and improved economy of scale can be obtained by having each container represent a specific stage or process in the salt water desalination process. The containers can then be run in parallel, series or combinations with crossover controlled by the SCADA system, as described above.

Most containers are 20 or 40-foot containers. In one embodiment, the containerization includes all piping and fittings connected, all cables and wires connected to instrument and control cabinet. This is a "plug and play" unit supply.

The container can have at least one removable wall or wall section, one inlet/outlet (terminal point), and floor drainage and can be air cooled if needed. Each plant can be fully 3D-design prior to construction to optimize space and placement of the containers. In this embodiment, the entire plant is modular and scalable and takes advantage of the design once build many. In addition, advances in technology can be seamlessly inserted into the process during routine maintenance and upgrades through supply ships.

Reverse Osmosis units often required pre-treatment for the following parameters: suspended solids, TOC, COD/BOD, hydrocarbons, iron, manganese, and hardness. In one embodiment, one container provides all the pre-treatment and process requirements. Alternatively, each container can house a specific pre-treatment option and the control system can route the water to the various pre-treatment options to obtain favorable properties.

In another embodiment, a set of containers houses the reverse osmosis membranes and additional set(s) of containers houses the pumps and electrical circuitry. To run the pumps and energy recapture equipment. The pump and electoral containers can then be strategically placed to provide the most efficient pumping system for the plant based on the design and performance specification of the plant. Energy and pressure recapture systems likewise can be placed inside the pump containers or can be placed in separate containers as needed. Pump skids can combine the pumping equipment into one central unit that is pre-wired, pre-piped and easy to install. These pumps skids can be engineered to fit inside a container, using the disclosure and containerization embodiments described above. With flexible and variable drivers and electronic components a selected pump or series of pumps can run multiple components and/or containers to optimize the operating efficiencies.

In another embodiment, the location of the power, input fluid lines, and first and second effluent lines are prearranged in a specific embodiment. The housing is adopted to automatically connect with quick disconnects the power lines, and piping lines in the plant with the container housing containing all the aligned corresponding and matching connections to quickly create a field unit.

Advances of robotic technology have allowed for quick and automatic pallet systems for moving and installing containers in an organized and efficient manner. These systems can be modified to house the containers and quickly install and/or remove any containers, as necessary. If a container breaks, the SCADA system can route the water purification to a container that his working and the automated system would quickly remove the malfunctioning container and replace with a working container in a reserve storage. During resupply, the supply vehicle or ship would bring replacement containers for broken container or containers needing service and send the removed containers to be serviced or repair. This would further reduce crew staffing as very little maintenance would be done onsite. In addition, the automated container system would maximize space and would not require large works areas for maintenance crews to operate thus, saving space on the site, offshore ship or platform. For quick maintenance, sections of the container wall or the entire container wall can be removed for maintenance purposes. For example, screws, fasteners of bolts can hold a wall or a wall section securely yet allow for the easy removal for maintenance and repairs.

Cooling Tower Embodiment:

In one embodiment, the heat exchanger could be used as part of an industrial plant cooling system. In this embodiment, an industrial plant cooling system comprises a heat exchanger, as adapted above to cool fluids or air while purifying water. In many plants, a cooling system is used to cool fluids or air before release into the environment, In one embodiment, the cooling tower can be retrofitted or engineered to have at least one or a plurality of heat exchangers that uses the heat energy of water to distill water by vaporizing the water. Condensation can also be used to improve the efficiency of the water purification process. In this embodiment, additional flow paths would be created to remove pure condensation throughout the process. Furthermore, air or water flowing through the process, either directly or indirectly can be adjusted to maximize water condensation.

Figure 20:
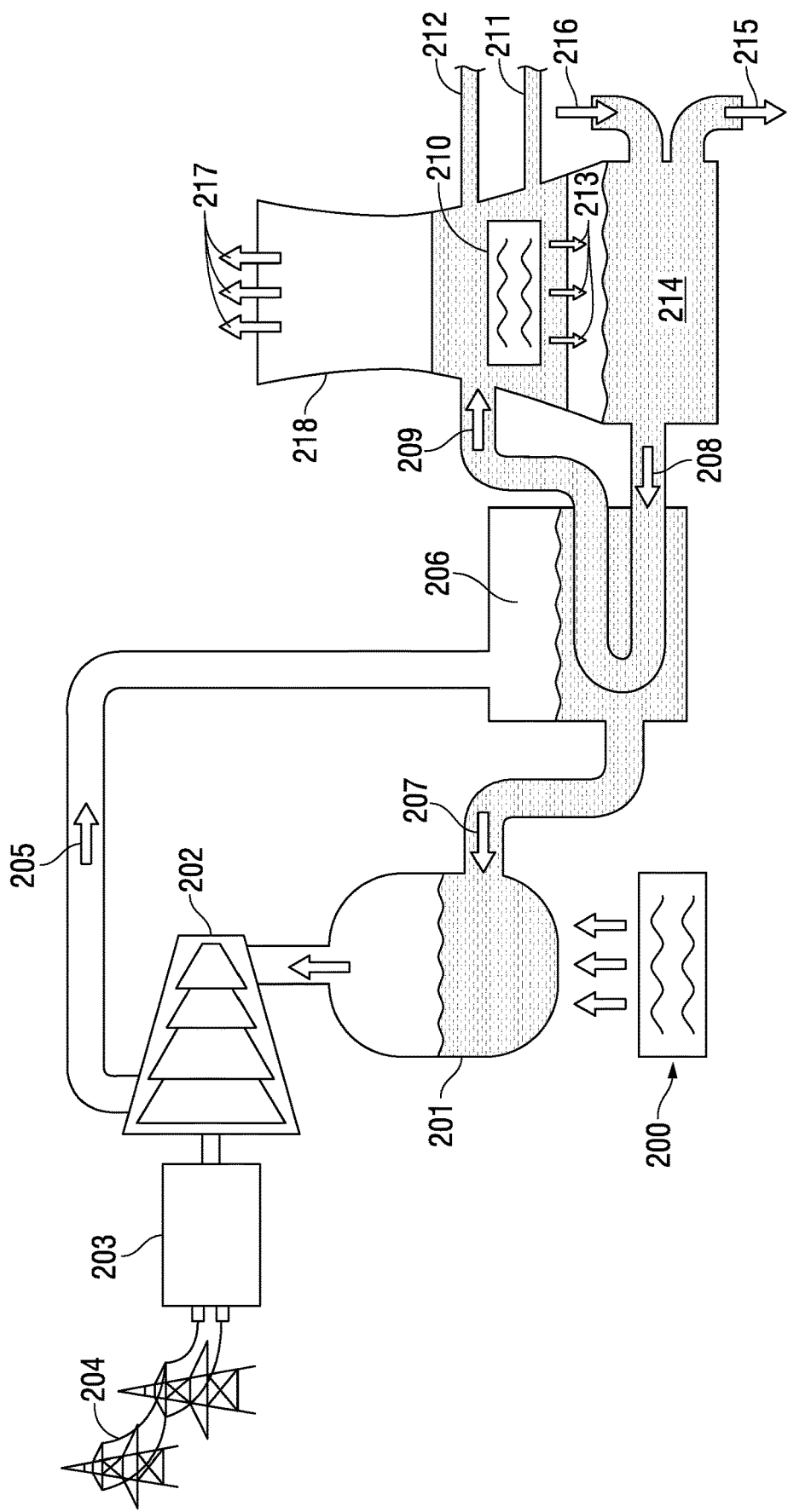
FIG. 20 is a schematic of a cooling tower embodiment of this invention.

FIG. 20 illustrates a schematic showing a cooling tower embodiment. In the Example shown in FIG. 20, a heat source 200 creates steam in a steam generator 201 and the steam powers steam generator 202. The steam generator 202 powers the turbine generator 203 which produces electricity that is sent to the electric grid 204. Steam 205 is flowed into steam condenser 206 where the steam is condensed into water and is used to pre-heat water as it is flowed into the steam generator 201, as shown by arrow 207. Alternatively, the steam condenser 206 can be the inventive heat exchanger, for example, from FIG. 3 and be used to produce water (not shown). In the example with the heat exchanger replacing the steam condenser 206, the heat exchanger 210 could be outside the cooling tower 218 or inside the cooling tower 218.

Cool water is flowed into (shown as arrow 208) the steam condenser 206 and leaves as hot water (shown as arrow 209) and is flowed into the cooling tower 207. The hot water 209 is then flowed through at least one heat exchanger 210 (and most likely, a plurality of heat exchangers) inside the cooling tower 207. Contaminated water 211 is flowed into the heat exchanger 210 and a portion is removed as purified water 212. Multiple flow paths 213 exit the heat exchanger 210 and enter the bottom 214 of cooling tower 207. A portion of the water on the bottom 214 is flowed through steam condenser 206, as shown by arrow 208 and a portion is removed as blow down, as shown by arrow 215. Additional make-up water 216 can be inserted into the cooling tower 207, as shown by arrow 216. Excess hot air or water vapor can exit the top of the cooling tower 207, as shown by arrows 217.

In an alternative embodiment, a series of heat exchangers inside (or outside) the cooling tower 218 can selectively create purified water through LTTD by using the different temperatures of various streams of fluid travelling through the system. In this embodiment, a plurality of heat exchangers, would be fed by a plurality of streams of fluid based on water temperatures to obtain favorable condensation and purification, as discussed above. This system can be combined or replaced with vapor extraction, as described above. The control system, as discussed below, would choose and regulate the streams to provide the most efficient system, based on water demands and cooling needs of the system.

Coal and nuclear power require tremendous cooling and would be suitable for this process as well as natural gas which requires less cooling but still needs some cooling. All steam based electrical generation which requires cooling could benefit from the water purification embodiments described herein.

Rocket Cooling Embodiment:

Rocket ship for space travel would require cooling and would need significant heat exchange that can be used to purify water. Combining this invention with the cooling of a space ship would enable space travel with less water as the water would be purified during the normal rocket cooling. Reducing the amount of water required for space missions would allow the rockets to Mars, for example, to carry more equipment to permit space travel and colonization.

Industrial Park Embodiment:

In one embedment, the heat exchanger is used as a system and method for efficiently running industrial parks. Industrial plants or parks are usually large warehouses or a series of warehouses to take advantage of economy of scale sand shared services. The shared services could include heat, water and electrical power. Accordingly, the waste heat or pressure or steam or water resources could be pulled together and shared for mutual benefit. In this system, any excess heat energy would be sent to another factory or could be sent to the heat exchanger to purify water for cooling or other industrial processes.

Food Plant Embodiment:

In food preparation, many factories use steam to prepare food including cleaning, cooking and sterilization of food. The excess heat could be used to run the inventive heat exchanger and purify water. The water to be purified can be an independent source or water produced from the food preparation that needs to be purified.

Desalination Plant Embodiment:

An entire desalination plant could be built using the embodiments described herein. For example, the desalination plant could be coupled with an electrical power plant where the waste steam is run through the heat exchangers to produce large volumes of water. Furthermore, the heat exchanger examples, could be combined with reverse osmosis plants to create additional synergies through shared heat transfer, based on the principals discussed herein.

Wellbore Embodiment:

In one embodiment, the apparatus and method can be used on an oil and gas wellsite, or geothermal sites. The energy source can be heat generated by flare gas or heat energy from wellbore operations such as, fracking and steam and gravity assisted operations. Using this system, water intensive operations such as, fracking, Steam and Gravity Drainage (SAGD), and water flooding can use the process to use contaminated water with the additional benefit of having purified water as a product.

In another embodiment, the heat exchanger could be adopted to be a wellbore distillation system. In this system, the heat exchanger would be preferably easily transported to a wellsite and can be on one or more skids, as described herein. The heat exchanger could then be coupled with a heat source and contaminated water source. The heat source could be from the wellbore or equipment around the wellbore or from a generator. In one embodiment, flare gas could be used to operate the generator and run the water purification system. This would help comply with regulations banning wasteful natural gas flaring. Likewise, the system could be used on offshore oil platforms where it is expensive and difficult to provide fresh water for the platform and flaring is common.

Flare Gas Device:

In on embodiment, gas can provide the energy for the heat exchanger apparatus. The flare gas can be from industry or from a wellbore. Recently, the oil and gas industry is moving away from using salt water flooding because of all the problems with salt water. The problems from slat water include microbes, chemical reactions and salt water scaling.

Figure 21:
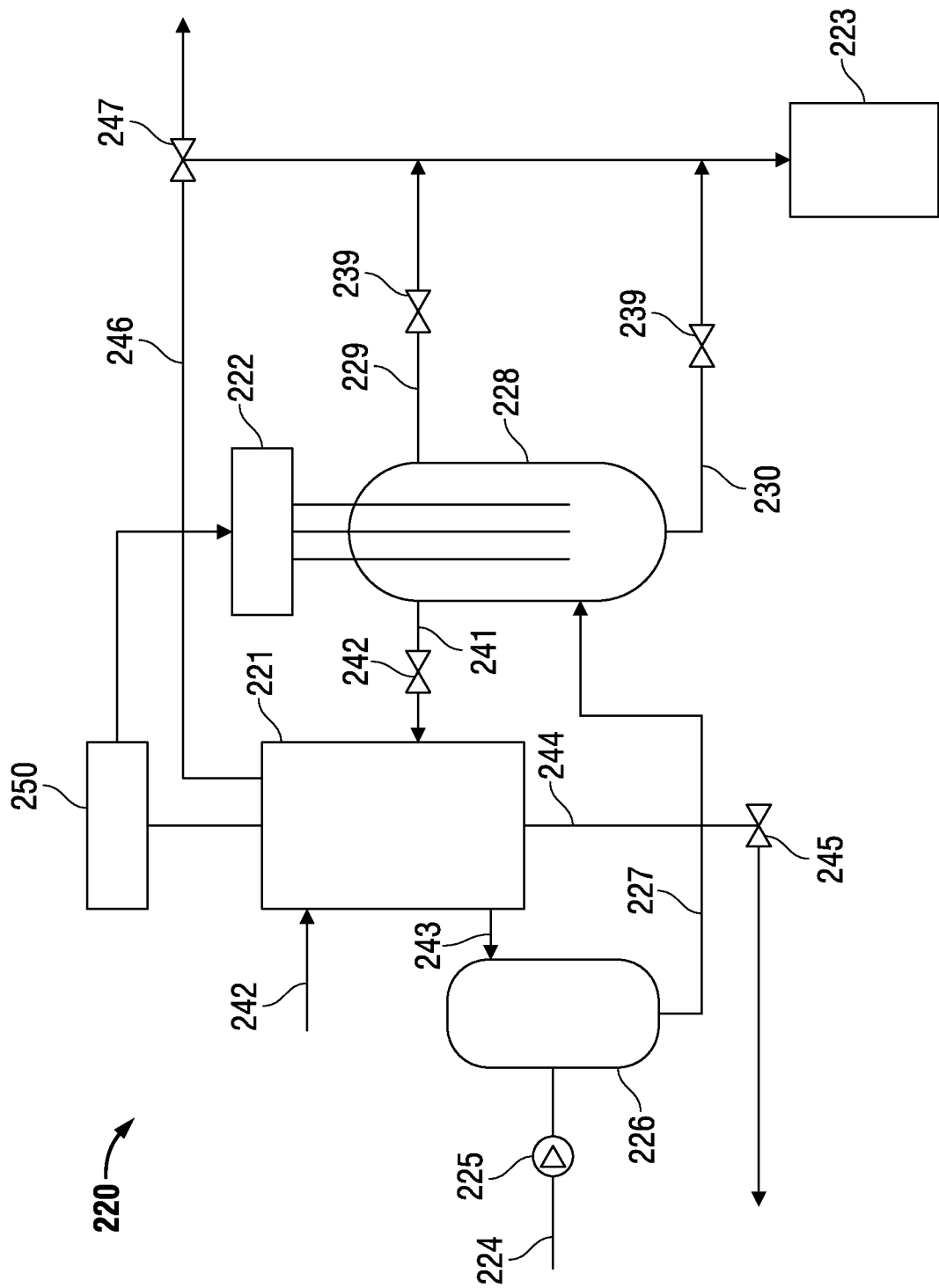
FIG. 21 is a schematic of a wellbore equipment embodiment of this invention.

FIG. 21 is a schematic of a wellbore equipment apparatus 220 embodiment of this invention. As shown in FIG. 10, a modified heat exchanger 221 is provided. The heat exchanger 221 could be combined with other equipment or be placed on an independent single skid system, as discussed below. For example, the single skid system could have a flare gas component to run the desalination equipment independently or can be adopted to work with outside componentry, to achieve a favorable system.

In this example shown in FIG. 21, a power source 222 (or heat source) is used to create steam for injection into the wellbore through well head 223. Water is fed through water line 224 by pump 225 into de-aerator 226. De-aerated water 227 leaves the de-aerator 226 and flows into steam generator (or boiler) 228 to create steam streams 229 and 230 controlled by valves 239 for injection into the wellbore through well head 223.

The excess heat stream 241 from steam generator 228 is controlled by valve 242 and is run through heat exchanger 221 and can then be recycled into the de-aerator as stream 243. A local contaminated water stream 242, such as, salt-water is flowed into heat exchanger 221 for water purification and is separated into contaminated stream 244 controlled by valve 245 and purified stream 246 controlled by valve 247. The purified water as steam can then be injected into the wellbore through well head 223 or can be flowed for other uses.

A control panel 250 can be connected to any wellbore equipment of apparatus 220 including but not limited to the power source 222 and the heat exchanger 221 to control and operate the system favorably. The control panel could be a SCADA system or be a remote connected to a SCADA system, as described below.

Refinery or Industrial Plant Embodiment:

FIGS. 22a, 22b and 22c illustrate a gas burner and heat exchanger combination as described above. The heat exchanger can have slanted baffles and holes inside cones to create multiple flash chambers wherein like elements have the same reference numerals. In the Embodiment shown in FIG. 22b an outer housing 903 is attached to valves 904 to allow fluid to flow in and out of the heat exchanger. An optional stand 908 allows the unit to be freestanding and fan blower 905 adds additional air to the gas burner to facilitate more efficient gas combustion.

FIG. 22c is a cross-sectional view of FIG. 22b. FIG. 22c illustrates the placement of the air blower 905 and the fin tube heat exchanger 181. The embodiment shows a series of cones 901 with internal baffles 902 to allow multi stage distillation to occur inside the heat exchanger by allowing the baffles on the cones to act as independent stages.

Figure 23:
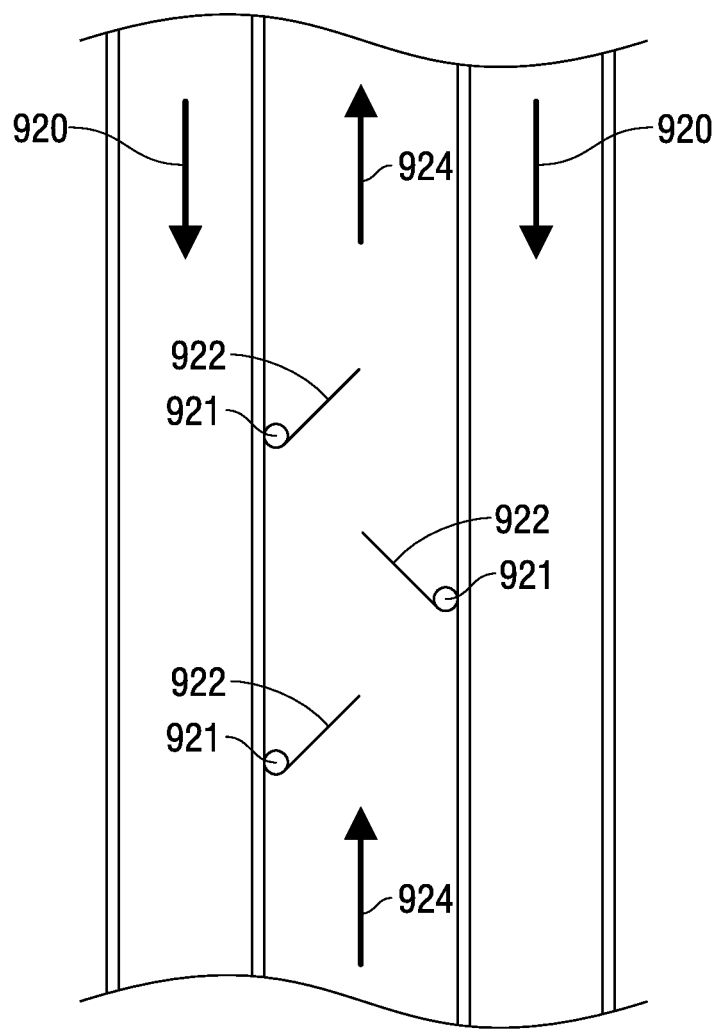
FIG. 23 illustrates an alternative distillation Column with perforations and baffles.

FIG. 23 illustrates a distillation column 900 showing the purified vapor flows 924 and the denser contaminate flows 920 or brine with the labeled arrows. Baffles 922 and holes 921 inside the inner tube 923 create a multi flash system inside the distillation column 900. Depending on the contaminates, flow rate and desired purity a perforated pipe can also be used as the distillation column.

In the embodiments described above, the contaminated fluid was flowed into the heat exchanger using gravity or pumps. An alternative embodiment would be to spray or an aerosol device to inject the contaminated fluid into the heat exchanger to improve the thermal distillation efficiencies.

The definition of an aerosol is a "mixture of gas and liquid particles." More specifically, an aerosol is a colloid of fine liquid droplets (sometimes with fine solid particles), in air or another gas. The liquid or solid particles have diameter mostly (more than 50%) smaller than 1 μm.

An atomizer nozzle is typically used to create aerosol or atomized fluid. When a fast gas stream is injected into the atmosphere and across the top of the vertical tube, it is forced to follow a curved path up, over and downward on the other side of the tube. This curved path creates a lower pressure on the inside of the curve at the top of the tube. This curve-caused lower pressure near the tube and the atmospheric pressure further up is the net force causing the curved, velocity-changed path (radial acceleration) shown by Bernoulli's principle. The difference between the reduced pressure at the top of the tube and the higher atmospheric pressure inside the bottle pushes the liquid from the reservoir up the tube and into the moving stream of air where it is broken up into small droplets (not atoms as the name suggests) and carried away with the stream of air.

Another option is to use a nebulizer. Nebulizers use oxygen, compressed air or ultrasonic power to break up solutions and suspensions into small aerosol droplets.

Another option is to use centrifugal forces to help separate the vapor from fluid. In this embodiment, the innermost tube or central tube can be subjected to centrifugal forces by rotation. Alternatively, a membrane can be installed inside the inner tube to help with separation. The membrane can be cleaned by backwashing. Finally, a low pressure or negative pressure or vacuum pump can be attached to allow low temperature evaporation. The combination of these technologies can create an efficient system. In one embodiment the combination of an atomizer, and vapor extraction with the rotation of the tubes can create a system so efficient that little or no additional heat is necessary. In this embodiment, a tube inside a tube design allows the entire atomization, vaporization and separation to occur in one device. The condensation energy can then transfer heat to the feed water to make the process more efficient.

In many industrial plants and refineries there are multiple product streams and waste stream that are cooled before leaving the plant. In one embodiment, the heat exchangers are modified to both cool the product and waste stream and produce water. For example, a standard shell and tube heat exchanger can easily be modified to cool and purify waste water.

Figure 24:
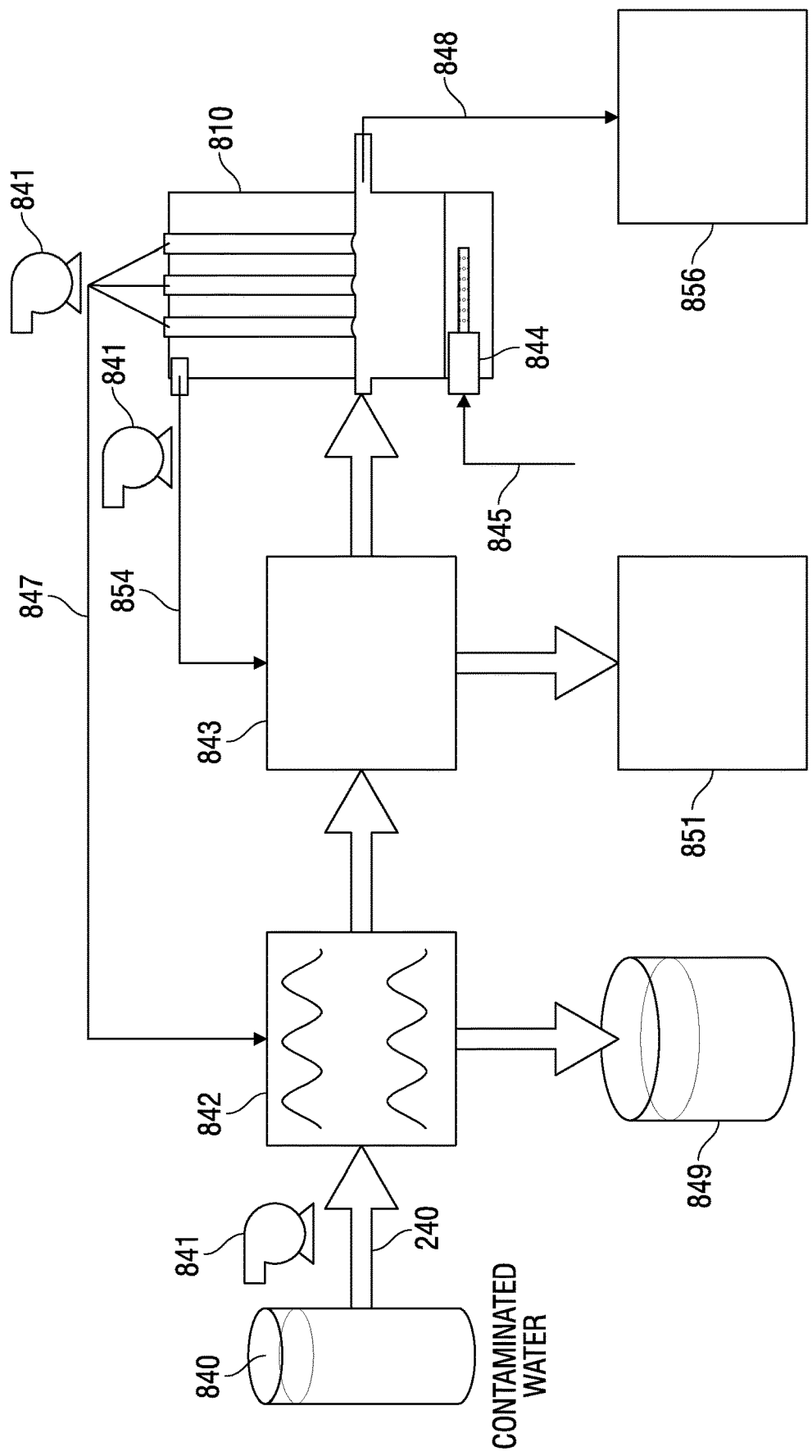
FIG. 24 illustrates a wellsite water purification embodiment.

FIG. 24 illustrates an example of a wellsite embodiment that can be run on natural gas including flare gas or alternatively geothermal or solar thermal. As shown in FIG. 24 the contaminated water which is typically in a storage tank 840 is run with pumps 841 through a preheater stripper 843 and a gas burner 844 fed by methane gas line 845 connected to the heat exchanger 810. In one embodiment the methane gas line 845 can be redirect gas being sent to a pipeline or flare boom at the wellsite. Alternatively, solar thermal or geothermal or waste heat energy can replace the gas burner based on the disclosures herein. The heat exchanger can be any heat exchanger including a shell and tube or plate or hybrid like those in FIG. 22b. The water in the heat exchanger is separated into a water vapor 847 that is sent with or without optional pumps that can serve as vapor extraction pumps through the pre-warmer to condense and increase the feed temperature of the contaminated water 240 before being sent to purified water tank 849. The brine 848 is sent to s a storage tank for reuse as a heavy drilling fluid or for disposal. The fume gas exhaust 854 can then sent with optional pumps 841 to hydrocarbon stripper 843 to create Co2 and air with the hydrocarbons being sent to a hydrocarbon recapture system 851 with the goal of selling the hydrocarbons. This system can be used as a Co2 recapture system for industrial reuse or reinjection.

Discharge System:

A static discharge device or multi-component variable device or combinations can be employed to mix the effluent discharge water with seawater. A static system would utilize physical equipment such as baffles or barriers to mix the water.

In one embodiment multiple fluid injectors can be used to insert and mix seawater with the effluent discharge. Furthermore, the seawater discharge and mixing can be used to generate electricity to improve operational efficiency and reduce the carbon footprint. Another option is to create preferential fluid flow to create mixing in the discharge tubing. Such a device is disclosed in U.S. Patent Application No. 62/245,285, filed Oct. 23, 2015 and published as US Patent Publication no. 2017/10113194, which is hereby incorporated by reference. In addition, such as device can be coupled with hydroelectric generators to create electricity and provide power to the plant and any excess power can be recycled into the power grid.

Figure 25:
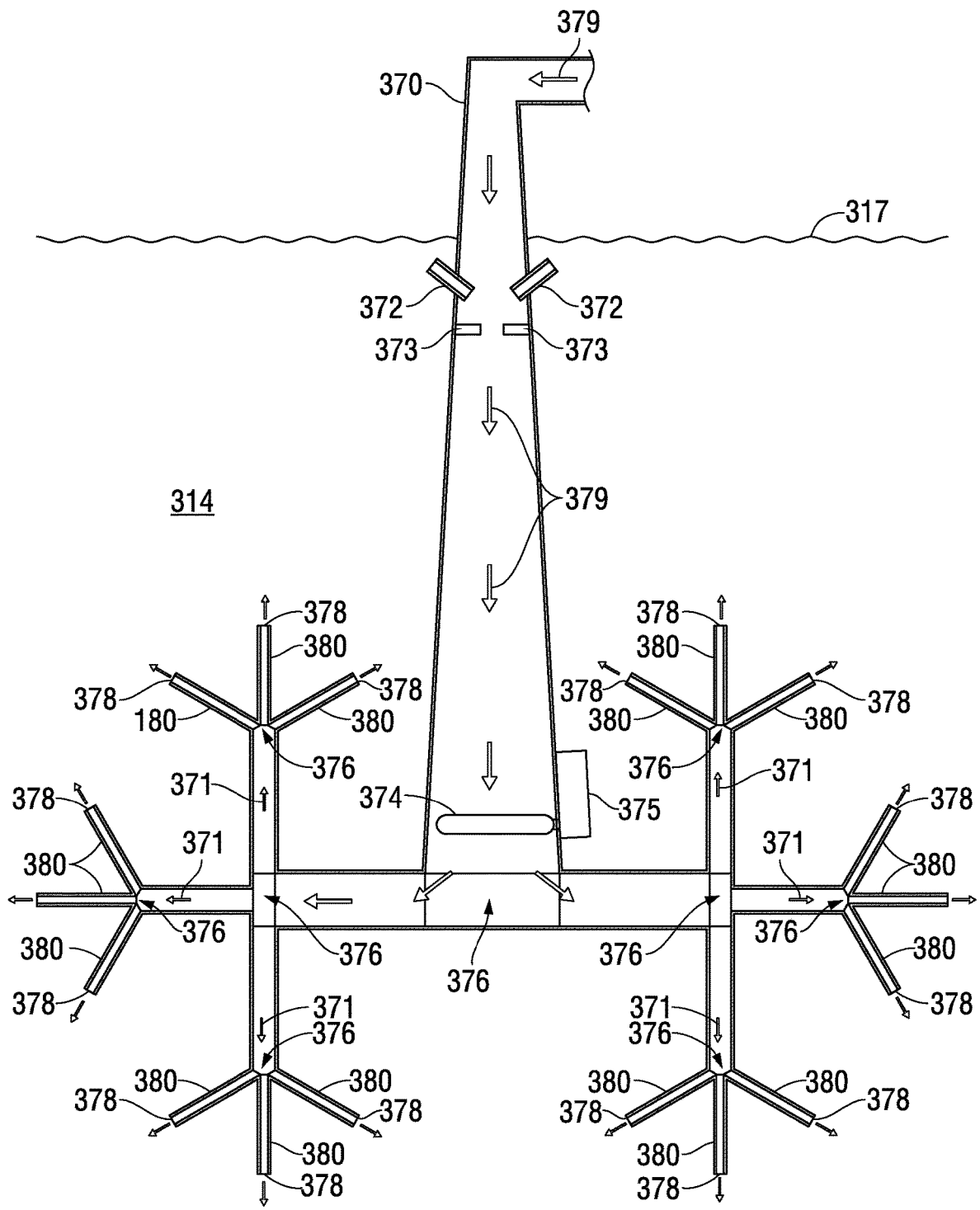
FIG. 25 is a discharge embodiment showing inlets designed to create a vortex for mixing and hydroelectric power from the discharge fluid flow.

FIG. 25 is an elevational schematic showing embodiments to mix discharge fluids with saltwater while generating electricity. As shown in FIG. 25, the discharge pipe 370 flows discharge fluids 379, as shown by arrow 371. The discharge pipe 370 is shown as a gradually expanding pipe diameter as depth below the sea floor 317 increases. The discharge pipe 370 is shown with two inlets 372, two baffles 373 and only one paddle 374 connected to the hydroelectric turbine generator 375. The inlets 372 are shown as mechanical funnels attached to the sidewalls of the discharge pipe 370. Additional or different inlets, paddles, baffles and generators and other equipment necessary to achieve favorable mixing can be installed, as discussed above, or as known to persons skilled in the art, with the benefit of the disclosure herein.

As shown in FIG. 25, a plurality of devices 376 for sealing off section of the pipe are installed. Suitable devices 376, for sealing off a section of pipe, include, but are not limited to, one-way valves, movable hatches, movable seals, selective flow membranes, or combinations thereof. In the embodiment shown, the opening and closing of the devices 376 are operable to seal, open or partially close fluid flow pathways to multiple alternative discharge section pipes 380 and thus, provide multiple, or alternative flow pathways. At least one discharge device (not shown), which can include, but is not limited to, one-way valves, seal, hatches at the outlet, membranes or combinations thereof, can prevent ocean water 314 from flowing into the discharge pipe 370. If any back-flow pressure starts to build, at least one of the plurality of devices 376, as discussed above, can close and seal off at least one alternative section of pipe 380 before the back-flow pressure causes pressure and/or fluid flow starts to flow in the direction opposite flow arrow 371. The system can then open at least one alternative section of pipe 380 to allow continuous flow of the discharge effluent. Once the at least one of the plurality of devices 376 closes, an alternative section of pipe 380, the outlet 378 and/or discharge device (not shown) can be fully opened to allow the discharge water in the sealed section of pipe to equalize with the ocean pressure. Alternatively, ports (not shown) on the sidewall of the closed section of pipe can open to allow equalization and then the ports and/or outlets 380 can close once the water pressure is equalized, as needed. Pumps (not shown) can then pump the discharge fluid out and draw air from the surface or section of the discharge pipe with little or no fluid. Alternatively, a compressed gas system (not shown) can be installed along one, or more, of the alternative flow path section of the pipe.

A pipe-in-pipe embodiment could be utilized with the outlet system. Pipe in pipe have been used in the oil and gas industry to transport different types of fluid and gasses in one line. Typically, at least one interior pipe is paced inside a larger exterior pipe creating at least two separate flow paths. In this design, the interior pipe would handle the effluent brine and the space between the exterior of the inner pipe and the exterior pipe would be for salt water that is injected into the inner pipe for mixing. Therefore, both the exterior pipe and the interior pipe would have ports. The exterior pipes would allow the free flow of sea water and the interior ports would inject the seawater into the interior pipes to facilitate advantageous mixing as described above.

Control Panel:

In one embodiment, a control system is provided with the apparatus to obtain favorable operation and performance of the apparatus. Factors to be considered for favorable operation of the apparatus and system include, but are not limited to: energy costs, amount, cost and quality of fresh water and contaminated fluid available, water demand and consumption, amount of cooling or heating needed by the water, fluctuations in water and energy demands, amount of excess heat, cooling or energy available, design of the equipment, operational conditions of the equipment, water temperatures of a plurality of fluid streams, differences between the streams of water, and combinations thereof.

Figure 26:
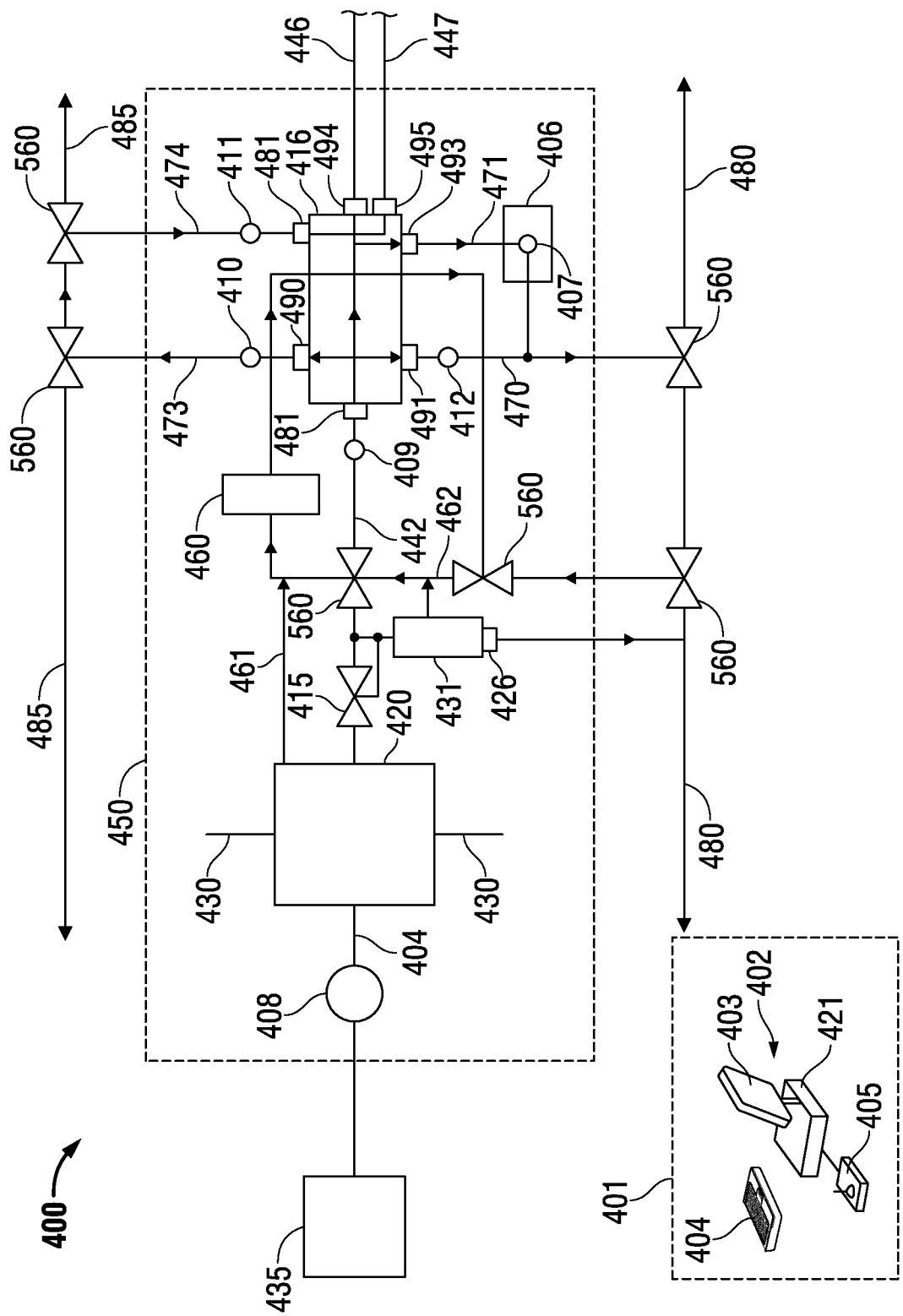
FIG. 26 is a schematic showing a SCADA control system embodiment for operating an offshore water purification or desalination plant.

FIG. 26 further shows a schematic of a water purification apparatus and system 400 including a control center 401. In one embodiment, the controls can be standard manual or even automated controls. However, the purification system can achieve even greater efficiencies and improved performance by using more advanced control systems, which may include a signal capture and data acquisition ("SCADA") system 402. SCADA is also an acronym for supervisory control and data acquisition, a computer system for gathering and analyzing real time data. SCADA systems are used to monitor and control a plant or equipment in industries such as telecommunications, water and waste control, energy, oil and gas refining and transportation. A SCADA system gathers information, such as sensors or gauges, transfers the information back to a central site, alerting central site of the information, carrying out necessary analysis and control, such as determining if the changes are advantageous or necessary, and displaying the information in a logical and organized fashion. SCADA systems can be relatively simple, such as one that monitors environmental conditions of a small building, or complex, such as a system that monitors all the activity in a nuclear power plant or the activity of a municipal water system. In addition, recent improvements in computer power and software configurations allows entire systems to be operated in real time with or without human interaction. The real time capabilities allow the control system to make decisions based on multiple factors and operate the water purification system favorable with little or no operator interaction.

Persons skilled in the art, with the benefit of the disclosure herein, would recognize similar monitoring and/or control systems that can be operatively connected therewith the disclosed apparatus, and which may thus be used in conjunction with the overall operation of the system 400. The SCADA control system 402 which is shown as a computer 421 with a display panel 403, keyboard 404, and wireless router 405, may include any manner of industrial control systems or other computer control systems that monitor and control operation of the system. In one embodiment, the SCADA system 402 may be configured to provide monitoring and autonomous operation of the system 400.

The SCADA controlled system 402 may be interfaced from any location on the apparatus, such as from an interface terminal 406. The interface terminal can include, cellular or satellite communication equipment, a wired or wireless router, servers or traditional wired connections, and any combinations thereof. In the embodiment shown in FIG. 26, a sensor 407 is connected to the interface terminal 406. In an embodiment, the SCADA system including a portion, or all the interface equipment and controls can be on an operations section of the apparatus. Additionally, alternatively or as a backup, the SCADA controlled system 402 may be interfaced remotely, such as via an internet connection that is external to the apparatus. An internet interface may include a viewer or other comparable display device, whereby the viewer may display real-time system performance data. In other embodiments, the SCADA system 402 may be able to transfer data to spreadsheet software, such as Microsoft Excel or to a smart phone or tablet app. The data may be related to temperature, salinity, excess heat or cooling needs, excess energy or co-generations from industrial processes, pressure, flow rate, fluid levels, and/or other similar operational characteristics of the system 400.

The operations of the system 400 may utilize several indicators or sensors, such as cameras including infrared cameras, ultrasonic sensors, sight glasses, liquid floats, temperature gauges or thermocouples, pressure transducers, etc. In addition, the system 400 may include various meters, recorders, and other monitoring devices, as would be apparent to one of ordinary skill in the art. Sensors 407, 408, 409, 410 411, and 412 are shown in FIG. 8. These sensors, shown in FIG. 8, are for the following, initial feed stream 404, feed stream 442 before entering the heat exchanger 416, first purified vapor exit stream 473, second purified vapor exit stream 474, first contaminated fluid output 470, second contaminated fluid output 471, respectively shown as 408, 409, 410, 411, 412 and 407. These devices may be utilized to measure and record data, such as the quantity and/or quality of the intake fluids, temperature, the liquid phase(s) in the apparatus, and the vapor or water produced by the system 400.

The SCADA control system 402 may provide an operator or control system with real-time information regarding the performance of the apparatus 400. Any components, sensors, etc. of the SCADA system 400 may be interconnected with any other components or sub-components of the apparatus or system 400. As such, the SCADA system 402 can enable on-site and/or remote control of the apparatus 400, and in an embodiment, the SCADA system 402 can be configured to operate without human intervention, such as through automatic actuation of the system components responsive certain measurements and/or conditions and/or use of passive emergency systems. In another embodiment, the system can operate in real-time wherein a plurality of factors or all relevant factors are instantaneously or nearly instantaneously determined and used to calculate the most favorable operations. This real-time operation allows all components to be operated in a coordinated manner based on variables as received in real time or instantaneously or nearly instantaneously.

The system 400 may be configured with devices to measure "HI" and/or "LOW" temperatures, density, pressure or flow rates. The use of such information may be useful as an indication of whether use of additional heat or a compressor in conjunction with the apparatus is necessary, or as an indication for determining whether the fluid flow rate should be increased or decreased. Alternatively, the information could be used to determine which fluid streams would create the most advantageous temperature differentials for creating water vapor and decide where and when to recycle or dispose of each stream. The system 400 may also be coupled with heat, pressure, and liquid level safety shutdown devices, which may be accessible from remote locations, such as the industrial energy or external heat source (not shown).

The SCADA system 402 may include several subsystems, including manual or electronic interfaces, such as a human-machine interface (HMI). The HMI may be used to provide process data to an operator, and as such, the operator may be able to interact with, monitor, and control the apparatus 400. In addition, the SCADA system 402 may include a master or supervisory computer system such as, a server or networked computer system, configured to gather and acquire system data, and to send and receive control instructions, independent of human interaction such as real time, as described below. A communication device or port or remote terminal ("RT") may also be operably connected with various sensors. In an embodiment, the RT may be used to convert sensor data to digital data, and then transmit the digital data to the computer system. As such, there may be a communication connection between the supervisory system to the RT's. Programmable logic controllers ("PLC") may also be used to create a favorable control system. In FIG. 8, the RT and PLC would most likely, but would not necessarily, be in the interface terminal 406

Data acquisition of the system may be initiated at the RT and/or PLC level, and may include, for example, gauges or meter readings such as, temperature, pressure, density, equipment status reports, etc., which may be communicated to the SCADA 402, as requested or required. The requested and/or acquired data may then be compiled and formatted in such a way that an operator using the HMI may be able to make command decisions to effectively run the apparatus or system 400 at great efficiency and optimization. This compilation and formatting of data can be used to enable real-time operations, as discussed below.

In an embodiment, all operations of the system 400 may be monitored via control system 401 or in a control room within the operations section 450. In an embodiment, the operations section 450 may be mounted on the neck of a trailer. Alternatively, or additionally, the system 400 can be operable remotely and/or automatically.

In one embodiment, the entire operations section of the apparatus can fit on a mobile skid usable within the scope of the present disclosure. Specifically, all equipment including the SCADA control system 402 can be located on a single skid such as, a mobile trailer or modified truck.

Various embodiments of system 400 can include various separators. For example, an initial two- or three-phase separator (if vapors need to be removed) 420 is shown, which can be configured to receive an input stream 404 (for example, a contaminated water stream) which can be at a high pressure using pumps or pressure or gravity to create efficiency. The separator 420 can be used to receive one or more streams 430 from the input stream 404 provided by source 435 to remove solid contaminates, which is removed from the process using devices known in the art such as, a dump valve 415.

Excess heat or multiple streams of water with differential temperatures can be introduced into the heat exchanger 416 through inlet 481. As described above, in the heat exchanger, at least a portion of the purified water is removed from the contaminated water. This removal is done in the heat exchanger by using density differences between the purified water vapor created and the heavier contaminated fluid. FIG. 26 shows a first contaminated fluid exit stream 470 and a second contaminated fluid exit stream 471 exiting heat exchanger 416 through outlets 491 and 493 respectively. The contaminated fluid streams 470 and 471 that exit outlets 491 and 493 are then combined with contaminated fluid line 480. Alternatively, valves or similar devices 560 can recycle the contaminated water through the line heater 460 and/or heat exchanger 416 to obtain favorable operating conditions through heat exchanger 416. Using a plurality of flow paths and/or internal condensation sections, the purified water is removed using a first purified water discharge stream 473 through outlet 490 and a second purified water discharge stream 446 through outlet 494.

In the embodiment shown in FIG. 26, the first purified water discharge stream 473 through outlet 490 is sent to purified combined line 485. Valves 560 control the flow direction of first purified water discharge stream 473 and whether first purified water flow stream is recycled 474 through the heat exchanger 416 through inlet 481 to transfer heat energy to heat exchanger 412 and then exits through outlet 495 as purified water 447 through outlet 495. An additional or a plurality of recycling lines, of at least two or more, can be engineered into the heat exchanger 412 and/or adding additional heat exchangers (not shown) that can be used in series or parallel. The additional recycling lines and heat exchangers permit additional recycling options and heat transfer options. Persons skilled in the art, with the benefit of the disclosures herein would know how to engineer the additional lines to achieve favorable results.

As discussed above, both the purified water streams and contaminated water streams can be recycled though the heat exchanger 416 to obtain favorable conditions including water temperature differentials to create water vapor. In addition, pressure differences of the water, or other fluids flowing to and/or from the apparatus can be used to favorably move the water and vapor with little or no use of pumps. Purified water separated from flow streams within the system 400 can be transported and/or released from the heat exchanger 416 using one or a plurality of more purified water or vapor outlet ports such as, 490, 494 and 495 for exiting purified streams 473, 446 and 447 respectively. Similarly, purified water, stream 485 can be flowed into or from the system 400 and/or otherwise controlled using a water valve or ports 560, and contaminated fluid streams 480 can be flowed into or from the system 400 using one or a plurality of valves or port 560. As described previously, both the contaminated streams and purified water streams can be flowed from the system 400 into tanks, header lines, sales lines, or similar vessels and/or conduits which are not shown but easily understood in the art.

An embodiment of the system 400 is also shown including a filter or solid separator 431, such as, a sand separator, which can be used to separate solids (e.g., sand and/or other entrained particles) from one or more flow streams within the system 400. Separated sand and/or other solids and/or slurries can be removed from the system via an exit such as, a dump port 426 and sent to contaminated stream 480. Alternatively, an electrocoagulation or biological system can replace solid separator 431. In this embodiment, solids are removed before the fluids are subject to heat energy to efficiently use the heat energy to create vapor.

In FIG. 26, a fluid purification apparatus is shown including a line heater 460, usable to heat flow streams received from the first three-phase separator 420 and/or other recycled streams within the system 400, and a purified water and waste fluid discharges and related equipment for use of processing, measuring, and removing from the apparatus one or more flow streams.

The SCADA system would also be connected to sensors on the wellhead and energy recovery devices to effectively run the pumps powering the membrane filtration and reverse osmosis membranes and other equipment. This SCADA could manage the available pressure and temperature and equipment to most efficiently purify the water.

The depicted embodiment is merely exemplary, and that various types and quantities of separators and other components can be connected, as needed, to effectively separate and process a desired input stream, and provided with any manner of gauges and/or other measurement devices.

Synergy with Alternative Energy Sources:

Many alternative energy sources have the problem of not providing consistent energy production or the ability to manage energy production efficiently. This process, using a control system or the SCADA system described above can fix the problem by providing efficient energy production by combining the water generation with other alternative energies. For example, wind power only provides power during significant wind and solar power provides only energy during sunlight.

Combining the water production during excess power or heat consumption using alternative energy such, as wind, solar, geothermal, organic matter, hydroelectric, wave energy, or battery or other heat or energy storage systems, could make alternative energy more cost effective with other energy sources. Many of the heat exchanger described herein are agnostic on the energy source and can be run on solar and solar thermal energy.

Single-Skid Embodiment:

Now referring to FIG. 26, in one embodiment, at least one separator, heat source, such as, excess heat, line heater, heat exchangers, and all conduits necessary to interconnect these components, as well as each of the external valves and/or ports that provide discharge of waste fluid 480 and removal of purified water (485, 446, and 447), can be provided on a single mobile member 450, such as, a movable trailer. SCADA monitoring devices such as sensors, 407, 408, 409, 410, 411, and 412 are also shown in association with various system components; however, control and/or monitoring devices can be provided in association with any portion of the system 400 and can be controlled on-site, such as through use of controls within the operations section 450. In FIG. 26, the controls are shown as a remote computer 401 but can be a cabin area within the movable trailer having solar panels thereon, remotely (such as, cellular satellite, or internet interface), and/or automatically, such as through use of automated controls that operate responsive to predetermined conditions, coupled with emergency systems to automatically cease operation of certain components if needed.

Embodiments disclosed herein thereby include systems and methods for performing a purification process, that require only a single mobile member, having most or all the equipment necessary for the separation process operably interconnected upon arrival. As such, assembly or rig-up and disassembly or de-rig times for the present system can be far less than conventional systems, which can require a full day or longer to assemble. Embodiments described herein can be assembled and used in 50%, 75%, and 90% less time than that required to rig up a conventional system. Further, the transportation time and costs associated with a single-skid unit are drastically reduced when compared with those associated with conventional fluid purification systems.

Modeling Embodiment:

In one embodiment the control system or SCADA system could be used to run fluid modeling on a water purification apparatus or even test a model for changes or improvements in the system. This model could involve several steps: 1) Run the system using normal operations or have SCADA record operational conditions during regular operations; 2) Run fluid modeling and heat transfer modeling software to determine which designs works best; 3) Adjust parameters such as heat, pressure and throughput to achieve the best efficiencies; 4) Model various process using known adjustment variables to display the best possible parameters for the entire process; and 5) adjust the variables such as energy and fluid flow and final density of the brine to get the best operational results or efficiencies. In addition, designs can be tweaked to adjust tubing sizes and openings based on the modelling Transportation Efficiency Embodiment:

Embodiments disclosed herein may beneficially provide industrial heat processes, the ability to use a single-skid unit that does not require a series of trailers or trucks to be connected on location. This provides a safer system by minimizing piping between high-pressure equipment. Additional benefits include: purified water and waste water may be readily measured, and fluids may be separated more efficiently and accurately. The single skid mobile unit may be cost-effectively deployed and may provide all necessary unit operations to purify water on a single unit, which provides an advantage over the use of multiple units, skids or train of trucks at a work site. Reduced transport efficiencies including reduction in rail, water and truck traffic can reduce the costs of transportation including reduced energy including fuel consumption, reduced accidental discharges, as well as reduced wear and tear on highways and local roads. In one embodiment, the entire system can be engineered to fit into a single container unit that can be easily transported, via ship, rail, or truck. In another embodiment, the unit on a skid can be engineered to fit inside a container for quick transport.

Container Embodiment:

In this embodiment, a heat source can be coupled with the heat exchanger to form a transportable device. The heat source could be a generator or other mean such as, an alternative energy device. The generator could be chosen from the group consisting of diesel generators, natural gas generators, gasoline generators, propane generators, alternative energy generators, and any combinations thereof. The generator could be used to create heat and run the pumps and any pre- or post-treatment processes, as necessary. In this embodiment, a water line would be connected to the water source to be purified. An electrical current could power the heat source, or a gasoline, natural gas or diesel generator could be connected to existing gasoline, natural gas or diesel lines respectively or can be run by solar. A storage tank on the skid could provide a limited supply of diesel or alternatively a large storage device could house fuel including but not limited to propane, diesel, natural gas and gasoline. The device would have at least one purified water line and at least one contaminates line as well and an output line for electricity. The generated electricity could be used to power additional equipment or be sent into the power grid.

Figure 27:
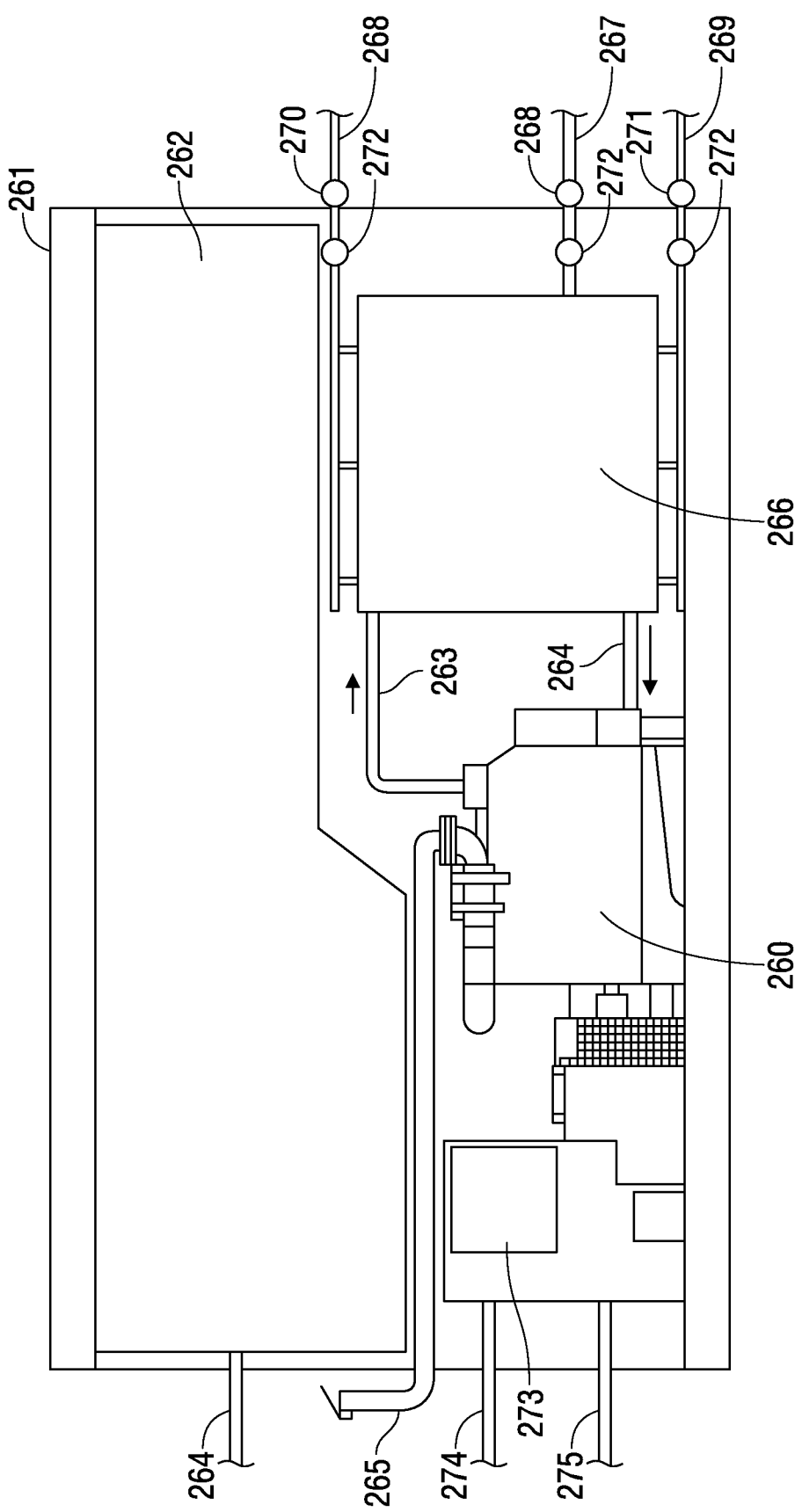
FIG. 27 is a schematic showing a water purification system on a single skid embodiment.

As discussed above, this single skid embodiment would be useful for disaster relief as the entire skid could be transported by truck, rail or ship quickly to provide water and power until power and water is restored. This embodiment is shown by FIG. 27. In this embodiment, a diesel generator 260 is placed inside a shipping container 261 with a fuel tank 262 and inlet 264 for connection to a diesel fuel line. The exhaust is sent through exhaust pipe 265. The fluid from the radiator of the generator 260 is sent as fluid stream 263 through the heat exchanger 266. Contaminated water line 267 is connected to the skid through port 268 and the contaminated water is flowed through heat exchange 266. As discussed above, the contaminated water stream 267 is separated into purified stream 268 and contaminated stream 269 by exiting through ports 270 and 271 respectively. Pumps (or vapor compression devices) 272 can assist in flowing the fluid, as needed.

Vapor compression and/or extraction equipment could be attached to the outlets of the units to make the process more efficient. Other options include pumps at the inlets to improve efficiency. The vapor extraction pumps would most likely be designed to be outside the heat exchanger and skid equipment. However, if space was an issue vapor extraction and pumps could be engineered to be inside the skid and/or the heat exchanger.

In alternative embodiments, the heated exhaust line 265 could also be diverted to a second heat exchanger (not shown). The second heat exchanger can have one or more contaminated water lines going into the heat exchange and could insert the heat energy as a gas or as liquid depending on the cooling and exhaust systems of the generator. As discussed above, the heat exchanger then outputs at least one purified water component, and at least one contaminated line. It may be preferable to output the contaminated lines in several streams to remove the contaminates during multiple points inside the heat exchanger, as needed, to keep the system efficient. A control panel 272 system could be on the skid or in a cabin or remotely to runs the skid efficiently, as discussed previously. Furthermore, a plurality of skids could be run by one control panel to operate the skids in the most efficient manner, as discussed below.

Power connector 274 provides power to the control panel 273, generator 263 and other equipment on skid 261, when the system is not producing power. Power connector 275 can output power to other devices or the electrical grid when the generator 260 is producing power. During non-peak power demand, the control panel 274 could shut off one or more skids or reduce output, as needed. In one embodiment, the generator could be a variable power generator that can produce more heat to the heat exchanger for water purification instead of electricity, as demand is needed.

This system could provide emergency power and water resources to communities, in need. In addition, factories that have no longer access to water and power could be run by this container or skid system until the power and water is restored. Many factories, hospitals and school and other important buildings have emergency power through generators. This system can be combined with industrial emergency generators to also provide water in emergencies.

Ship Embodiment:

Heat exchangers and water desalination equipment is typically required for most large ships including cargo ships, cruise ships and most surface naval ships and submarines. Typically, fresh-water is used in a closed circuit to cool down the engine room machineries. The fresh-water returning from the heat exchanger after cooling the machineries is usually cooled by sea water in a sea water cooler.

Figure 28:
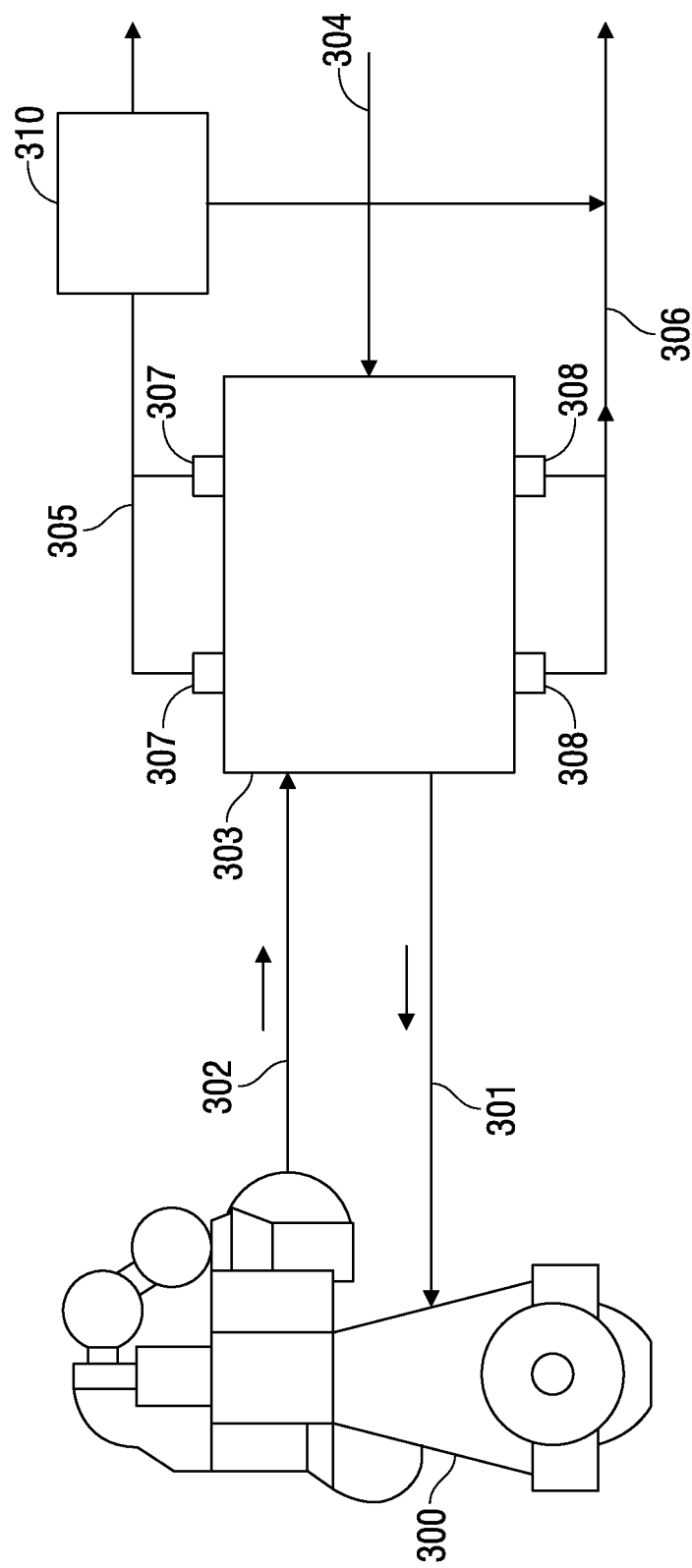
FIG. 28 is a schematic of a ship desalination embodiment of this invention.

FIG. 28 is a schematic of a ship desalination embodiment of this invention. As shown in FIG. 12, a ship engine 300 is cooled by water from line 301. The water used for cooling exits the ship engine 300 through water line 302 and enters heat exchanger 303 and heats salt water line 304 (typically from the ocean). Salt water from line 304 is then separated in heat exchanger 303 into purified water line 305 and contaminated water line 306 by exiting fluid ports 307 and 308 respectively. Contaminated water line 306 is then treated and/or released back into the water. Purified water line 305 is then condensed into drinking water in condenser 3108 which can also include post-treatment steps to make it potable and a portion can be sent to contaminated line 306 to concentrate or dilute the brine concentration, as necessary prior to putting it into the supply cvhain as brine fluid or discharge.

Alternatively, or in addition, a reverse osmosis unit can be added with a corresponding pressure recapture system could be added. In this embodiment, the pressure recapture system can take advantage of the head of seawater or other water at or above the service of the water. This embodiment can be slightly modified to work on rocket ships as described above.

Additional Embodiments

As discussed above, embodiments disclosed herein can also provide for continuous, real-time monitoring, enabling efficient control of the purification from an on-site location and/or a remote location. The system can also be configured for autonomous, unmanned operation, providing a significant savings in cost and manpower. In another embodiment, the system can be coupled with electrical generators to provide purified water in disaster relief operations, or military operations where electricity and water is needed in emergency or remote situations. In one embodiment, the generator can be on one mobile skid and attached to a second mobile skid to provide water purification including pumps for pumping contaminated fluids and removing waste fluids and purified water. In addition, the mobile skid embodiment can be brought to areas with severe water demand or water drought conditions to help run industrial processes during peak demand or water scarcity times. Otherwise, human demand might override industrial water usage and require shutdown of industrial processes versus just adding a single trailer or system to purify at least a portion of the water usage or all the water usage depending on the situation. Therefore, this system provides capabilities not currently available for operators of industrial processes, drilling operations, military operations during water droughts, natural and man-made disasters and other emergencies.

Vapor-Compression Evaporation System:

Vapor-compression evaporation comprises an evaporation method. The apparatus can comprise a blower, compressor or jet ejector utilized to compress, and thus, increase the pressure of the vapor produced. The pressure increase of the vapor also generates an increase in the condensation temperature. The same vapor can serve as the heating medium for the liquid or solution being concentrated ("contaminated fluid" of "mother fluid") from which the vapor was generated to begin with. If no compression was provided, the vapor would be approximately the same temperature as the boiling liquid/solution, and thus, no heat transfer takes place. If compression is performed by a mechanically driven compressor or blower, this evaporation process is referred to as MVR (Mechanical Vapor Recompression) and if compression performed by high pressure motive steam ejectors, the process is sometimes called Thermo-compression or Steam Compression which requires the use of a steam ejector.

U.S. Pat. Nos. 7,708,665 and 7,251,944 describe vapor compression extraction methods and systems. Both U.S. Pat. Nos. 7,708,665 and 7,251,944 are hereby incorporated by reference.

The inventive concepts, discussed above, including but not limited to using multiple flow paths to allow gravity to separate the purified vapor and/or using the internal components of a heat exchanger to serve the function as a flash chamber can be applied to vapor compressions systems to produce water. A vapor-compression evaporation system, comprising a plurality of heat exchangers in series each containing a feed having a nonvolatile component; at least one heat exchanger comprising a plurality of flow paths wherein gravity differences separates the heavier contaminated fluid from the lighter purified water vapor; a mechanical compressor coupled to the last vessel in the series and operable to receive a vapor from the last vessel in the series; a pump operable to deliver a cooling liquid to the mechanical compressor; a tank coupled to the mechanical compressor and operable to separate liquid and vapor received from the mechanical compressor; a plurality of vessels inside respective vessels, the vessel in the first heat exchanger in the series operable to receive the vapor from the heat exchanger, at least some of the vapor condensing therein, whereby the heat of condensation provides the heat of evaporation to the first heat exchanger in the series; wherein at least some of the vapor inside the first vessel in the series is delivered to the heat exchanger in the next vessel in the series, whereby the condensing, evaporating, and delivering steps continue until the last vessel in the series is reached. In one embodiment, the system further comprises a multi-effect or a multi-stage flash evaporator coupled to the last heat exchanger in the series for additional evaporation of the feed or alternatively inside the heat exchangers.

Pipeline

Preferably, a water pipeline would connect the purification or desalination unit to the end user. Depending on the elevation, the pipeline may not need pumps and can rely solely on elevation gravity.

Ship Embodiment:

While the embodiments have been primarily described for onshore, the embodiments could be modified to be used on any ship or platform to allow for easy installation and removal of the plant to any locations. The ship containing the desalination plant in containers could be anchored or moored to a designated location and support ships can be install the inlet and outlet device embodiments to the ship once moored.

Offshore Oil and Gas Embodiments:

In the past, oil and gas used salt-water to flood and pressurize reservoirs. Salt water can cause numerous problems with the underground reservoir. These problems include increased microbes, fouling, chemical reactions, scaling, and lowering reservoir permeability. Solutions to salt water flooding includes using freshwater and chemical treatments. Freshwater is not always readily available and chemical treatments are expensive and have environmental issues. An embodiment would use part of the produced water for offshore water production by piping the water to the injection wells. This can be accomplished by using existing subsea pipelines and risers as well as laying new pipelines or risers to the injection wells. When salt water flooding is not an issue, salt-water effluent can be piped into the injection wells or non-producing wells. This can occur when a reservoir section is completely depleted or when several injection wells are used the inner wells closest to the reservoir can use fresh water and the exterior wells further away from the producing reservoir can use salt-water or effluent brine. This embodiment would keep fresh water between the producing reservoir and the salt water that is being injected to help pressurize the wellbore without causing adverse salt-water issues in the producing reservoir. Accordingly, a desalination platform could be placed advantageously near offshore oil and gas activity and the desalination platform could help provide the fresh water needs of the personal and onboard equipment as well as provide the fresh-water and salt-water drilling, completions, flooding and injection needs of the subsea wells. The supply ships can be used to supply both the oil and gas platforms as well as the desalination platforms on each supply trip to cut down costs. In addition, electrical lines run to the platforms could be shared or used as backups to further improve efficiency and redundancy.

Carbon Fiber Tubing:

Composite materials such as, carbon fiber can be used to lower the cost and make the effluent piping more affordable and easier to modify with inlets. The composite consists of two parts: a matrix and a reinforcement. In CFRP the reinforcement is carbon fiber, which provides the strength. The matrix is usually a polymer resin, such as epoxy, to bind the reinforcements together, the material properties depend on these two elements. Recent advantages in manufacturing have reduced the costs to produce carbon fiber tubing and are advantageous for the offshore environment by providing high strength-to-weight and rigidity.

Liners, including carbon fiber liners, have been utilized to internally line old pipes resulting in a fully structural strengthening system. Inside an older pipe, the carbon fiber liner acts as a barrier that controls the level of strain experienced by the steel cylinder in the host pipe. The composite liner enables the steel cylinder to perform within its elastic range, to ensure the pipeline's long-term performance is maintained. Carbon fiber designs are based on strain compatibility between the liner and host pipe. Using liners such as, carbon fiber liners, older gas, oil and water pipelines could be recommissioned to handle both fresh water and effluent brine discharge.

Land Embodiment:

Several embodiments discussed above have mainly been described for offshore desalination plants. While offshore has numerous advantageous that are described above, there are certain regions that need desalination including reverse osmosis and distillation processes that are not adjacent near coastlines to allow for offshore desalination. In these situations, most of the embodiments described herein can be used to create a favorable land-based desalination plant.

For example, the containerization and robotic automation can quickly allow for any warehouse to be turned into a fully functioning desalination plant. The containers will allow for easy transportation and delivery by rail or truck service to any land-based desalination plant. Standardized containers would allow one manufacturing plant to produce containers for both onshore and offshore desalination plants. This would permit a design one and build many to utilize economies of scale by reducing design and capital costs of the plants. Any malfunctioning equipment can be removed and easily replaced and sent to be repaired at a designated repair facility thus reducing the number of personal to reduce operating costs.

The robotic container system would quickly install and remove the equipment inside a plant reducing time and cost for any maintenance or repairs. The control system would further reduce plant personnel by allowing a single operator or a remote operator to control the entire plant using automated remote controls.

The inlet system can be a wellbore drilled into a brackish or saltwater aquifer. The initial filtrations could be existing well screens employed in traditional oil, gas and water well operations.

The discharge system could be modified to run into a discharge wellbore drilled into the subterranean earth using the discharge system and embodiments to mix the discharge inside a wellbore. For example, the inlets could be designed to be on the wellhead directly above the wellbore to mix the discharge water as it enters the discharge wellbore.

Example

Hypothetical examples are disclosed below to illustrate the invention. Persons skilled in the art will recognize many different variations of these hypotheticals based on the disclosure in this document and known prior art. All variations are intended to be within the scope of this invention. Therefore, the examples disclosed are not intended to limit the scope of the claims.

Figure 19:
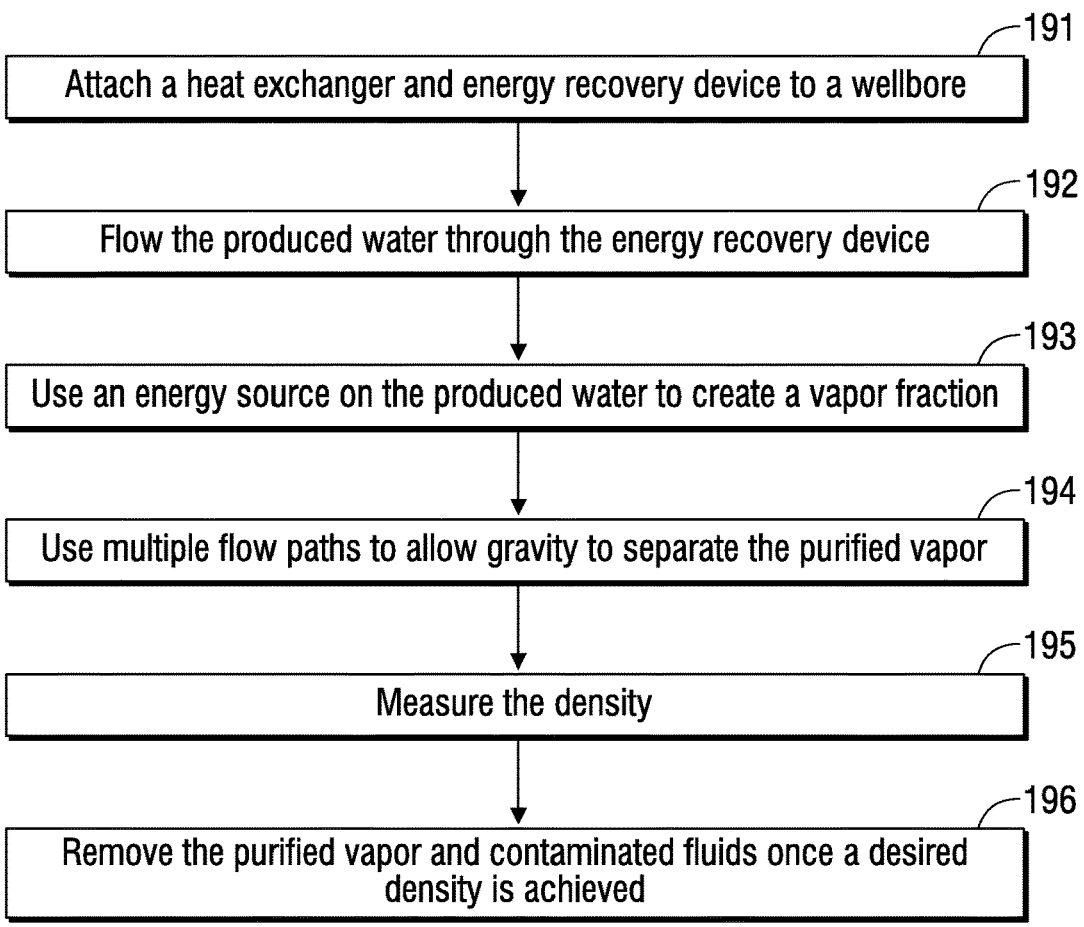
FIG. 19 is a flow chart showing a method embodiment of this invention.

FIG. 19 illustrates the steps of one embodiment. The first step is to obtain the apparatus such as, a heat exchanger and energy recovery device which is attached to a wellbore 191. In one embodiment, the apparatus has at least one inlet and at least two outlets connected to an energy source that can concentrate energy on a contaminated fluid. The second step is to flow the well production fluids including the produced water through the energy recovery device and the apparatus 192. The third step is to use the energy source on the produced water 193. This causes at least a portion of the contaminated water to change into a purified vapor state inside the apparatus. The fourth step is to use multiples flow paths inside the apparatus 194. The effects of gravity separate at least a portion of the heavier contaminated fluid from the lighter purified vapor state. The fifth step is to measure the density 195. The sixth step is to remove the purified vapor and contaminated fluids once a desired density is achieved 196. This step can be accomplished by flowing the purified vapor state through a first outlet and flowing the contaminated fluid after a portion of fluid has been removed as a purified vapor state through a second outlet of the apparatus.

In this hypothetical example, salt water with 30 g/l of NaCl with a boiling point of 105° C. is pumped into the heat exchanger which is heated by excess gas from a heat recovery for steam generation system ("HRSG"). The heated gas is flowed in and out of the heat exchanger to provide the energy to boil the salt water. The salt water is pumped into the heat exchanger and is heated by the hot air gas from the HRSG Once the salt water obtains a temperature of 105° C. the salt water begins to boil into a purified vapor or steam. The purified steam rises in the heat exchanger as it is lighter than the salt water. The slanted baffles inside the heat exchanger cause the purified steam to collect in chambers formed by the slanted baffles. Pressure from additional steam creation pushes the steam further up into the next chamber formed by another slanted baffle.

Any heavier contaminated water caught in the vapor flows down through the hole back into the initial salt water feed stream. The water flowing down has a separate flow path from the rising steam to reduce friction and prevent contamination of the purified rising steam. The flowing water also collects contaminates that have participated out from the salt water. The salt water with the removed purified vapor component then exits from the first outlet. This heated salt water with a higher concentration of salt can be used to pre-warm feed salt water with a pre-warmer heat exchanger before it enters the heat exchanger for purification to increase efficiency.

After the purified steam has reached the maximum level in the heat exchanger it exits the heat exchanger. The purified steam can then be used for further work such as steam turbine generation or can be run through additional prior art heat exchangers to efficiently increase heat energy and pressure to further add energy before using the steam. Alternatively, the vapor can be directly cooled and condensed into fresh water. To further improve the efficiency and lower the boiling temperature a pump is connected to the second outlet which lowers the pressure in the upper part of the heat exchanger. Pumps pump out the purified vapor creating a pressure less than 1 bar inside the heat exchanger which lowers the boiling point of the saltwater, reduces scaling and makes the process more efficient.

In a more preferred embodiment, the pressure is lower on the top of the heat exchanger to quickly remove the steam from the water. In addition, pump(s) can be attached to the first outlet to quickly pump the water out. The best efficiencies occur when the pressure at the top of the heat exchanger is kept below atmospheric pressure of less than 1 bar (more preferably less than 0.8 bar and most preferably, less than 0.5 bar bar) and the flow rate of the water is high enough to quickly remove water once the brine reaches the preserred density to prevent the boiling point from increasing too much because of the increased concentration of salt. This also reduces scaling. If scaling becomes a problem, purified water is run through the system to remove the contaminates and scaling. Running purified water allows the equipment to be cleaned of scaling without stopping the production of steam.

Figure 29:
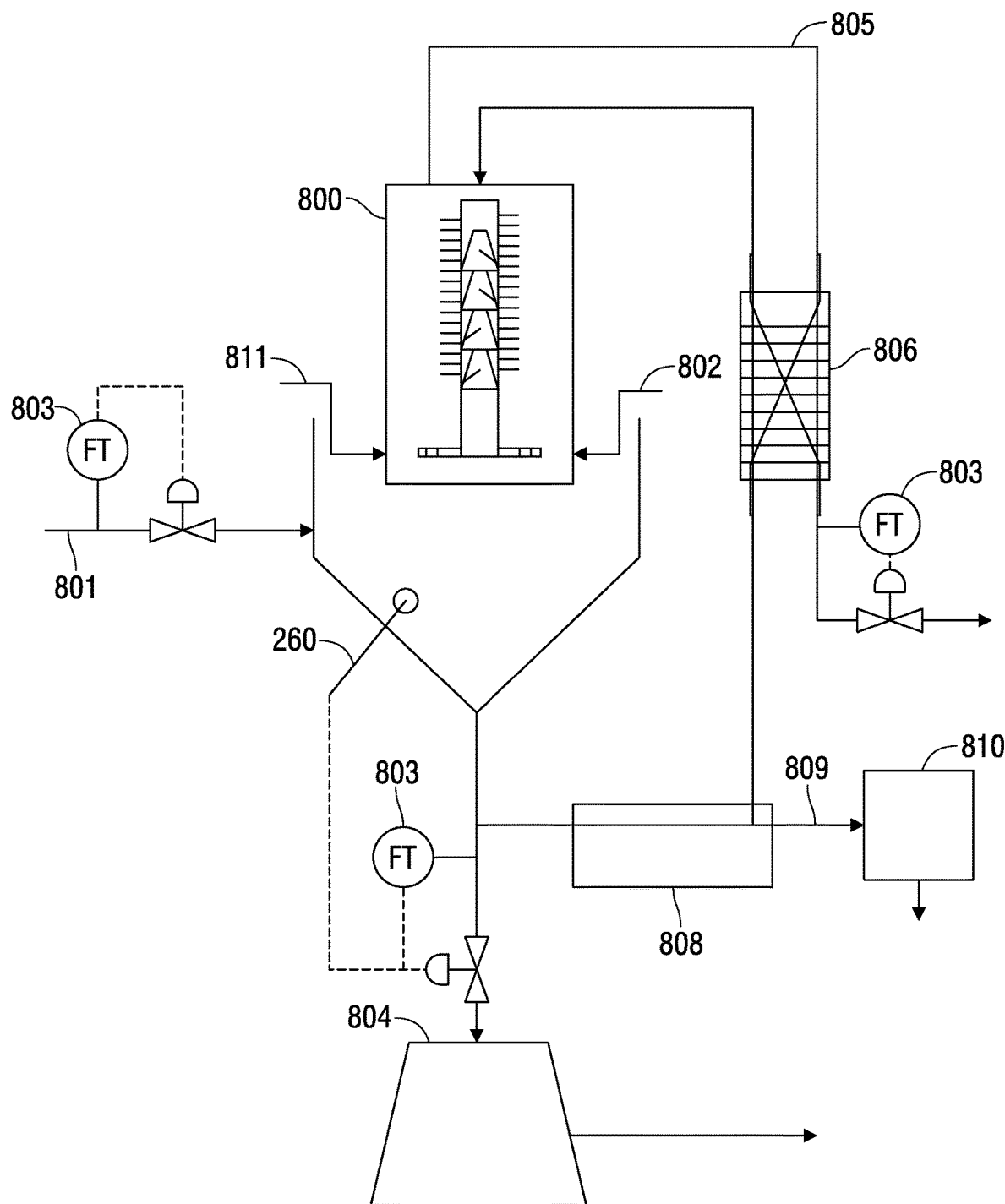
FIG. 29 is an example process flow diagram showing brine being removed from purified water at the wellsite.

FIG. 29 is a process flow diagram for a sample system being proposed at the wellsite. As shown in the FIG. 29 process flow diagram, the X-VAP™ purification system 800 can be connected to produced water 801 and gas lines 802 at storage tank 803 near wellhead for an energy mass/balance equation based on an oilfield scenario provided by a major oil Corporation. That scenario required taking 100,000 ppm TDS contaminated produced water 801 and purifying the water to a level where the brine concentrate 804 becomes 260,000 ppm TDS and can be stored in a storage tank 803. The produced water 801 is sent to a pre-treatment system to remove solids and certain metals and hydrocarbons. The sludge 809 can then be sent for landfill disposal or metal recycling 810 wherein valuable metals are extracted such as, strontium, cobalt, gold, silver, titanium, and barium are removed. This brine is suitable to be sold as a 10-lb drilling salt. The purification system can run on methane gas 802 at the wellsite or other forms of energy such as waste heat, geothermal or solar thermal. Compressed air 811 or fans blowing air can be added to the burning methane gas to increase efficiency. The evaporate can be condensed with an attached or separate pre-warmer heat exchanger 806 and the condensed purified water is stored in a storage tank 803. Certain application will require a higher or lower density and the process can be adjusted to meet or at least come substantially close (such as, within preferably 20 percent and more preferably within 10 percent) to the density requirements at the drilling site.

Energy Calculations:

For the heat energy required for evaporation are provided below: Assuming a feed water produced water 801 flow rate (Qf) −0.2 kg/s=0.44 lb/s=1,584 lb/hr=~108 barrels per day=m1. To achieve the desired density 67 barrels are evaporated which is a flow rate of 982 lb/hr=m2.

The following constants and condition are utilized:

Specific heat (Cp) for water=0.998 BTU/lb-° F.,

Latent heat of water (hf)=970.4 BTU/lb,

Feed water Inlet temperature (T1)=333° K=140° F.—Post pre-warmer,

Vapor outlet temperature (T2)=433° K=320° F.: X-Vap™ purification

ΔT=320° F.−140° F.=180° F.

Therefore, heat required is: Energy=m1*cp*(T2−T1)+m2*hf

Energy=(1584 lb/hr×0.998 BTU/lb° F.×180° F.)+(982 lb/hr×970.4 BTU/lb)

Energy=284,549.76 BTU/Hr+952,932.8 BTU/hr=1,237,482.56 BTU/hr=1,237.48 ft$^3$/hr Energy=29,699,520 BTU/Day=29,699.52 ft$^3$/Day=29.70 MMBTU/Day Approximately 20 MMBTUs of natural gas is required to evaporate the requested solution of concentrating 100,000 ppm TDS produced water to 260,000 ppm TDS concentrated brine with a throughput of 108 barrels per day. The energy cost per barrel is approximately $0.41 per barrel of throughput, assuming an average Henry Hub price of ~$3 and a well site wholesale value of half the Henry Hub price. The capital and non-energy operating expenses are estimated to be approximately 0.30 cents per barrel. Accordingly, the proposed X-VAP system can purify water for less than $0.71 per barrel which is significantly less than target $1.50 per barrel disposal cost that is common in Texas. In addition, the discharge brine can be sold as drilling fluid.

After the system purifies water thermally, the system can then be used to purify water using reverse osmosis membranes. This would allow efficient purification without the issue of scaling found in high salt thermal distillation.

This invention can be used in just about any heat exchanger or similar application. Such applications include but are not limited to space heating, refrigeration, air conditioning, power plants, chemical plants, petrochemical plants, petroleum refineries, natural gas processing, and sewage treatment.

The foregoing description of preferred and other embodiments is not intended to limit or restrict the scope or applicability of the inventive concepts conceived of by the applicants. In exchange for disclosing the inventive concepts contained herein, the applicants desire all patent rights afforded by the appended claims. Therefore, it is intended that the appended claims include all modifications and alterations to the full extent that they come within the scope of the following claims or the equivalents thereof.

The invention claimed is:

1. A produced water purification apparatus comprising:
    a. a wellbore with a wellhead attached to the wellbore;
    b. at least one energy recapture device connected to the wellhead of the wellbore with produced water, wherein the at least one energy recapture device captures fluid pressure of the produced water;
    c. at least one reverse osmosis membrane connected to the pressure recapture device wherein the at least one reverse osmosis membrane uses at least a component of the fluid pressure from the energy recapture device to move a volume of the produced water through the reverse osmosis membrane to remove contaminates from the produced water to create purified water; and
    d. at least one filter between the wellbore and the reverse osmosis membrane to remove solid particulate matter before the produced waters enters the at least one reverse osmosis membrane.

2. The apparatus of claim 1, further comprising at least one heat exchanger connected to the wellhead, wherein the heat exchanger comprises an inlet wherein contaminated fluid flows in the apparatus through the inlet; at least two outlets wherein a first outlet exits purified vapor and a second outlet wherein contaminated fluid with a portion removed as purified vapor exits the apparatus; an energy source that causes the contaminated fluid to heat to a temperature wherein a portion of the contaminated fluid is converted to purified vapor; and at least two different flow paths, a first flow path connecting at least one inlet to the first outlet and a second flow path connecting the inlet to the second outlet, the first flow path and the second flow path flow through at least a portion of the apparatus wherein gravity differences causes the lighter purified vapor to take a different path than the heavier contaminated fluid with the purified vapor exiting the first outlet and the contaminated fluid exiting the second outlet.

3. The apparatus of claim 2, wherein the energy source is selected from the group consisting of heat gasses, heated liquids, radiation energy, directed energy, solar energy and combinations thereof.

4. The apparatus of claim 2, wherein the energy source is flare gas energy.

5. The apparatus of claim 2 where a flare gas burner is connected to the heat exchanger to provide at least a portion of the heat.

6. The apparatus of claim 1, wherein the different flow paths are selected from the group consisting of, baffles, membranes, openings, valves, screens and combinations thereof.

7. The apparatus of claim 1, wherein the purified vapor outlet is connected to a steam turbine that uses the energy from the vapor.

8. The apparatus of claim 1, wherein the at least one filter is a gravity media filter between the energy recapture device and the reverse osmosis device.

9. The apparatus of claim 1 further comprising at least once chemical post treatment device wherein a plurality of chemicals are added to the purified water after reverse osmosis purification.

10. The apparatus of claim 6, wherein at least one additional flow is created by baffles and the apparatus further comprises a plurality of holes in the baffles and at least one screen in the plurality of holes to help separate the purified vapor from the contaminated fluid.

11. The apparatus of claim 2, further comprising at least one screen and at least one perforated pipe inside the heat exchanger thereby creating multiple flow zones inside the apparatus.

12. The apparatus of claim 2, further comprising at least one additional flow path wherein the at least one additional flow path is selected from the group consisting of conical shaped plating with a plurality of aligned holes, baffles, membranes, valves, tubes, baffles with holes, screens, perforated pipes, condensation plates, aligned openings and combinations thereof.

13. The apparatus of claim 1, further comprising a control panel to operate the at least one energy recapture device and the at least one reverse osmosis membrane in a coordinated manner and a density sensor.

14. The apparatus of claim 13, further comprising:
a. pumps connected to the first and second outlets;
b. coatings inside the apparatus that are resistant to scaling;
c. multiple flow paths for the contaminated fluid; and
d. at least one additional opening on the contaminated fluid path suitable to remove heavier contaminated fluid before the contaminated fluid outlet.

15. The apparatus of claim 14, wherein the control panel operates the pumps attached to the first and second outlets to control the flow of the water in a coordinated manner using at least one sensor.

16. A method to purify produced water from a wellhead comprising;
a. connecting an energy recapture device to the wellhead of a wellbore;
b. capturing at least a portion of the pressure energy from the produced fluid exiting the wellbore using the energy recapture device;
c. transferring a component of the at least a portion of the pressure energy to a reverse osmosis membrane device connected to the energy recapture device;
d. filtering the produced water to remove solid particulate matter;
e. using the component of the at least a portion of the pressure energy to flow produced water through the reverse osmosis membrane device; and
f. purifying the produced water as the water flows through the reverse osmosis membrane device.

17. The method of claim 16 further comprising the steps of:
a. connecting an apparatus for separating purified vapor from contaminated fluid, to the wellhead, the apparatus comprising: at least one inlet and at least two outlets connected to an energy source that can concentrate energy on a contaminated fluid; flowing the contaminated fluid through the inlet into the apparatus to transfer heat to the apparatus;
b. using the energy source on the contaminated fluid inside the apparatus to cause at least a portion of the contaminated fluid to change into a purified vapor state inside the apparatus;
c. using at least two flow paths inside the apparatus wherein gravity separates at least a portion of the heavier contaminated fluid from the lighter purified vapor state
d. using a density sensor to control the process achieve a specific density contaminated fluid; and
d. flowing the purified vapor state through the first outlet and flowing the contaminated fluid as a brine through the second outlet to the reverse osmosis membrane.

18. A system comprising:
a. a wellbore with a wellhead attached to the wellbore;
b. at least one energy recapture device connected to the wellhead of the wellbore with produced water, wherein the at least one energy recapture device captures fluid pressure of the produced water; and
c. at least one reverse osmosis membrane connected to the pressure recapture device wherein the at least one reverse osmosis membrane uses at least a portion of the fluid pressure from the energy recapture device to move a volume of the produced water through the reverse osmosis membrane to remove contaminates from the produced water to create purified water;
d. at least one filter between the wellbore and the reverse osmosis unit to remove solid particulate matter; and
e. at least one control panel that operates the at least one energy recapture device and the at least one reverse osmosis membrane in a coordinated manner.

19. The system of claim 18, further comprising: at least one heat exchanger connected to the wellhead, wherein the heat exchanger comprises an inlet wherein contaminated fluid flows in the apparatus through the inlet; at least two outlets wherein a first outlet exits purified vapor and a second outlet wherein contaminated fluid with a portion removed as purified vapor exits the apparatus; an energy source that causes the contaminated fluid to heat to a temperature wherein a portion of the contaminated fluid is converted to purified vapor; and at least two different flow paths, a first flow path connecting at least one inlet to the first outlet and a second flow path connecting the inlet to the second outlet, the first flow path and the second flow path flow through at least a portion of the apparatus wherein gravity differences causes the lighter purified vapor to take a different path than the heavier contaminated fluid with the purified vapor exiting the first outlet and the contaminated fluid exiting the second outlet.

20. The system of claim 19, further comprising:
a. pumps attached to the first and second outlets;
b. coatings inside the heat exchanger that are resistant to scaling;
c. density sensors;
d. multiple flow paths for the contaminated fluid; and
e. at least one additional opening on the contaminated fluid path suitable to remove heavier contaminated fluid before the contaminated fluid outlet.

* * * * *